United States Patent
Yamaguchi et al.

(10) Patent No.: US 6,324,461 B1
(45) Date of Patent: Nov. 27, 2001

(54) ROAD SURFACE CONDITION ESTIMATING APPARATUS AND VARIATION REDUCTION PROCESSING APPARATUS

(75) Inventors: Hiroyuki Yamaguchi; Katsuhiro Asano; Eiichi Ono; Takaji Umeno; Masaru Sugai, all of Aichi-ken (JP)

(73) Assignee: Kabushiki Kaisha Toyota Chuo Kenkyusho, Aichi-gun (JP)

( * ) Notice: Subject to any disclaimer, the term of this patent is extended or adjusted under 35 U.S.C. 154(b) by 0 days.

(21) Appl. No.: 09/106,342

(22) Filed: Jun. 29, 1998

(30) Foreign Application Priority Data

Jun. 27, 1997 (JP) .................................................. 9-171790
Nov. 11, 1997 (JP) .................................................. 9-326921
Apr. 13, 1998 (JP) ................................................ 10-101540

(51) Int. Cl.[7] .............................. B60T 8/00; B60T 8/66; B60T 8/58
(52) U.S. Cl. ............................... 701/80; 701/80; 180/197
(58) Field of Search ................................ 701/80, 1, 36, 701/73, 71, 79; 303/149, 150, 163, 160, 194; 180/197; 73/105; 340/514

(56) References Cited

U.S. PATENT DOCUMENTS

| 4,671,579 | * | 6/1987 | Sawano et al. ......................... 303/95 |
| 4,693,522 | * | 9/1987 | Wupper et al. ....................... 303/105 |
| 4,947,332 | * | 8/1990 | Ghoneim .......................... 364/426.03 |
| 4,984,163 | * | 1/1991 | Kuwana et al. ................. 364/426.02 |
| 5,570,935 | * | 11/1996 | Monzaki ............................. 303/155 |
| 5,586,028 | * | 12/1996 | Sekine et al. ................. 364/423.098 |
| 5,588,721 | | 12/1996 | Asano et al. .......................... 303/163 |
| 5,657,229 | * | 8/1997 | Naito et al. ................... 364/426.015 |
| 5,719,565 | * | 2/1998 | Tsuno et al. .......................... 340/905 |
| 5,842,755 | * | 12/1998 | Sugimoto et al. .................... 303/186 |
| 5,869,753 | * | 2/1999 | Asanuma et al. ................... 73/117.3 |
| 5,938,713 | * | 8/1999 | Miyazaki ............................... 701/71 |
| 6,023,649 | * | 2/2000 | Matsuura et al. ...................... 701/71 |

FOREIGN PATENT DOCUMENTS

| 37 35 673 | 5/1989 | (DE) . |
| 38 33 211 | 4/1990 | (DE) . |
| 196 22 698 | 12/1996 | (DE) . |
| 0 394 308 | 10/1990 | (EP) . |
| 0 825 080 | 2/1998 | (EP) . |
| 7-128221 | 5/1995 | (JP) . |

* cited by examiner

Primary Examiner—Tan Nguyen
Assistant Examiner—Dalena Tran
(74) Attorney, Agent, or Firm—Oblon, Spivak, McClelland, Maier & Neustadt, P.C.

(57) ABSTRACT

Disclosed is a road surface condition estimating apparatus including: a converting portion having a table showing a relation among a vehicle speed, a braking force and a resonance gain for each road surface condition and converting a detected value of the input vehicle speed and braking force into a resonance gain on the basis of the table, a subtracting device for computing each of differences between the resonance gain for each road surface condition converted by each of the converting portions and the detected value of the input resonance gain, and a minimum value selecting portion selecting the minimum value among the computed values in the subtracting device and outputting an information of the road surface condition corresponding to the converting portion giving the minimum value.

10 Claims, 36 Drawing Sheets

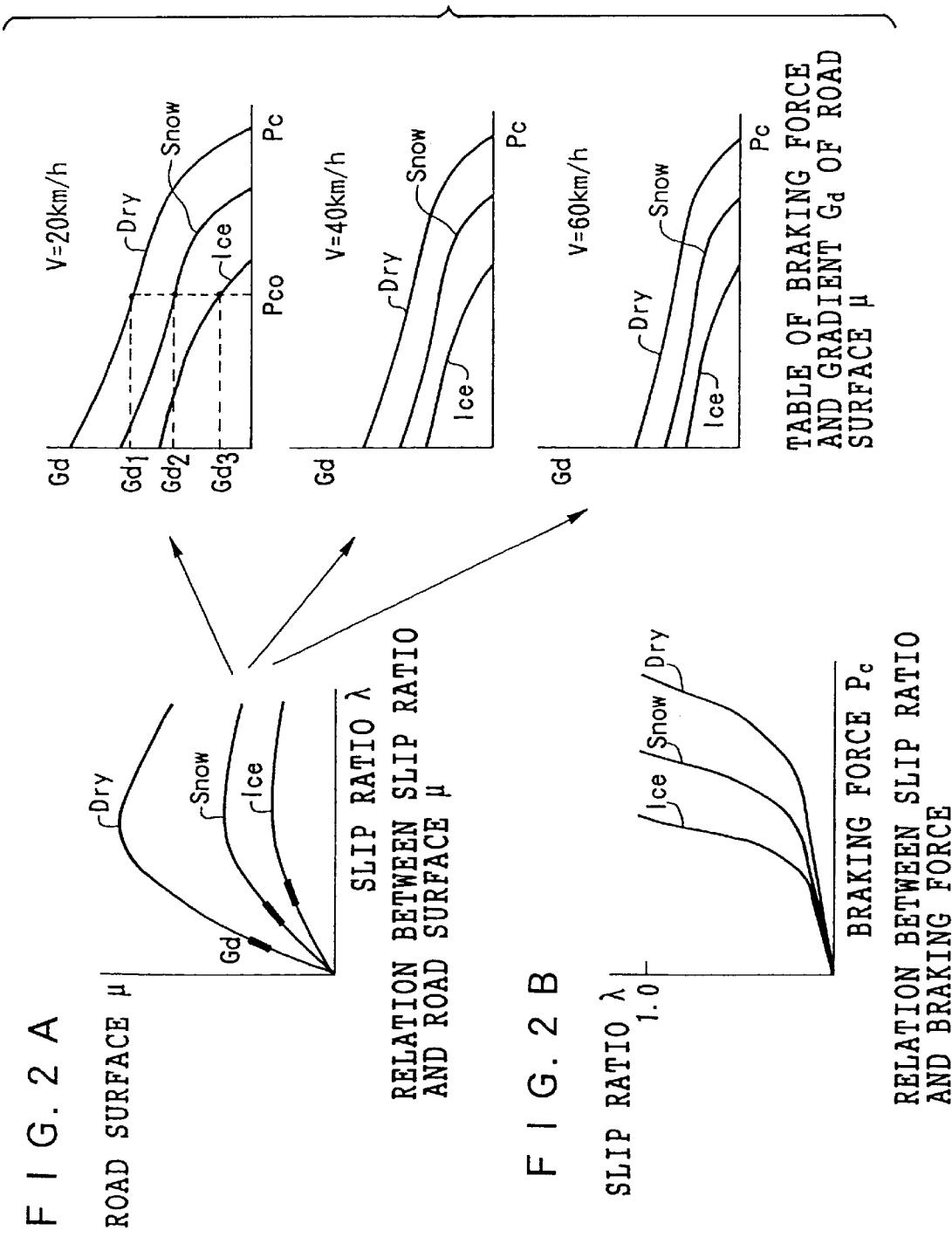

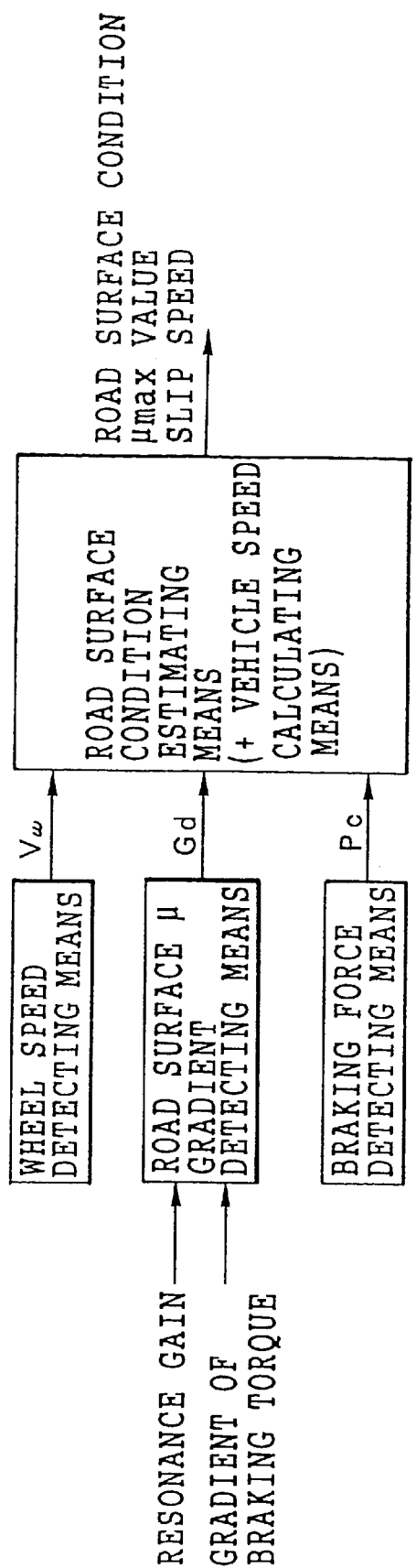
F I G. 3

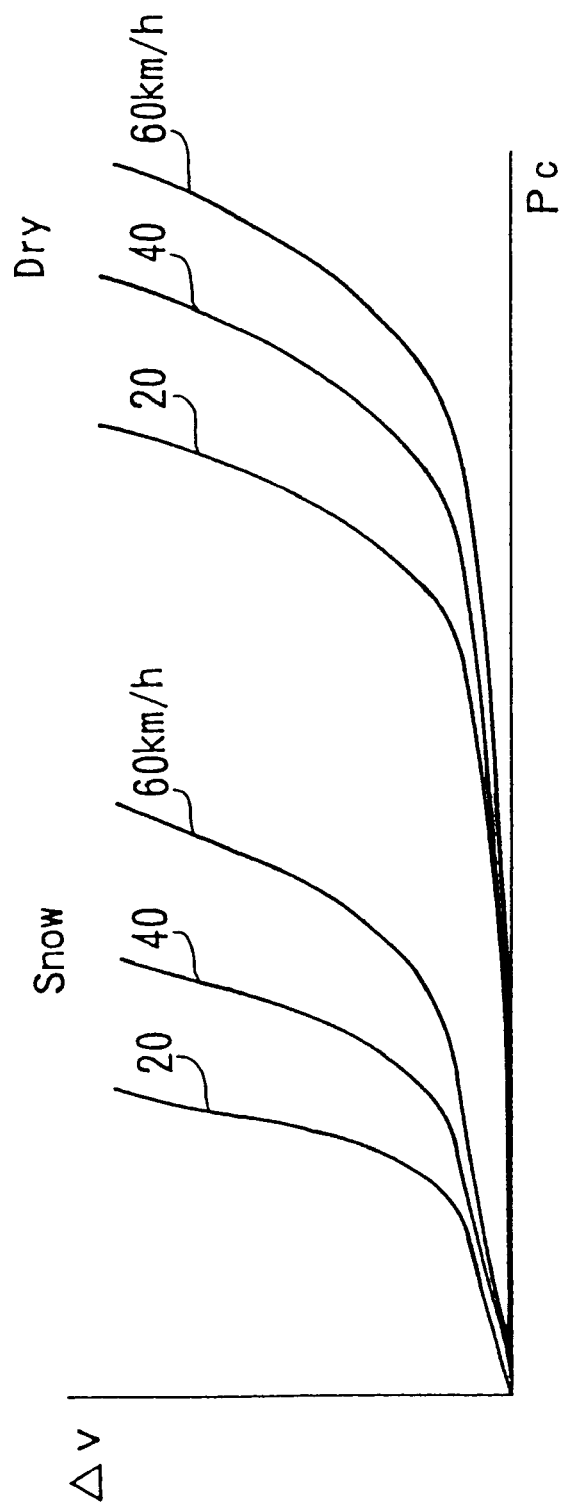

RELATION BETWEEN SLIP SPEED AND $G_d$ AT EVERY VEHICLE SPEED

Dry

Snow

RELATION BETWEEN $P_c$ AND $G_d$ IN THE CASE THAT SLIP SPEED $\Delta v$ IS PARAMETER

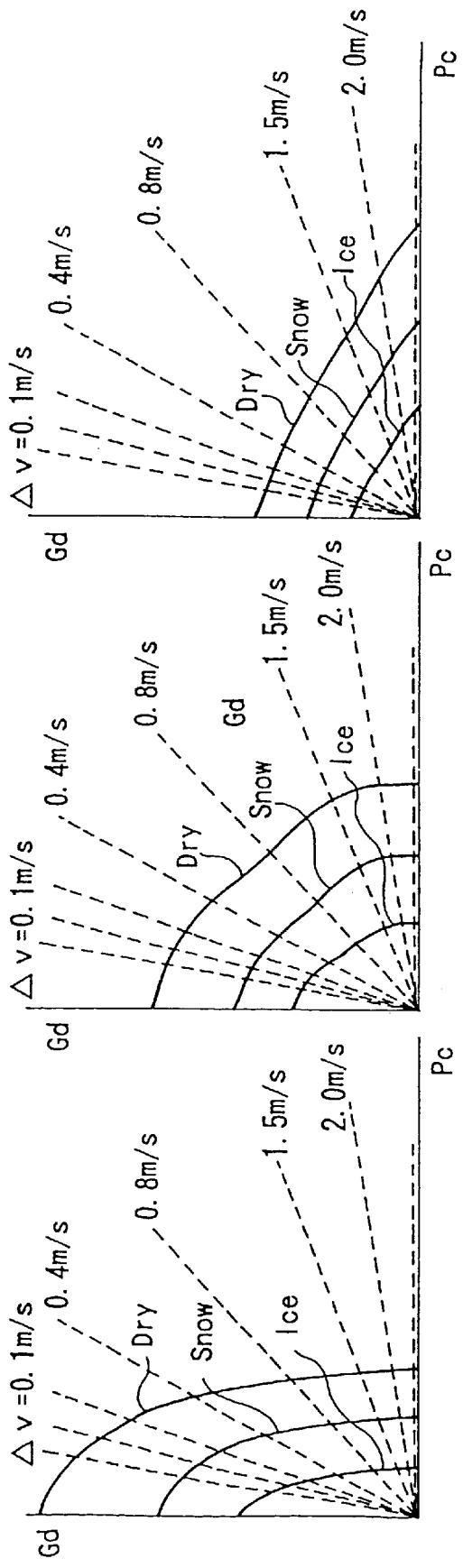
RELATION BETWEEN $P_c$ AND $G_d$ AT EVERY VEHICLE SPEEDS
(ROAD SURFACE CONDITION ESTIMATING TABLE)

MAXIMUM BRAKING FORCE TABLE AT EACH OF VEHICLE SPEEDS

F I G. 1 6
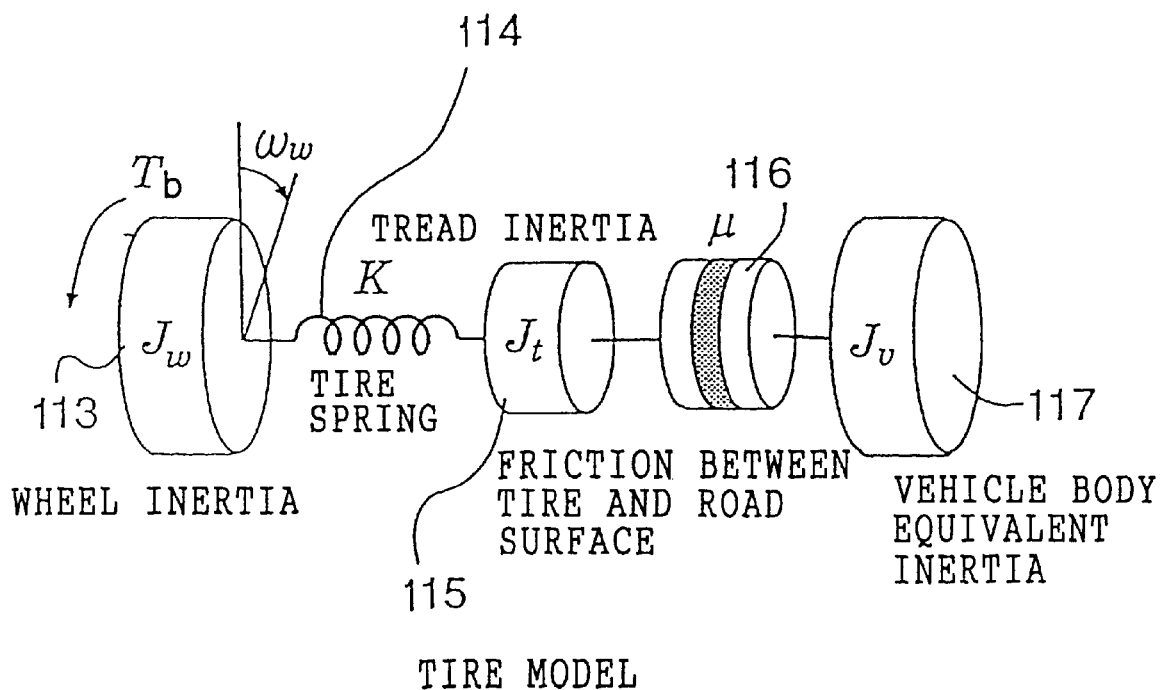
TIRE MODEL

COEFFICIENT OF FRICTION μ AND ITS GRADIENT
WITH RESPECT TO SLIP SPEED Δv

OPERATION COMMAND TO VALVE

F I G. 2 1
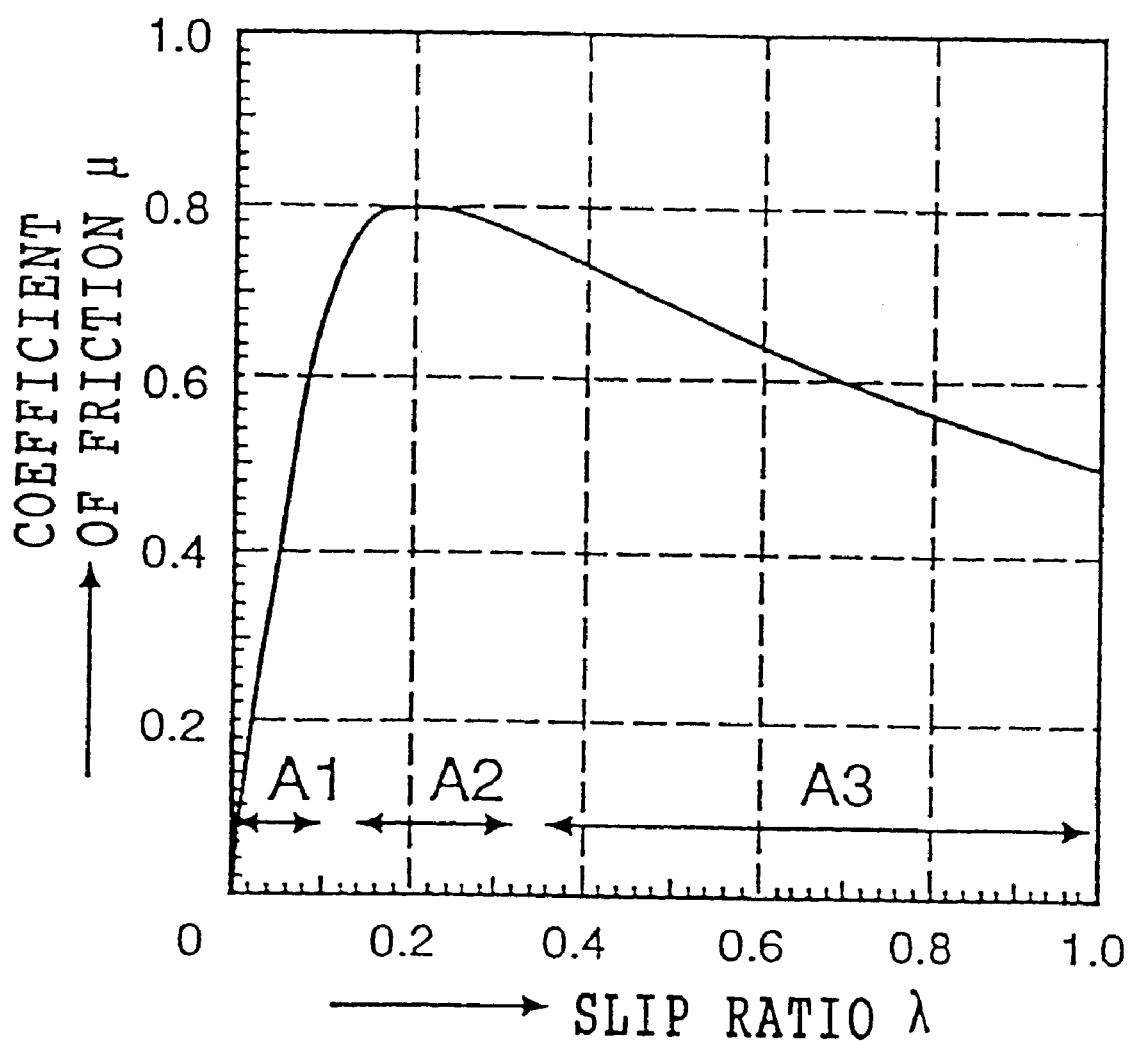

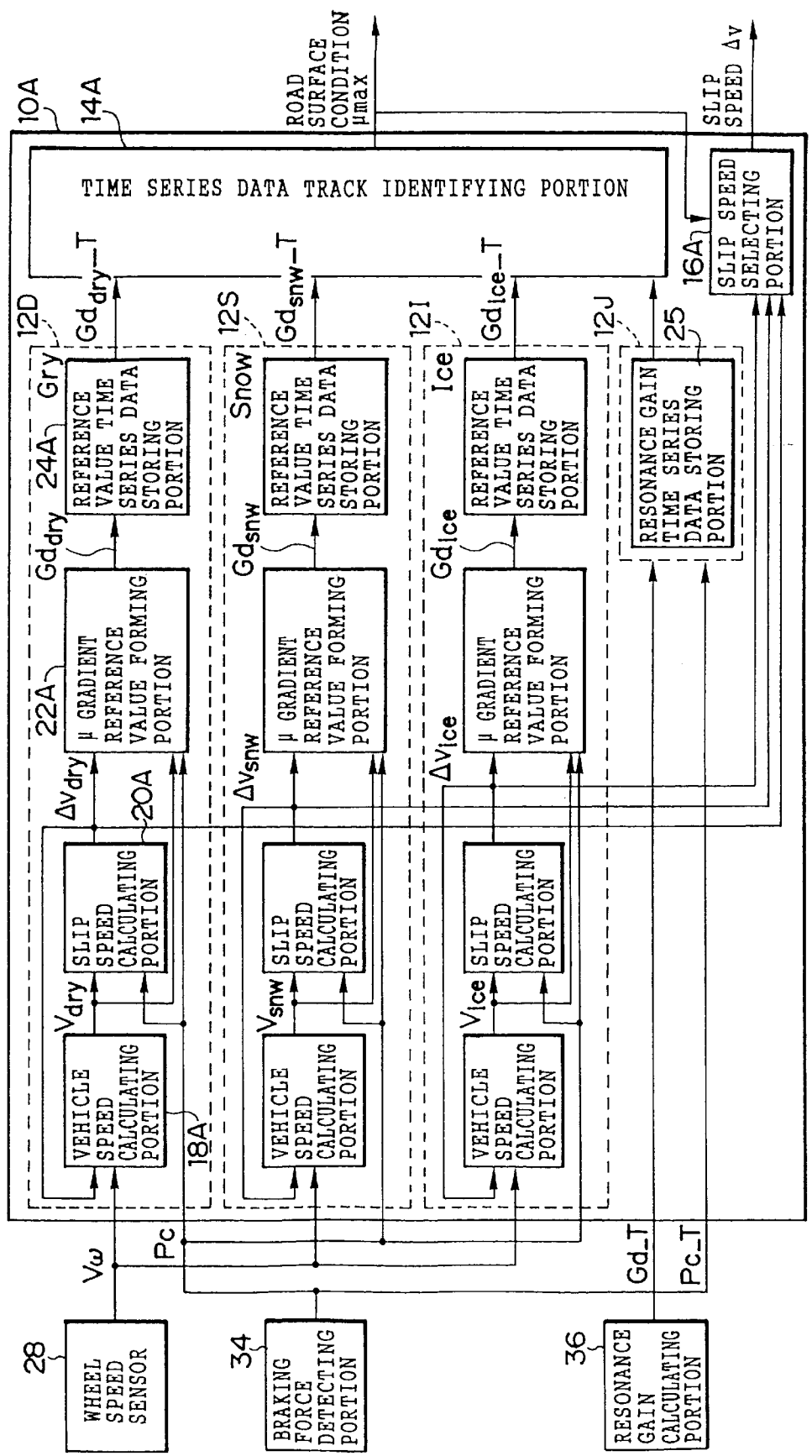

F I G. 4 0
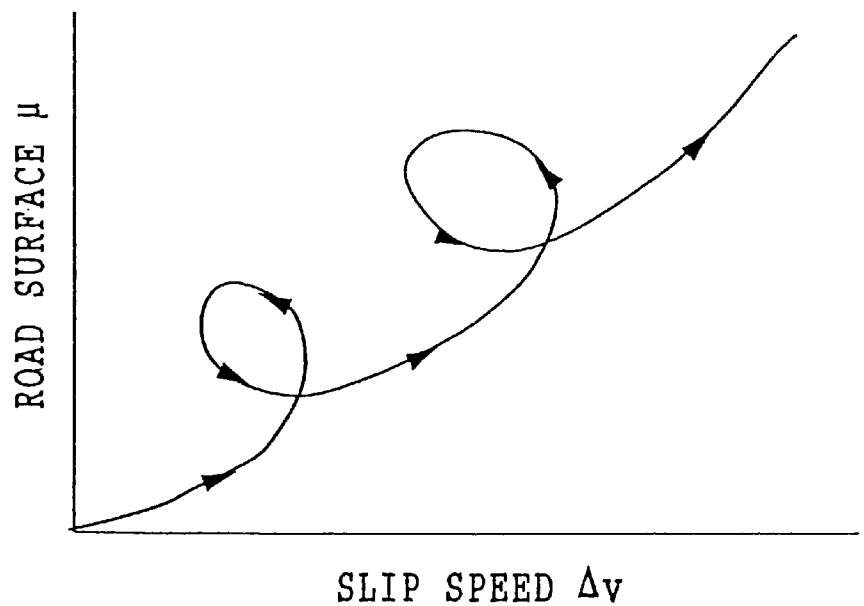
F I G. 4 1
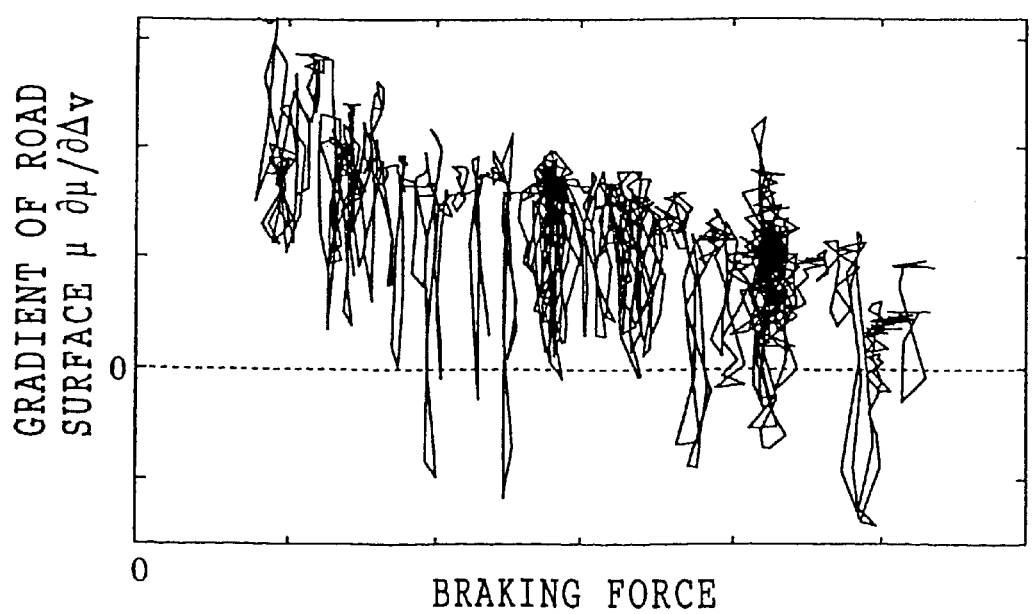

ROAD SURFACE CONDITION ESTIMATING APPARATUS AND VARIATION REDUCTION PROCESSING APPARATUS

BACKGROUND OF THE INVENTION

1. Field of the Invention

The present invention relates to a road surface condition estimating apparatus for estimating the condition of a road surface on which a vehicle is running, and more specifically to a road surface condition estimating apparatus which is provided with a correlation among a plurality of wheel motion amounts expressing a road surface $\mu$ characteristic for each road surface condition, and which estimates and outputs the road surface condition on the basis of the correlation.

The present invention also relates to a variation reduction processing apparatus and more specifically to a variation reduction processing apparatus which can be applied to a road surface condition estimating apparatus, an ABS (anti-lock braking system) apparatus, a driving force controlling apparatus, and the like, and to a road surface condition estimating apparatus to which the variation reduction processing apparatus is applied.

2. Description of the Related Art

Conventionally, an anti-lock brake control device has been proposed wherein, immediately prior to a vehicle's wheel shifting to a locked up state when the coefficient of friction $\mu$ between the wheel and the road surface surpasses a peak value of $\mu$, (hereinafter referred to as "a peak $\mu$" or "a peak $\mu$ value") this device can prevent the vehicle's wheels from being locked up by reducing the braking torque acting on the wheel and by controlling the coefficient of friction $\mu$ to follow this peak value.

Meanwhile, when a vehicle is running at a certain speed and the brakes are applied, then the vehicle's wheels slip on the road surface. It is known that the coefficient of friction $\mu$ between the wheels and the road surface varies, as is shown in FIG. 21 in relation to the slip ratio $\lambda$ expressed in formula (1) below.

$$\lambda = (V - V_w)/V \quad (1)$$

in which V is vehicle speed (conversion into an angular speed) and $V_w$ is a wheel speed, and accordingly $(V-V_w)$ corresponds to a slip speed $\Delta v$.

As shown in FIG. 21, in this $\mu$-$\lambda$ characteristic, the coefficient of friction $\mu$ reaches the peak value at a certain slip speed (the area A2 in FIG. 21).

In Japanese Patent Application Laid-Open (JP-A) No. 1-249559, there has been proposed the following anti-lock brake controlling apparatus. The anti-lock brake controlling apparatus computes the slip ratio from the approximate vehicle speed and the detected wheel speed using the formula (1). The anti-lock brake controlling apparatus controls the braking force in such a manner that the computed slip ratio substantially coincides with a reference slip ratio (a slip ratio giving the peak $\mu$) which has been previously set at a fixed value. Accordingly, the coefficient of friction $\mu$ is continually controlled at the peak $\mu$ value.

However, the slip ratio at which the coefficient of friction $\mu$ reaches the peak $\mu$ value varies in accordance with the road surface condition (the type of road surface on which the vehicle is running and the condition thereof). Accordingly, when performing follow-up control according to the fixed reference slip ratio as in the prior art described in the publication mentioned above, the stopping distance may become too long depending on the road surface, or else the brakes may be controlled so that the coefficient of friction $\mu$ goes over the peak $\mu$ value, whereby there is the concern that the wheels may lock.

In order to solve this drawback, it is necessary to estimate the road surface condition and change the reference slip ratio in accordance with the estimated road surface condition. However, in the conventional art, there is no technique for accurately estimating the road surface condition.

SUMMARY OF THE INVENTION

In view of the facts mentioned above, an object of the present invention is to provide a road surface condition estimating apparatus for accurately estimating a road surface condition.

In order to achieve the object mentioned above, in accordance with a first invention of the present invention, there is provided a road surface condition estimating apparatus provided with a correlation among a plurality of wheel motion amounts expressing the characteristic of a coefficient of friction $\mu$ between a wheel and a road surface with respect to a slip speed for each road surface condition, comprising:

- memory means for storing a gradient of the coefficient of friction $\mu$ with respect to the slip speed or a physical amount relating to said gradient as one of the wheel motion amounts expressing said correlation; and
- road surface condition estimating means for estimating and outputting a road surface condition on the basis of comparison between a converted value of the wheel motion amount for each road surface condition obtained by respectively converting at least one of detected values of the plurality of wheel motion amounts in accordance with said stored correlation and a detected value of the same amount as said wheel motion amount.

In this case, a characteristic of the coefficient of friction $\mu$ between the wheel and the road surface with respect to the slip speed $\Delta v$ corresponds to a $\Delta v$-$\mu$ characteristic expressed in FIG. 17, for example, and includes all the other equivalent characteristics (hereinafter, referred to as "road surface $\mu$ characteristic"). As the characteristic equivalent to the $\Delta v$-$\mu$ characteristic, for example, there are a characteristic shown in FIG. 21 and expressed by a slip ratio in place of the slip speed, a characteristic expressed by a braking force relating to $\mu$ ($\mu$W: W is a wheel load) and a braking torque ($\mu$Wr: r is an effective radius of the wheel) in place of the coefficient of friction $\mu$, and the like. The road surface $\mu$ characteristic varies corresponding to the road surface condition as shown in FIG. 2A.

Further, the wheel motion amount corresponds to a physical amount relating to the wheel motion, which is necessary for expressing the road surface $\mu$ characteristic, for example, there are vehicle speed, a wheel speed, a wheel deceleration (or acceleration), a slip speed, a braking force, a braking torque, a braking pressure (a wheel cylinder pressure) and the like as well as the physical amounts expressing slipperiness of the wheel such as a gradient of the road surface $\mu$ with respect to the slip ratio, a gradient of the braking torque with respect to the slip speed, and the like.

These wheel motion amounts are selected in such a manner as to necessarily and sufficiently express the road surface $\mu$ characteristic respectively becoming a fixed relation for each road surface condition, and accordingly, the correlation between the wheel motion amounts directly or indirectly expresses the road surface $\mu$ characteristic for each road surface condition.

For example, the road surface $\mu$ characteristic in FIG. 2A can be at first expressed for each road surface condition by the correlation between the braking force $P_c$ as another wheel motion amount and the slip ratio $\lambda$, as shown in FIG. 2B. Then, the road surface $\mu$ characteristic in FIG. 2A can be necessarily and sufficiently expressed by the braking force $P_c$, the vehicle speed and the gradient $G_d$ of the road surface $\mu$ as a three-dimensional characteristic for each road surface condition, as shown in FIG. 2C, considering the fact that the gradient $G_d$ of the road surface $\mu$ with respect to the slip ratio $\lambda$, as well as the $\mu$ value, has a peculiar value for each road surface condition in FIG. 2A, and using the relation in FIG. 2B.

In this case, since the slip ratio $\lambda$ can be expressed by the vehicle speed and the wheel speed, in the case of using the braking force as one of the wheel motion amounts, another wheel motion amount is required, so that in an embodiment shown in FIG. 2C, the vehicle speed is employed.

In FIG. 2C, the three-dimensional characteristic is expressed by the relation between the braking force and the road surface $\mu$ gradient $G_d$ in the case of each of the vehicle speed V of 20 km/h, 40 km/h and 60 km/h. From this drawing, it is understood that the relation among these three wheel motion amounts is different in accordance with the road surface condition.

In accordance with the present invention, the correlation between a plurality of wheel motion amounts expressing these road surface $\mu$ characteristics is provided for each road surface condition. In this case, the correlation can be expressed, for example, by a conversion table between the input and output data or the like, and in the case of the characteristic of FIG. 2C, the table is previously formed on the basis of the data obtained by detecting the relation between the braking force and the road surface $\mu$ gradient for each vehicle speed and each road surface condition.

Here, in the case of estimating the road surface condition when the wheel motion amount such as the vehicle speed and the like is constant, it is possible to reduce a number of the wheel motion amounts expressing the correlation.

In this case, the present invention comprises detecting means for detecting a plurality of wheel motion amounts expressing a characteristic of a coefficient of friction $\mu$ between a wheel and a road surface with respect to a slip speed;

converting means for converting a detected value of at least one of the plurality of wheel motion amounts into a converted value of another of the plurality of wheel motion amounts for each of a plurality of road surface conditions on the basis of a correlation between the plurality of wheel motion amounts for each of a plurality of road surface conditions provided in said converting means; and road surface condition estimating means for estimating a road surface condition by comparing said converted value with a detected value of said another of the plurality of wheel motion amounts.

Accordingly, the road surface condition estimating means in accordance with the present invention can be structured in such a manner that a plurality of wheel motion amounts can be input. For example, as shown in FIG. 1, the structure is made such that the vehicle speed V detected by the vehicle speed detecting means, the gradient $G_d$ of the road surface $\mu$ detected by the road surface $\mu$ gradient detecting means and the braking force $P_c$ detected by the braking force detecting means can be input to the road surface condition estimating means.

When the detected values of the plurality of wheel motion amounts are input, the converting means converts at least one (one or a plural number) of the detected values of the plurality of input wheel motion amounts on the basis of the correlation for each of the road surface conditions. As a result, the converted values of the wheel motion amounts other than the wheel motion amount which is a subject of conversion can be obtained for each road surface condition. For example, in the structure shown in FIG. 1, in the case of converting the vehicle speed and the braking force in accordance with the correlation shown in FIG. 2C, the converted values of the gradient of the road surface $\mu$ corresponding to the detected value of the vehicle speed V=20 km/h and the detected value $P_{c0}$ of the braking force respectively become $G_{d1}$, $G_{d2}$ and $G_{d3}$ for a dry road surface, a snow covered road surface and a ice covered road surface.

Then, the road surface condition estimating means estimates the road surface condition on the basis of the comparison between the converted values of the other wheel motion amounts for each of the road surface condition obtained in this manner and the corresponding detected values of the same wheel motion amounts. For example, in the case of the embodiment mentioned above, the converted values $G_{d1}$, $G_{d2}$ and $G_{d3}$ of the gradient of the road surface $\mu$ for each of the road surface conditions are compared with the detected value $G_{d0}$ of the gradient of the road surface $\mu$ detected by the road surface $\mu$ gradient detecting means and the road surface condition is estimated and output from the result of the comparison.

In this comparison, for example, a difference between the detected value $G_{d0}$ and each of the converted values $G_{d1}$, $G_{d2}$ and $G_{d3}$ is computed, and the road surface condition giving the smallest difference (absolute value) is output. For example, in the case the difference between $G_{d2}$ and $G_{d0}$ is the smallest, it estimates that the road surface condition is "snow covered road surface".

Further, the apparatus is characterized in that one of a plurality of wheel motion amounts expressing the correlation is a gradient of the coefficient of friction $\mu$ with respect to the slip speed or a physical amount relating to the gradient.

Since the gradient of the coefficient of friction $\mu$ with respect to the slip speed (hereinafter referred to as "the gradient of the road surface $\mu$" or "the road surface $\mu$ gradient") has a peculiar value in correspondence to the road surface condition as already mentioned above, it becomes an effective wheel motion amount at a time of estimating the road surface condition. Further, it is hard to directly detect the coefficient of friction $\mu$, while an effective method of computing by using an online system identification method from time series data of the wheel speed (the invention described in Japanese Patent Application No. 8-218828) can be applied to obtain the gradient of the road surface $\mu$. Accordingly, the road surface condition can be more accurately computed by using the gradient of the road surface $\mu$.

In this case, as a physical amount relating to a gradient of the coefficient of friction $\mu$ with respect to the slip speed, for example, there are a gradient of a braking torque (or a braking force) with respect to the slip speed (or the slip ratio) and the like.

As mentioned above, in accordance with the present invention, an accurate road surface condition can be estimated on the basis of the correlation between a plurality of wheel motion amounts expressing a characteristic of the coefficient of friction $\mu$ between the wheel and the road surface with respect to the slip speed and the detected values of a plurality of wheel motion amounts, and a vehicle stabilizing control can be more accurately performed on the basis of the estimated road surface condition.

Here, in accordance with the present invention, the structure may further comprise micro vibration means for minutely vibrating a braking force by a resonance frequency of a vibration system constituted by a vehicle body, a wheel and a road surface, in which a physical amount relating to the gradient of the coefficient of friction $\mu$ may be set to a resonance gain, that is, a ratio of the micro amplitude of a resonance frequency component of the wheel speed with respect to the micro amplitude of the braking force at a time of minutely vibrating the braking force by means of the micro vibration means.

Accordingly, a vibration phenomenon in the wheel at a time when the vehicle comprising a vehicle body of a weight $W_v$ is running at vehicle speed $\omega_v$, that is, a vibration phenomenon in a vibration system constituted by the vehicle body, the wheel and the road surface is considered by referring a model shown in FIG. 16 which is equivalently modeled by a wheel rotation axis.

In the model shown in FIG. 16, the braking force acts on the road surface through a surface of a tread 115 of a tire being in contact with the road surface. Here, since the braking force actually acts on the vehicle body as a reaction (a braking force) from the road surface, an equivalent model 117 of the vehicle body weight $W_v$ in accordance with the rotation axis conversion becomes connected to an opposite side of the wheel 113 through a friction element 116 (the road surface $\mu$) between the tread of the tire and the road surface. This is similar to the case that the weight of the vehicle body can be modeled by a great inertia under the wheel, that is, a mass on the opposite side of the wheel, as in a chassis dynamo apparatus.

In FIG. 16, when an inertia of the wheel 113 including a tire rim is set to be $J_w$, a spring constant of a spring element 114 between the rim and the tread 115 is set to be K, a radius of the wheel is set to be R, an inertia of the tread 115 is set to be $J_t$, a coefficient of friction of a friction element 116 between the tread 115 and the road surface is set to be $\mu$, and an inertia of the equivalent model 117 of the vehicle body weight in accordance with the rotation axis conversion is set to be $J_v$, a transmission characteristic from a braking torque $T_b'$ generated by the wheel cylinder pressure to the wheel speed $\omega_w'$ is computed by a formula of the wheel motion and is expressed as follows.

$$\omega_w = \frac{\mu_0 J_v KRW_v s - \{J_t J_v s^3 + \alpha(J_t + J_v)R^2 W_v s^2 + J_v Ks + \alpha KR^2 W_v\}T_b'}{s\{J_w J_t J_v s^3 + \alpha J_w(J_t + J_v)R^2 W_v s^2 + (J_w + J_t)J_v Ks + \alpha(J_w + J_t + J_v)KR^2 W_v\}} \quad (2)$$

In which reference symbol s is an operator for Laplace transform.

When the tire grips on the road surface, in the case that the tread 115 and the vehicle equivalent model 117 are considered to be directly connected to each other, an inertia of the sum of the vehicle equivalent model 117 and the tread 115 and an inertia of the wheel 113 resonate. Accordingly, the vibration system can be considered to be a wheel resonance system constituted by the wheel, the vehicle body and the road surface. The resonance frequency $\omega\infty$ of the wheel resonance system at this time is expressed in the transmission characteristic of the formula (2) as follows.

$$\omega^\infty = \sqrt{\{(J_w + J_t + J_v)K/J_w(J_t + J_v)\}}/2\pi \quad (3)$$

The state corresponds to an area A1 prior to reaching the peak $\mu$ in FIG. 17 (FIG. 21).

On the contrary, in the case that the coefficient of friction $\mu$ of the tire approaches the peak $\mu$, the coefficient of friction $\mu$ of the tire surface is hard to be changed with respect to the slip ratio, and the component in accordance with the vibration of the inertia of the tread 115 does not affect the vehicle body equivalent model 117. Accordingly, the tread 115 and the vehicle equivalent model 117 are equivalently separated, and the tread 115 and the wheel 113 generate resonance. The wheel resonance system at this time can be considered to be constituted by the wheel and the road surface, and the resonance frequency $\omega\infty'$ at this time equals to a value obtained by setting the vehicle body equivalent inertia $J_v$ to be 0 in the formula (3). Accordingly, the value $\omega\infty'$ is expressed by the following formula.

$$\omega^{\infty\prime} = \sqrt{\{(J_w + J_t)K/J_w J_t)\}}/2\pi \quad (4)$$

The state corresponds to an area A2 near the peak $\mu$ in FIG. 17 (FIG. 21).

Comparing the formula (3) with the formula (4), when it is supposed that the vehicle body equivalent inertia $J_v$ is larger than the wheel inertia $J_w$ and the tread inertia $J_t$, the resonance frequency $\omega\infty'$ of the wheel resonance system in the case of the formula (4) is shifted to the higher frequency side than $\omega\infty$ in the formula (3). Accordingly, it is possible to determine the friction state between the wheel and the road surface on the basis of the physical amount reflecting the change of the resonance frequency in the wheel resonance system.

Then, in accordance with the present invention, as the physical amount for reflecting the change of the resonance frequency of this kind, a resonance gain $G_d$ as that mentioned below is introduced as a wheel motion amount.

At first, when the micro vibration means minutely vibrates the braking force at the resonance frequency $\omega\infty$ (the formula (3)) in the vibration system comprising a wheel, a vehicle body and a road surface (in this case, the braking pressure $P_b$ is supposed to be minutely vibrated), the wheel speed $\omega_w$ is also minutely vibrated at the resonance frequency $\omega\infty$ around the average wheel speed. Here, in the case of setting the micro amplitude of the braking pressure $P_b$ at the resonance frequency $\omega\infty$ at this time to be $P_v$ and setting the micro amplitude of the wheel speed at the resonance frequency $\omega\infty$ to be $\omega_{wv}$, the resonance gain $G_d$ is expressed by the following formula.

$$G_d = \omega_{wv}/P_v \quad (5)$$

In this case, the resonance gain $G_d$ can be considered to be a vibration component of the resonance frequency $\omega\infty$ in a ratio ($\omega_w/P_b$) of the wheel speed $\omega_w$ with respect to the braking pressure $P_b$, and expressed by the following formula.

$$G_d = ( (\omega_w/P_b)|s=j\omega\infty) \quad (6)$$

Since the resonance gain $G_d$ corresponds to a vibration component of the resonance frequency $\omega\infty$ in the ratio ($\omega_w/P_b$) as shown in the formula (6), the resonance frequency is shifted to the value of $\omega\infty'$ when the friction state reaches the area adjacent to the peak $\mu$, so that it is suddenly reduced. Accordingly, the resonance gain $G_d$ corresponds to the wheel motion amount sensitively reflecting the friction state defining the characteristic of the road surface $\mu$.

Next, explanation will be given to the fact that the resonance gain $G_d$ is a physical amount equivalent to a braking torque gradient (a gradient of the braking torque with respect to the slip speed) which corresponds to one expression of the gradients of the road surface $\mu$.

As is already mentioned, the characteristic in FIG. 17 shows that a functional relation in which the coefficient of friction $\mu$ reaches the peak at a certain slip speed can be established between the slip speed $\Delta v$ and the coefficient of friction $\mu$ between the wheel and the road surface.

In this case, since the wheel speed is minutely vibrated as a result of minutely vibrating the braking pressure by means of the micro vibration means, the slip speed also minutely vibrates around a certain slip speed. Here, in the road surface condition having the characteristic of FIG. 17, a change of the coefficient of friction $\mu$ with respect to the slip speed $\Delta v$ at a time of minutely vibrating the slip speed around a certain slip speed will be considered.

At this time, the coefficient of friction $\mu$ on the road surface can be approximately expressed by the following formula (7).

$$\mu = \mu_0 + \alpha R \Delta v \tag{7}$$

Since the change of the slip speed due to the micro vibration is small, it can be approximately expressed by a straight line having a gradient $\alpha R$.

In this case, with substituting the formula (7) for a braking torque $T_b = \mu W R$ generated by the coefficient of friction $\mu$ between the tire and the road surface, the following formula (8) can be obtained.

$$T_b = \mu W R = \mu_0 W R + \alpha R^2 \Delta v \, W \tag{8}$$

In which reference symbol W is a wheel load. When both sides in the formula (8) are differentiated by $\Delta v$ for one stage, the following formula (9) can be obtained.

$$\frac{dT_b}{d\Delta v} = \alpha R^2 W \tag{9}$$

Accordingly, it is shown by the formula (9) that the braking torque gradient ($dT_b/\Delta v$) equals to $\alpha R^2 W$.

On the contrary, since the braking torque $T_b'$ is in proportion to the braking pressure $P_b$, the resonance gain $G_d$ is in proportion to a vibration component of the resonance frequency $\omega\infty$ in the ratio of the wheel speed $\omega_w$ with respect to the braking torque $T_b'$ ($\omega_w/T_b'$). Accordingly, the resonance gain $G_d$ can be expressed by the following formulas (10), (11) and (12) in accordance with the transmission characteristic of the formula (2).

$$G_d = \left.\frac{\omega_w}{P_b}\right|_{s=j\omega_\infty} \propto \left.\frac{\omega_w}{T_b'}\right|_{s=j\omega_\infty} \tag{10}$$

$$= \frac{jJ_v(J_B J_t - J_v J_w) K \sqrt{J_A J_B J_w K} + \alpha J_B^3 J_w K R^2 W_v}{J_A J_v^2 J_w^2 K^2}$$

$$= jA + \alpha B \quad (j: \text{an imaginary unit})$$

in which, $$J_A = J_t + J_v + J_w, \quad J_B = J_t + J_v \tag{11}$$

$$A = \frac{J_v(J_B J_t - J_v J_w) K \sqrt{J_A J_B J_w K}}{J_A J_v^2 J_w^2 K^2}, \quad B = \frac{J_B^2 J_w K R^2 W_v}{J_A J_v^2 J_w^2 K^2} \tag{12}$$

Generally, in the formula (12), since the formula (13) can be established, the formula (14) can be obtained in accordance with the formulas (9) and (10).

$$|A| = 0.012 << |B| = 0.1 \tag{13}$$

$$\frac{dT_b}{d\Delta v} \propto G_d \tag{14}$$

Accordingly, the gradient of the braking torque $T_b$ with respect to the slip speed $\Delta v$ is in proportion to the resonance gain $G_d$.

As mentioned above, it is shown that the resonance gain $G_d$ is a physical amount equivalent to the gradient of the road surface $\mu$ (the braking torque gradient), and it is understood that the road surface condition can be accurately estimated on the basis of the resonance gain $G_d$. Further, since the resonance gain $G_d$ is a wheel motion amount which accurately expresses the friction state on the basis of the resonance characteristic of the vibration system, the present invention can more accurately estimate the road surface condition.

(The Other Aspects of the Present Invention)

In accordance with a first aspect of the first invention of the present invention, the structure may be made such that said detecting means detects a wheel speed as one of said plurality of wheel motion amounts, said correlation includes a correlation defined for each vehicle speed and a correlation between two wheel motion amounts other than the vehicle speed, said converting means converts a detected value of any one of said two wheel motion amounts into a converted value of the other wheel motion amount for each of a plurality of slip speeds on the basis of said correlation between said two wheel motion amounts, said slip speed calculating means calculates a slip speed on the basis of said converted value and a detected value of said the other wheel motion amount, said vehicle speed calculating means calculates the vehicle speed on the basis of the slip speed calculated by said slip speed calculating means and the wheel speed detected by said detecting means, and said road surface condition estimating means estimates the road surface condition on the basis of the vehicle speed calculated by said vehicle speed calculating means and said correlation defined for each vehicle speed.

In this case, a second table showing a correlation between two wheel motion amounts other than the vehicle speed is provided for each slip speed, the slip speed calculating means calculates the slip speed on the basis of comparison between the converted value of the other wheel motion amount for each slip speed obtained by converting one detected value of the two wheel motion amounts for each slip speed in accordance with the second table and the detected value of the other wheel motion amount, and the vehicle speed calculating means calculates the vehicle speed on the basis of the slip speed calculated by the slip speed calculating means and the detected value of the input wheel speed. In this case, one of the plurality of wheel motion amounts showing the correlation in accordance with the table corresponds to the vehicle speed, and the road surface condition estimating means estimates the road surface condition by using the vehicle speed calculated by the vehicle speed calculating means.

The first aspect is provided with the second table showing the correlation between two wheel motion amounts other than the vehicle speed for each slip speed. The second table can be made by a procedure mentioned below in the case that the two wheel motion amounts other than the vehicle speed are set to be the braking force $P_c$ and the gradient $G_d$ of the road surface $\mu$.

At first, in each of the cases that the road surface condition and the vehicle speed (the vehicle speed) as parameters are variously changed, the change of the slip speed $\Delta v$ with respect to the braking force $P_c$ is computed, and then the relation shown in FIG. 4 can be obtained. Next, in each of the cases that the road surface condition and the vehicle speed as parameters are variously changed, the change of the gradient $G_d$ of the road surface $\mu$ with respect to the slip speed $\Delta v$ is calculated, and then the relations shown in FIG. 5A (Dry) and FIG. 5B (Snow) can be obtained.

Further, in accordance with the relations in FIGS. 4, 5A and 5B, $P_c$ and $G_d$ with respect to the same slip speed $\Delta v$ are calculated for each of the vehicle speeds, and then the relations shown in FIGS. 6A and 6B can be obtained for each of the road surface conditions. The relation between $P_c$ and $G_d$ for each of the slip speeds shown by FIGS. 6A and 6B forms the second table. In this case, a line of each of the slip speeds $\Delta v$ in FIGS. 6A and 6B is fixed without relation to the vehicle speed and the road surface.

Further, on the basis of FIGS. 6A and 6B, for each of the vehicle speeds (20 km/h, 40 km/h and 60 km/h), the relation between $P_c$ and $G_d$ as shown in FIGS. 7A to 7C is obtained for each road surface condition. The relation in FIGS. 7A to 7C corresponds to the table for each road surface condition in the case of setting a plurality of wheel motion amounts to be the vehicle speeds V, $P_c$ and $G_d$.

In the first aspect, for example, in accordance with the second table, the slip speed is calculated on the basis of the comparison between the converted value of the gradient $G_d$ of the road surface $\mu$ for each slip speed obtained by converting the detected value of the braking force $P_c$ for each slip speed and the detected value of the gradient $G_d$ of the road surface $\mu$. In other words, it is calculated which line of the slip speed $\Delta v$ in FIGS. 6A or 6B is closest to the relation between the detected $P_c$ and $G_d$, and the $\Delta v$ value of the closest line is taken as the slip speed.

Since the slip speed can be calculated in the above manner, the vehicle speed calculating means in accordance with the first aspect calculates the vehicle speed on the basis of the computed slip speed and the detected value of the input wheel speed. And the road surface condition estimating means estimates the road surface condition on the basis of the table by using the vehicle speed computed by the vehicle speed calculating means. In the case of the table shown in FIGS. 7A to 7C, it is calculated which relation of the road surface condition is closest to the relation between the detected $P_c$ and $G_d$, among the relations between $P_c$ and $G_d$ in the table shown in FIGS. 7A to 7C corresponding to the computed vehicle speed, and the closest relation is taken as the road surface condition.

As mentioned above, in accordance with the first aspect, in spite of having the table including the vehicle speed as one of the wheel motion amounts, it is not necessary to detect the vehicle speed, and inplace thereof, the wheel speed is detected. Accordingly, the road surface condition estimating means in accordance with the first aspect can be structured, for example, as shown in FIG. 3, such that the wheel speed $V_w$ detected by the wheel speed detecting means, the gradient $G_d$ of the road surface $\mu$ detected by the road surface $\mu$ gradient detecting means and the braking force $P_c$ detected by the braking force detecting means can be input to the road surface condition estimating means.

Since it is hard to accurately estimate the vehicle speed in comparison with the wheel speed, it is possible to more accurately estimate the road surface condition by estimating the vehicle speed on the basis of the second table and the wheel speed as in the first aspect, in comparison with the case of FIG. 1 in which the vehicle speed is input as the detected value.

Further, in accordance with the first aspect, since the accurate slip speed can be obtained, it is possible to more accurately control by applying the invention to an anti-lock brake control apparatus for controlling the slip ratio to coincide with the reference slip ratio.

In each of the inventions mentioned above, the road surface condition is estimated. In addition, the structure may be made to further comprise peak value searching means for searching a peak $\mu$ value corresponding to the road surface condition estimated by the road surface condition estimating means from a peak $\mu$ value ($\mu$ max value) for each road surface previously stored as data.

Accordingly, since the road surface condition and the peak $\mu$ value can be recognized, the limit value of the braking force (driving force) can be clarified, so that it is possible to change the control gain and to set a control target value in a vehicle stabilizing control such as VSC (vehicle stability control), ABS, TRC (traction control) and the like, and to give an alarm for the road surface condition to the driver.

Further, the structure may be made such that a maximum braking force is provided for each of a plurality of road surface conditions and a plurality of vehicle speeds, and said detecting means detects at least vehicle speed and a braking force as said plurality of wheel motion amounts, and wherein said road surface condition estimating apparatus further comprises:

maximum braking force selecting means for selecting the maximum braking force corresponding to said estimated road surface condition and said detected vehicle speed on the basis of the maximum braking force provided for each of said plurality of road surface conditions and said plurality of vehicle speeds, the road surface condition estimated by said road surface condition estimating means and the vehicle speed detected by said detecting means, and subtracting means for calculating the difference between the maximum braking force selected by said maximum braking force selecting means and the braking force detected by said detecting means.

In other words, the road surface condition estimating apparatus may further comprise braking force surplus calculating means for computing the maximum braking force corresponding to the vehicle speed and the road surface condition estimated by the road surface condition estimating means from the maximum braking force for each of the road surface conditions and the vehicle speeds previously stored as data and for calculating and outputting the difference between the maximum braking force and the input value of the detected braking force (a second aspect of the present invention).

Here, the invention in accordance with the second aspect can be structured, for example, as shown in FIG. 8. As shown in the drawing, the vehicle speed V, the gradient $G_d$ of the road surface $\mu$ and the braking force $P_c$ are input to the road surface condition estimating means, and as already mentioned, the road surface condition estimating means estimates the road surface condition on the basis of the wheel motion amount and the table. Then, it transmits the road surface condition to the braking force surplus calculating means of the present invention.

The braking force surplus calculating means comprises maximum braking force selecting means for selecting the maximum braking force corresponding to the road surface condition estimated by the road surface condition estimating means and the vehicle speed detected by the vehicle speed detecting means from the maximum braking force for each of the road surface conditions and the vehicle speeds previously stored as the data, and subtracting means for subtracting the braking force detected by the braking force detecting means from the calculated maximum braking force.

In this case, the maximum braking force has an inherent value for each road surface condition, and the inherent value is different for each vehicle speed. For example, the maximum braking force ($P_cMax1$, $P_cMax2$ and $P_cMax3$) changes in correspondence to the road surface condition (Dry, Snow and Ice) and the vehicle speed (40 km/h and 60 km/h), as shown in FIGS. 9A and 9B. The maximum braking force selecting means previously stores the maximum braking force for each of the road surface conditions and the vehicle speeds as shown in FIGS. 9A and 9B as the data, and therefore can select the maximum braking force corresponding to the input road surface condition and the vehicle speed. Then, the detected braking force is subtracted from the calculated maximum braking force by the subtracting means, so that a surplus degree of the braking force can be computed. The surplus degree is an index of a degree of the braking force which can be applied to the wheel.

Here, in the case of applying the second aspect to the invention of the first aspect, it is possible to more accurately calculate the maximum braking force by using the vehicle speed calculated by the vehicle speed calculating means.

As mentioned above, in accordance with the second aspect of the present invention, since the surplus degree of the braking force can be known, it is possible to stably run the vehicle by controlling in such a manner as to preferentially divide the braking force and the driving torque to the wheel having a high surplus degree.

In order to achieve the object mentioned above, a second invention comprises first detecting means for detecting a first physical amount expressing a braking condition of a wheel of a vehicle;

second detecting means for detecting a vehicle speed of said vehicle;

third detecting means for detecting a second physical amount which represents slipperiness of said wheel and which is determined in accordance with a road surface condition on which said wheel is running, said first physical amount, and said vehicle speed;

calculating means for calculating said second physical amount for each of a plurality of predetermined road surface conditions on the basis of said first physical amount and said vehicle speed;

comparing means for comparing a detected track of said second physical amount detected by said third detecting means with respect to said first physical amount with each of calculated tracks of said second physical amounts calculated for each of the plurality of road surface conditions by said calculating means with respect to said first physical amount; and estimating means for estimating a road surface condition corresponding to a track closest to said detected track among said calculated tracks as an actual road surface condition in which said wheel is running on the basis of the comparison results of said comparing means.

The first detecting means detects the first physical amount expressing the braking condition for the wheel of the vehicle. Here, the first physical amounts include the braking force to the wheel and the slip speed.

The second detecting means detects the speed of the vehicle (the vehicle speed).

The third detecting means detects the second physical amount expressing the slipperiness of the wheel. The second physical amoun this defined incorrespondence to the road-surface condition in which the wheel is running, the first physical amount and the speed of the vehicle. Concretely speaking, the second physical amount is a gradient of a coefficient of friction $\mu$ between the road surface and the wheel or of a braking force or the braking torque against the wheel with respect to the slip speed. Accordingly, when the gradients are steep, the peripheral speed of the wheel is high and the wheel is hard to slip. On the contrary, when the gradients are gentle, the peripheral speed of the wheel is low, and the wheel is easy to slip. Accordingly, these gradients express the slipperiness of the wheel.

The calculating means calculates the second physical amount for each of a plurality of predetermined road surface conditions on the basis of the first physical amount detected by the first detecting means and the vehicle speed detected by the second detecting means. The calculating means may previously calculate the relation defined in correspondence to the vehicle speed between the first physical amount and the third physical amount for computing the second physical amount for each of a plurality of road surface conditions, may calculate the third physical amount for each of a plurality of road surface conditions on the basis of the detected first physical amount and the detected vehicle speed, and may calculate the second physical amount for each of a plurality of road surface conditions from the calculated third physical amount. Further, the calculating means may previously calculate the relation defined in correspondence to the vehicle speed between the first physical amount and the second physical amount for each of a plurality of road surface conditions, and may calculate the second physical amount for each of a plurality of road surface conditions on the basis of the detected first physical amount and the vehicle speed.

The comparing means compares the track of the second physical amount detected by the third detecting means with respect to the first physical amount expressing the braking condition of the wheel with each of tracks of the second physical amounts calculated for each of a plurality of road surface conditions by the calculating means with respect to the first physical amount. The estimating means estimates the road surface condition corresponding to the track closest to the detected track among the calculated tracks as the actual road surface condition in which the wheel is running on the basis of the comparison result of the comparing means.

As mentioned above, the second physical amount is detected and the track of the detected second physical amount is compared with each of the tracks of the second physical amount calculated in correspondence to each of a plurality of road surface conditions. Accordingly, the road surface condition corresponding to the selected track corresponds to the actual road surface condition in which the wheel is running when selecting the track closest to the detected track among the tracks calculated in correspondence to each of a plurality of road surface conditions on the basis of the comparison result. Thus, that it is possible to accurately estimate the actual road surface condition.

In this case, the second physical amount mentioned above includes an error due to various causes.

Accordingly, said first detecting means, said second detecting means and said third detecting means respectively detect the first physical amount, the vehicle speed, and the second physical amount at each predetermined time from the time braking is started on a wheel,
   said calculating means calculates the second physical amount for each of a plurality of road surface conditions at each time the first physical amount changes by a predetermined amount from the time braking is started on the wheel, and
   said comparing means compares the second physical amount detected at said predetermined time, with each of the second physical amounts calculated for each of the plurality of road surface conditions and at each time the first physical amount changes by a predetermined amount, at each time the first physical amount changes by a predetermined amount from the time braking is started on a wheel.

As a result, said comparing means compares the second physical amount detected at said predetermined time, with each of the second physical amounts calculated for each of the plurality of road surface conditions and at each time the first physical amount changes by a predetermined amount, at each time the first physical amount changes by a predetermined amount from the time braking is started on a wheel, it is possible to reduce an influence due to the error, so that it is possible to more accurately estimate the road surface condition.

In order to achieve the object mentioned above, a third invention comprises first detecting means for detecting a first physical amount expressing a braking condition or a driving condition of a wheel of a vehicle;
   second detecting means for detecting a second physical amount which represents slipperiness of said wheel and varies in accordance with a change in said first physical amount; and
   reduction processing means for reducing variations in the second physical amount in accordance with said change in the first physical amount.

The first detecting means detects the first physical amount expressing the braking condition or the driving condition of the wheel in the vehicle. In this case, the first physical amount includes the braking force against the wheel and the slip speed.

The second detecting means detects the second physical amount expressing the slipperiness of the wheel. The second physical amount is concretely a gradient of a coefficient of friction $\mu$ between the road surface and the wheel or of the braking torque or of the braking force against the wheel with respect to the slip speed. Accordingly, when these gradients are sleep, the peripheral speed of the wheel is great and it is hard to slip. On the contrary, when these gradients are gentle, the peripheral speed of the wheel is small and it is easy to slip. Accordingly, these gradients express the slipperiness of the wheel.

In this case, a plurality of parameters for expressing the second physical amount, for example, the relation between the slip speed mentioned above and the coefficient of friction $\mu$ mentioned above, has a swirl of a small hysteresis as the first physical amount, for example, the braking force or the like increases as mentioned above. Accordingly, the second physical amount detected by the second detecting means greatly varies in correspondence to the change of the first physical amount.

Considering the fact that the variation of this kind is caused by the change of the first physical amount, in order to reduce the variation, it is sufficient to reduce it in correspondence to the change of the first physical amount.

Then, the reduction processing means in accordance with the present invention is structured such as to reduce the variation in the second physical amount detected by the second detecting means in correspondence to the change of the first physical amount detected by the first detecting means. In this case, the reduction process may be performed, for example, by filtering at each time when the first physical amount changes by a predetermined amount or by averaging the second physical amount while the first physical amount changes by a predetermined amount.

As mentioned above, since the variation in the second physical amount expressing the slipperiness of the wheel due to the change of the first physical amount expressing the braking condition or the driving condition of the wheel in the vehicle is reduced in correspondence to the change of the first physical amount, it is possible to reduce the variation in the second physical amount.

In this case, since the second physical amount mentioned above is used in the road surface condition estimating apparatus, the ABS apparatus, the driving force controlling apparatus and the like, the third invention mentioned above can be also applied to the road surface condition estimating apparatus, the ABS apparatus, the driving force controlling apparatus and the like.

An invention to which the third invention estimating apparatus will be explained as follows.

The present invention comprises first detecting means for detecting a first physical amount expressing a brake condition or a driving condition of a wheel of a vehicle;
   second detecting means for detecting a vehicle speed of said vehicle;
   third detecting means for detecting a second physical amount which represents slipperiness and which is determined in accordance with a road surface condition on which said wheel is running, said first physical amount, and said vehicle;
   reduction processing means for reducing variations in the second physical amount detected by said third detecting means in accordance with a change in said first physical amount;
   calculating means for calculating the second physical amount for each of a plurality of predetermined road surface conditions on the basis of the first physical amount and the vehicle speed;
   comparing means for comparing a detected track of the second physical amount in which variation is reduced by said reduction processing means with respect to the first physical amount with each of calculated tracks of the second physical amount calculated for each of the plurality of road surface conditions by said calculating means with respect to said first physical amount; and
   estimating means for estimating a road surface condition corresponding to a track closest to said detected track among said calculated tracks as an actual road surface condition on which said wheel is running on the basis of the comparison result of said comparing means.

The first detecting means detects the first physical amount expressing the braking condition or the driving condition of the wheel of the vehicle, the second detecting means detects the speed of the vehicle (the vehicle speed) and the third detecting means detects the second physical amount expressing the slipperiness of the wheel. The second physical amount is defined by the road surface condition in which the wheel is running, the first physical amount and the vehicle speed. Concretely speaking, the second physical amount is a gradient of the coefficient of friction $\mu$ between the road surface and the wheel or the wheel, or a gradient of the braking torque or of the braking force with respect to the slip speed, as mentioned above.

The reduction processing means reduces the variation in the second physical amount in correspondence to the change of the first physical amount detected by the first detecting means, as mentioned above.

The calculating means calculates the second physical amount for each of a plurality of predetermined road surface conditions on the basis of the first physical amount detected by the first detecting means and the vehicle speed detected by the second detecting means. The calculating means may previously calculate the relation defined in correspondence to the vehicle speed between the first physical amount and the third physical amount for calculating the second physical amount for each of a plurality of road surface conditions, may calculate the third physical amount for each of a plurality of road surface conditions on the basis of the detected first physical amount and the detected vehicle speed, and may calculate the second physical amount for each of a plurality of road surface conditions from the calculated third physical amount. Further, the calculating means may previously calculate the relation defined in correspondence to the vehicle speed between the first physical amount and the second physical amount for each of a plurality of road surface conditions, and may calculate the second physical amount for each of a plurality of road surface conditions on the basis of the detected first physical amount and the vehicle speed.

The comparing means compares the track of the second physical amount in which the variation is reduced by the reduction processing means with respect to the first physical amount expressing the braking condition or the driving condition of the wheel with each of the tracks of the second physical amounts calculated for each of a plurality of road surface conditions by the calculating means with respect to the first physical amount. The estimating means estimates the road surface condition corresponding to the track closest to the detected track among the calculated tracks as the actual road surface condition in which the wheel is running, on the basis of the comparison result of the comparing means.

As mentioned above, the second physical amount in which the variation is reduced in correspondence to the change of the first physical amount is detected and the track of the detected second physical amount is compared with each of the tracks of the calculated second physical amount calculated in correspondence to each of a plurality of road surface conditions. Accordingly, the road surface condition corresponding to the selected track corresponds to the actual road surface condition in which the wheel is running when selecting the track closest to the detected track among the tracks calculated in correspondence to each of a plurality of road surface conditions on the basis of the comparison result. Thus, it is possible to accurately estimate the actual road surface condition.

In this case, the second physical amount mentioned above includes an error due to various causes.

The first detecting means, the second detecting means and the third detecting means respectively detect the first physical amount, the vehicle speed and the second physical amount at each predetermined time from the time the braking is started against the wheel, and the calculating means calculates the second physical amount for each of a plurality of road surface conditions at each time the first physical amount changes by a predetermined amount from the time the braking is started against the wheel.

Then, at each time the first physical amount changes by a predetermined amount from the time the braking is started against the wheel, the comparing means may compare the second physical amount detected at the predetermined time with each of the second physical amounts calculated for each of the plurality of road surface conditions at each time the first physical amount changes by a predetermined amount.

As a result, it is possible to reduce an influence due to the error, so that it is possible to more accurately estimate the road surface condition.

BRIEF DESCRIPTION OF THE DRAWINGS

FIGS. 2A to 2C are graphs which show a correlation between wheel motion amounts expressing a characteristic of a road surface $\mu$, in which FIG. 2A shows a relation between a slip ratio and the road surface $\mu$, FIG. 2B shows a relation between the slip ratio and a braking force and FIG. 2C shows a relation between the braking force for each of the vehicle speeds and a gradient $G_d$ of the road surface $\mu$.

FIG. 3 is a block diagram which shows a schematic structure of a road surface condition estimating apparatus in accordance with the present invention (corresponding to a second embodiment).

FIG. 4 is a graph which shows a relation between a braking force $P_c$ and a slip speed $\Delta v$ for each of the road surface conditions and for each of the vehicle speeds.

FIG. 5A is a graph for a dry road surface and FIG. 5B is a graph for a snow covered road surface.

FIG. 6A is a graph for a dry road surface and FIG. 6B is a graph for a snow covered road surface.

FIGS. 7A to 7C are graphs which show a relation between the braking force $P_c$ and the gradient $G_d$ of the road surface $\mu$ for each vehicle speed and road surface condition obtained on the basis of FIGS. 6A and 6B. FIG. 7A is a graph in the case of the vehicle speed V=20 km/h, FIG. 7B is a graph in the case of the vehicle speed V=40 km/h, and FIG. 7C is a graph in the case of the vehicle speed V=60 km/h.

FIG. 9A is a graph in the case of the vehicle speed V=40 km/h and FIG. 9B is a graph in the case of the vehicle speed V=60 km/h.

FIG. 16 is a schematic view which shows an equivalent model of a vibration system constituted by a wheel, a vehicle body and a road surface.

FIG. 21 is a graph which shows a characteristic of a coefficient of friction $\mu$ between a tire and a road surface with respect to a slip ratio $\lambda$.

FIG. 22 is a block diagram which shows a road surface condition estimating apparatus in accordance with a fourth embodiment.

FIG. 40 is a graph which shows a characteristic of the coefficient of friction $\mu$ between the tire and the road surface with respect to the slip speed in a micro manner.

FIG. 41 is a graph which shows a characteristic of the resonance gain calculated in the resonance gain calculating portion with respect to the braking force.

DESCRIPTION OF THE PREFERRED EMBODIMENTS

Each of embodiments of a road surface condition estimating apparatus in accordance with the present invention will be described in detail below with reference to the drawings. Here, in the embodiments, it is supposed that the road surface condition estimating apparatus is applied to a vehicle.

(First Embodiment)

Figure 10:
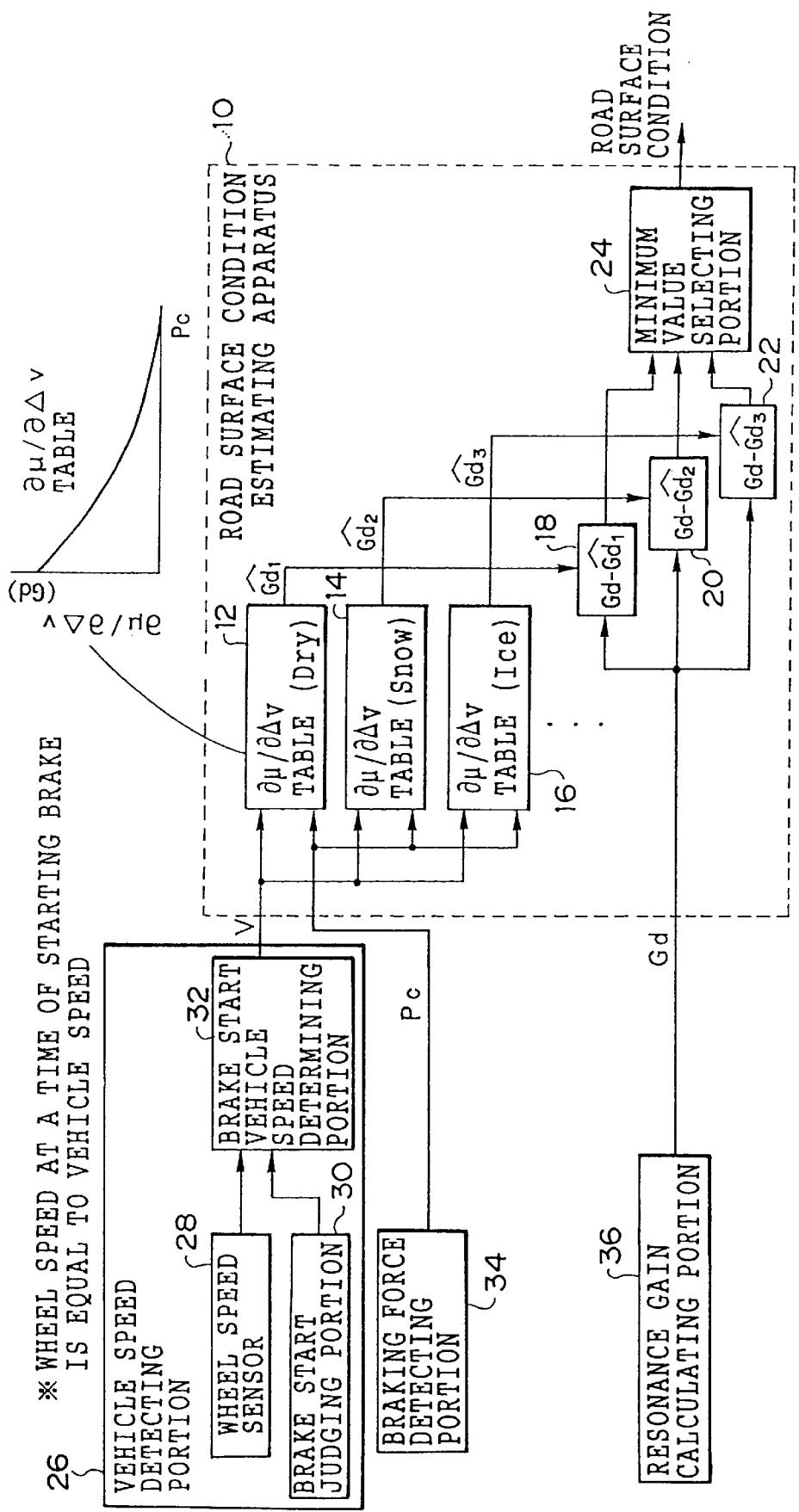
FIG. 10 is a block diagram which shows a structure of the road surface condition estimating apparatus in accordance with the first embodiment of the present invention (a first example)

FIG. 10 shows a block diagram of a structure of the road surface condition estimating apparatus in accordance with the first embodiment of the present invention. In this case, the structure of the first embodiment is obtained by embodying the schematic structure shown in FIG. 1.

As shown in FIG. 10, the road surface condition estimating apparatus 10 in accordance with the first embodiment is provided with converting portions 12, 14 and 16 which respectively store a $\partial\mu/\partial\Delta v$ table showing a relation among three wheel motion amounts, that is, a gradient $\partial\mu/\partial\Delta v$ (which is supposed to be a resonance gain $G_d$ in the case of this embodiment) of a road surface $\mu$ with respect to a slip speed $\Delta v$ (or a slip ratio), a braking force $P_c$, and a vehicle speed V for each of the road surface conditions, i.e. a dry road surface (Dry), a snow covered road surface (Snow) and an ice covered road surface (Ice).

When the vehicle speed and the braking force are input, the converting portions 12, 14 and 16 respectively output resonance gains $G_{d1}$, $G_{d2}$ and $G_{d3}$ (although in FIG. 10, a mark Λ showing an estimation is attached, in the following description the mark Λ is omitted) corresponding to the input values on the basis of a table (refer to FIG. 2C) in connection to a function stored therein.

In this case, the converting portions can be constructed as a ROM which previously stores all the converted values with respect to the input values in a predetermined range, and outputs the converted value corresponding to the data value input thereto. Further, the converting portions can be constituted as a neutral network which can learn a non-linear function such as the ∂μ/∂Δv table, an application filter or the like.

Further, the road surface condition estimating apparatus 10 is provided with subtracting devices 18, 20 and 22 for respectively calculating differences $G_d-G_{d1}$, $G_d-G_{d2}$ and $G_d-G_{d3}$ by respectively subtracting a resonance gain $G_{d1}$, $G_{d2}$ and $G_{d3}$ converted by the converting portions 12, 14 and 16 from a detected value $G_d$ of a resonance gain input to the apparatus 10.

Still further, the road surface condition estimating apparatus 10 is provided with a minimum value selecting portion 24 for selecting a minimum value among absolute vales of the differences respectively calculated by the subtracting devices 18, 20 and 22. The minimum value selecting portion 24 specifies a converting portion outputting the resonance gain which gives the minimum value, and outputs an information of the road surface condition corresponding to this converting portion.

Figure 1:
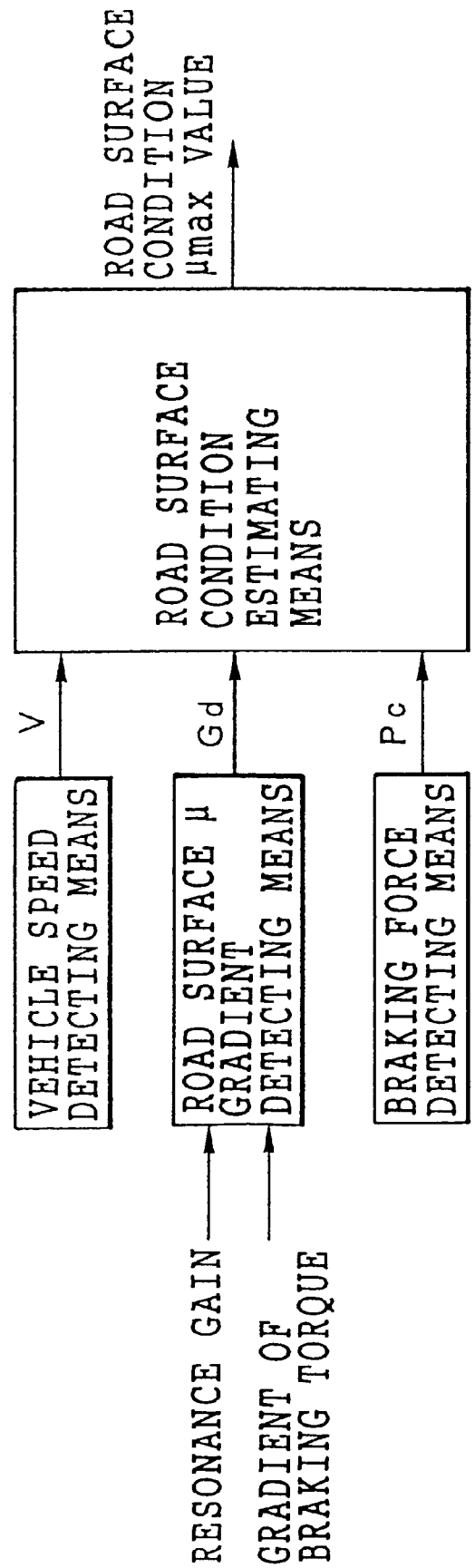
FIG. 1 is a block diagram which shows a schematic structure of a road surface condition estimating apparatus in accordance with the present invention (corresponding to a first embodiment).
Figure 5B:
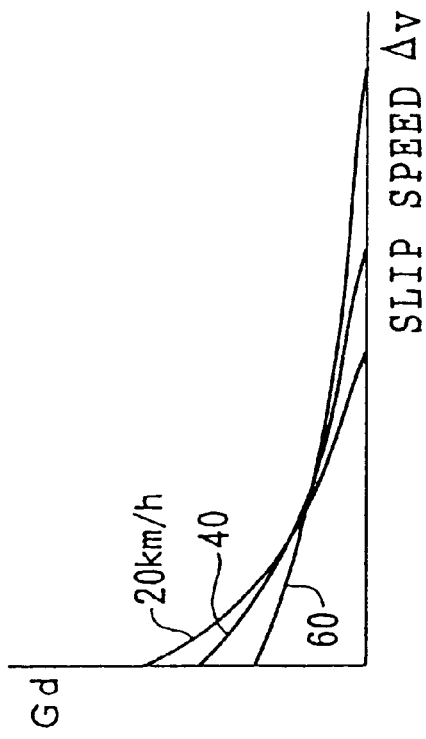
FIGS. 5A and 5B are graphs which show a relation between a slip speed $\Delta v$ and a gradient $G_d$ of the road surface $\mu$ for each road surface condition and for each vehicle speed.
Figure 5A:
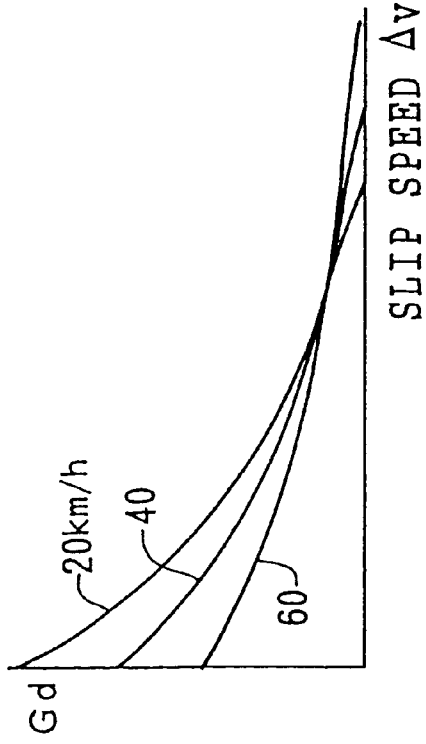

Furthermore, a vehicle speed detecting portion 26 for detecting vehicle speed, a braking force detecting portion 34 for detecting a braking force acting on the wheel and a resonance gain calculating portion 36 as road surface μ gradient detecting means in FIG. 1 are provided in an outer portion of the road surface condition estimating apparatus 10. The vehicle speed detecting portion 26 and the braking force detecting portion 34 are respectively connected to the converting portions 12, 14 and 16, and the resonance gain calculating portion 36 is respectively connected to the subtracting devices 18, 20 and 22.

Among them, the vehicle speed detecting portion 26 is constituted by a wheel speed sensor 28 for detecting the wheel speed, a brake start judging portion 30 for judging a time when the driver presses the brake pedal as the brake start point, and a brake start vehicle speed determining portion 32 for outputting a wheel speed $V_w$ detected at the judged brake start point as vehicle speed V. Thus, in the vehicle speed detecting portion 26 in accordance with this embodiment, the vehicle speed is estimated by supposing that the wheel speed at a time of starting the brake substantially equals to the vehicle speed. Alternatively, the vehicle speed detecting portion 26 may be structured as a vehicle speed sensor for directly detecting the vehicle speed.

Further, the braking force detecting portion 34 estimates the braking force acting on the wheel from the road surface as a friction force in the following manner in accordance with a mechanical model of the wheel.

A braking torque $T_B$ acting on the wheel to an opposite direction to the rotating direction of the wheel and a tire torque $T_f$ applied by a braking force F acting on the wheel as a friction force to a rotating direction of the wheel act on the wheel. The braking torque $T_B$ is caused by a braking force acting on the brake disc of the wheel in such a manner as to prevent the wheel from rotating, and the braking force F and the tire torque $T_f$ can be expressed by the following formula when a coefficient of friction between the wheel and the road surface is set to be $\mu_B$, a radius of the wheel is set to be r and a wheel load is set to be W.

$$F=\mu_B W$$
$$T_f=F \times r = \mu_B W r$$

Accordingly, an equation of motion of the wheel is expressed as follows.

$$I\frac{d\omega}{dt}=\mu_B W r - T_B = F r - T_B \quad (15)$$

in which reference symbol I is a moment of inertia of the wheel and ω is a rotational speed of the wheel (a wheel speed).

By detecting the wheel acceleration (dω/dt) and calculating the braking torque $T_B$ on the basis of a wheel cylinder pressure applied to the brake disc, the braking force F can be estimated on the basis of the formula (15). Concretely speaking, it is constructed by setting a driving torque of the wheel calculated from an acceleration opening degree and the like, and a mechanical model equivalent to the formula (15) in which the braking force F as a disturbance acts on the wheel to be an observer. In this observer, the disturbance of the equivalent model and the rotational speed are modified at every control periods so that a deviation between the rotational position obtained by integrating the formula (15) for two stages and the rotational position actually detected equal zero, and the modified disturbance is estimated as the braking force.

Figure 15:
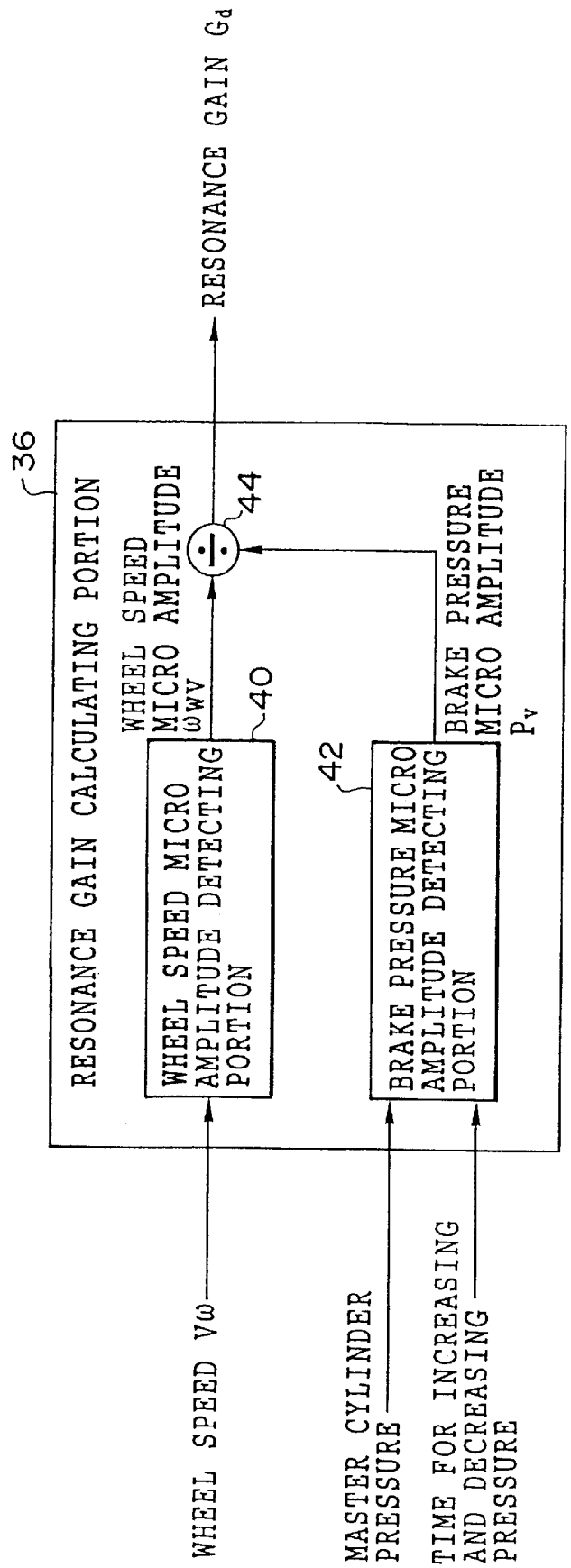
FIG. 15 is a block diagram which shows a structure of a resonance gain calculating portion in accordance with an embodiment of the present invention.
Figure 17:
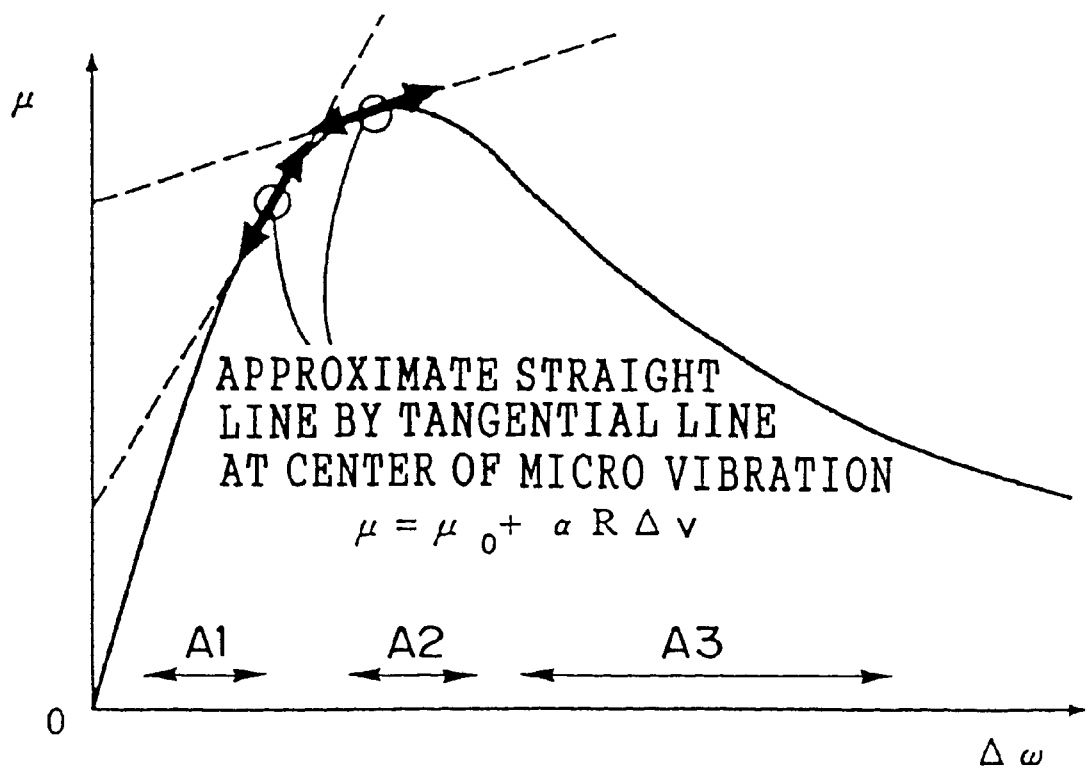
FIG. 17 is a schematic view which shows a change characteristic of a change in a coefficient of friction $\mu$ with respect to the slip speed and in order to explain that a resonance gain is equivalent to a braking torque gradient, also shows that a change of $\mu$ around a center of a micro vibration can be approximated by a straight line.

Further, the resonance gain calculating portion 36 is constituted by a wheel speed micro amplitude detecting portion 40 for detecting a micro amplitude of a resonance frequency ω∞ of the wheel speed $V_w$ (a wheel speed micro amplitude $\omega_{wv}$) at a time of minutely vibrating the braking pressure at a resonance frequency ω∞ (the formula (3)) in the vibration system comprising the vehicle body, the wheel and the road surface around an average braking pressure, braking pressure micro amplitude detecting portion 42 for detecting a micro amplitude $P_v$ of the braking pressure at the resonance frequency ω∞, and a dividing device 44 for outputting a resonance gain $G_d$ obtained by dividing a detected wheel speed micro amplitude $\omega_{wv}$ by the braking pressure micro amplitude $P_v$, as shown in FIG. 15.

Among them, the wheel speed micro amplitude detecting portion 40 can be realized as a calculating portion for performing a filter treatment for extracting a vibration component of the resonance frequency ω∞. For example, since the resonance frequency ω∞ of the vibration system is about 40 Hz, a period is set to be 24 ms and about 41.7 Hz considering controllability the above, a band-pass filter having a central frequency of this frequency is provided, and full wave of the filter output are rectified and made smooth to a direct current, thereby outputting the wheel speed micro amplitude. Further, the structure can be realized so as to continuously take in the time series data of integral times of the period, for example, 24 ms of a period and 48 ms of two periods and calculate the correlation between a unit sine wave and a unit cosine wave of 41.7 Hz.

Figure 18:
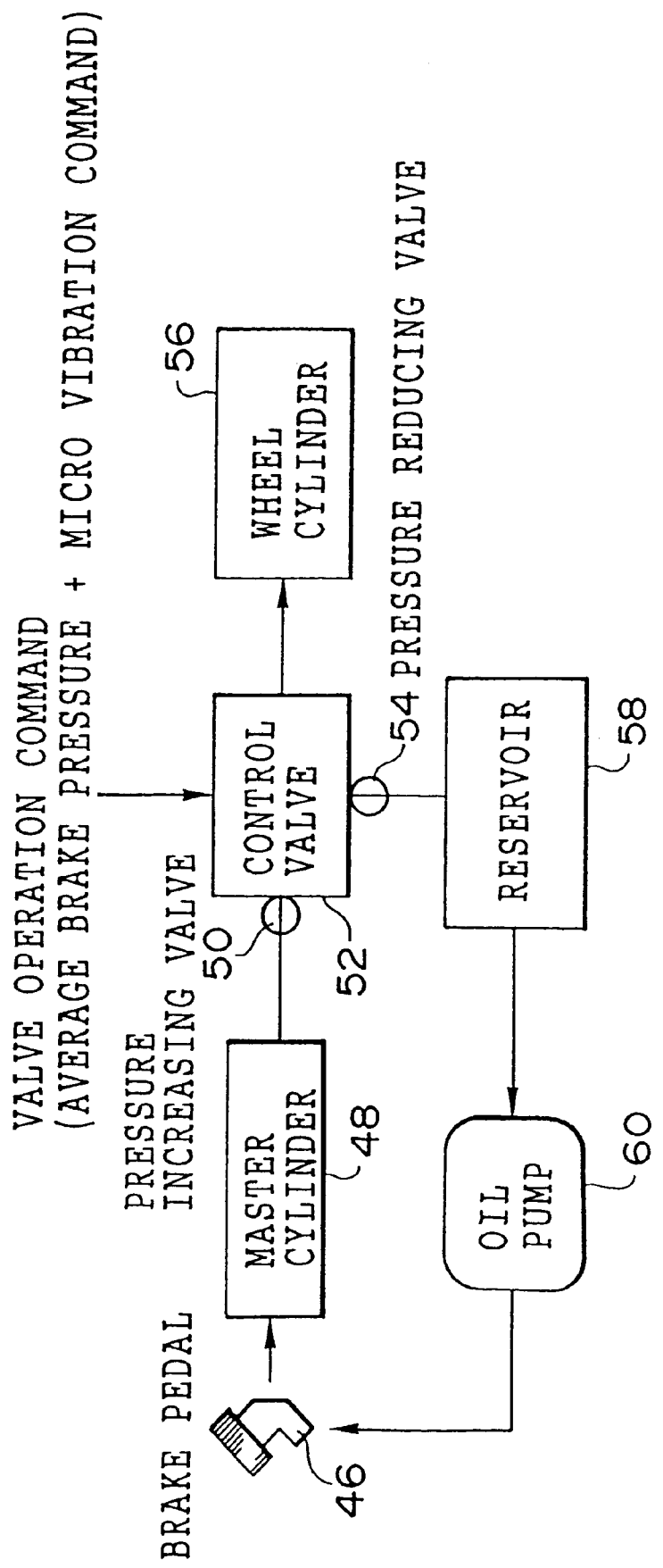
FIG. 18 is a block diagram which shows a hardware structure of a brake portion.

Here, micro vibration means for applying the braking pressure micro amplitude $P_v$ having the resonance frequency around an average braking pressure $P_m$ will be described below. At first, a portion for converting the average braking pressure command and the micro vibration command into the actual braking torque to a wheel(a valve control system) comprises a master cylinder 48, a control valve 52, a wheel cylinder 56, a reservoir 58 and an oil pump 60, as shown in FIG. 18.

Among them, the brake pedal 46 is connected to a pressure increasing valve 50 of the control valve 52 via the master cylinder 48 which increases a pressure in correspondence to a stepping force applied to the brake pedal 46. Further, the control valve 52 is connected to the reservoir 58 serving as a low pressure source via the pressure reducing valve 54. Still further, a wheel cylinder 56 for applying a braking pressure supplied by the control valve to the brake disc is connected to the control valve 52. The control valve 52 controls opening and closing of the pressure increasing valve 50 and the pressure reducing valve 54 on the basis of an input valve operation command.

In this case, when the control valve 52 is controlled to open only the pressure increasing valve 50, a hydraulic pressure of the wheel cylinder 56 (a wheel cylinder pressure) is increased to a hydraulic pressure of the master cylinder 48 (a master cylinder pressure) which is in proportion to the pressure obtained by stepping the brake pedal 46 by the driver. On the contrary, when the control is performed so as to open only the pressure reducing valve 54, the wheel cylinder pressure is decreased to a pressure of the reservoir 58 (a reservoir pressure) which substantially corresponds to an atmospheric pressure. Further, when the control is made so as to close both of the valves, the wheel cylinder pressure is maintained.

The braking force applied to the brake disc from the wheel cylinder 56 (corresponding to the wheel cylinder pressure) can be calculated by a rate among a pressure increasing time for supplying a high hydraulic pressure of the master cylinder 48, a pressure reducing time for supplying a low hydraulic pressure of the reservoir 58 and a maintaining time for holding the supply hydraulic pressure, the master cylinder pressure detected by the pressure sensor or the like, and the reservoir pressure.

Accordingly, a desired braking torque can be realized by controlling the pressure increasing and reducing times of the control valve 52 in accordance with the master cylinder pressure. Then, a micro vibration of the braking pressure can be realized by performing the pressure increasing and reducing control at a period corresponding to the resonance frequency at the same time of the pressure increasing and reducing control of the control valve 52 realizing the average braking force.

Figure 19:
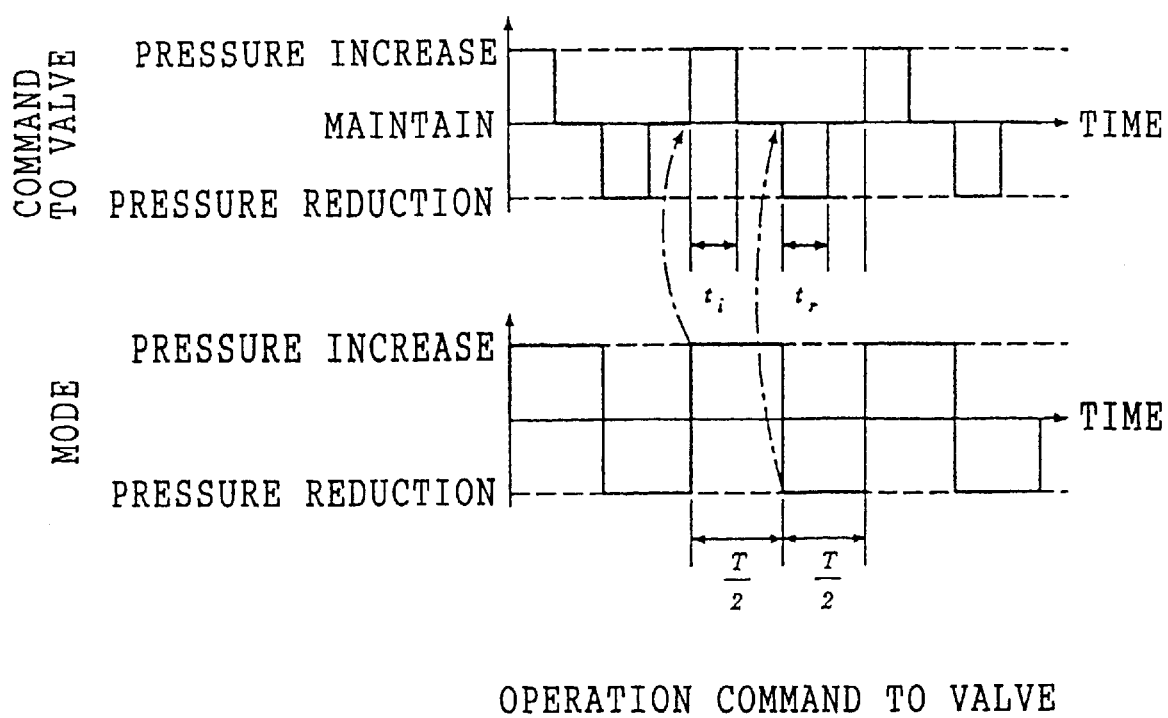
FIG. 19 is a schematic view which shows a command to a control valve in the case of simultaneously performing micro vibration of a braking pressure and control of an average braking force.

As the contents of a concrete control, as shown in FIG. 19, respective modes comprising a pressure increasing mode and a pressure reducing mode are switched at every half period T/2 of the period of the micro vibration (for example, 24 ms), a pressure increasing command and a pressure reducing command are output to the valve for the respective time of the pressure increasing time $t_i$ and the pressure reducing time $t_r$ from a moment of switching the mode, and a pressure holding command is output for the remaining time. The average braking force is defined by the rate between the pressure increasing time $t_i$ and the pressure reducing time $t_r$ in correspondence to the master cylinder pressure, and the micro vibration is applied around the average braking force by switching the pressure increasing and pressure reducing modes at every half period T/2 corresponding to the resonance frequency.

In this case, since the braking pressure micro amplitude $P_v$ is defined by the master cylinder pressure, a time length of the pressure increasing time $t_i$ and the time length of the pressure reducing time $t_r$ of the valve shown in FIG. 19 in accordance with a predetermined relation, the braking pressure micro amplitude detecting portion 42 shown in FIG. 15 can be structured as a table for outputting the braking pressure micro amplitude $P_v$ from the master cylinder pressure, the pressure increasing time $t_i$ and the pressure reducing time $t_r$.

Figure 14:
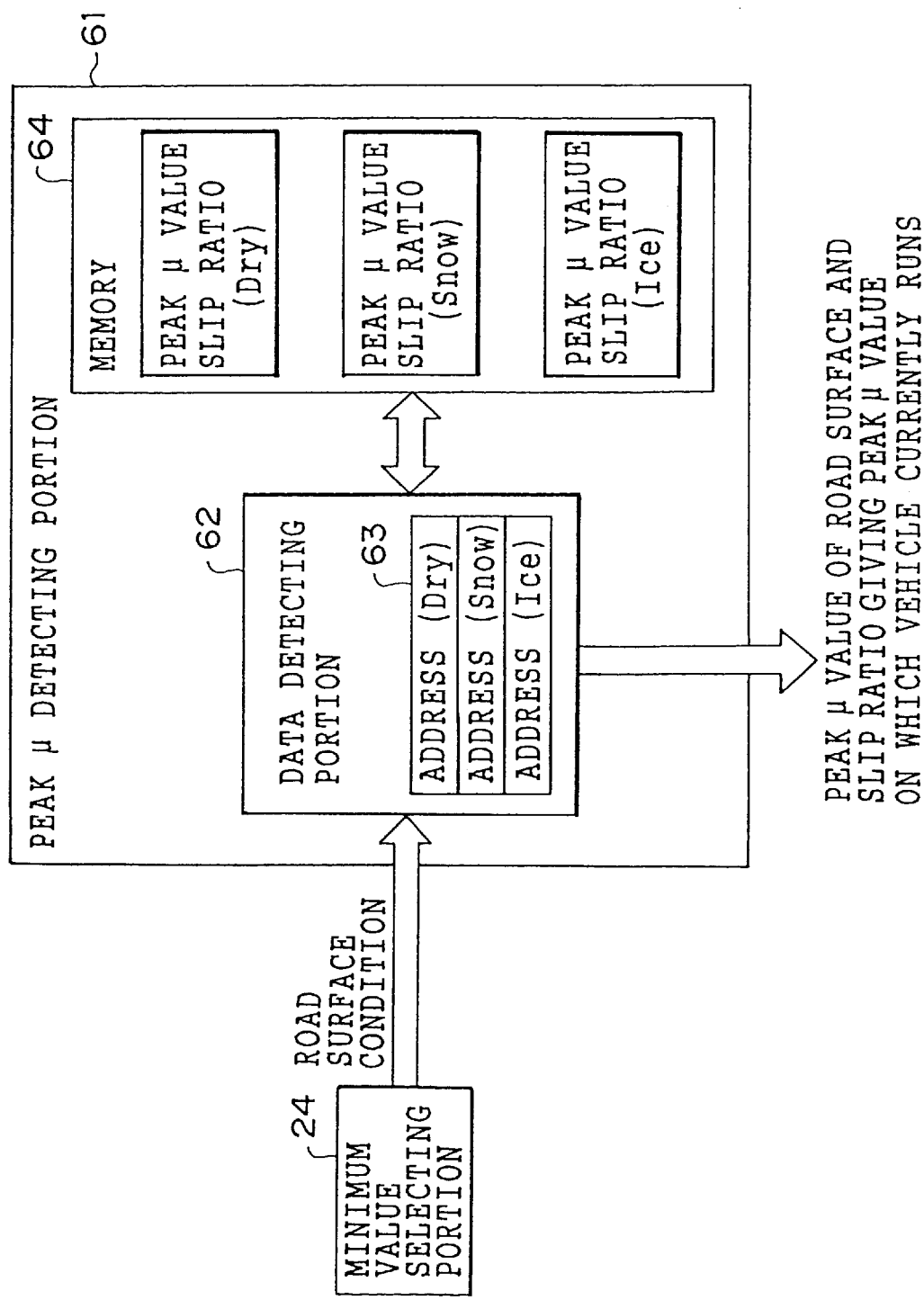
FIG. 14 is a block diagram which shows a structure of a peak μ searching portion in accordance with an embodiment of the present invention.

Further, the road surface condition estimating apparatus 10 in accordance with the first embodiment is provided with a peak $\mu$ searching portion 61 as shown in FIG. 14. The peak $\mu$ searching portion 61 is constituted by a memory 64 for storing the data of the peak $\mu$ value for every road surface condition and the slip ratio giving the peak $\mu$ value, and a data searching portion 62 for searching the data in the memory 64 on the basis of an address table 63 showing an address of the data for each of the road surface conditions.

Next, an operation of the first embodiment will be described below.

When the vehicle speed V detected by the vehicle speed detecting portion 26 and the braking force $P_c$ detected by the braking force detecting portion 34 are input to each of the converting portions 12, 14 and 16 of the road surface condition estimating apparatus 10, each of the converting portions converts two input detected values in accordance with the $\partial\mu/\partial\Delta_v$ table given to each of them, and outputs each of the resonance gains $G_{d1}$, $G_{d2}$ and $G_{d3}$ corresponding to these detected values.

When the resonance gain $G_d$ calculated by the resonance gain calculating portion 36 is respectively input to the subtracting devices 18, 19 and 20 together with the respective converted resonance gains $G_{d1}$, $G_{d2}$ and $G_{d3}$, these subtracting devices respectively calculate the differences $G_d-G_{d1}$, $G_d-G_{d2}$ and $G_d-G_{d3}$ and output them to the minimum value selecting portion 24.

The minimum value selecting portion 24 selects the difference having the smallest absolute value among the calculated differences, and specifies the converting portion which gives the selected minimum absolute difference. Then, the road surface condition corresponding to the specified converting portion is output as an information code of a predetermined type or the like. The information code expressed by the type corresponds to any of Dry, Snow and Ice, and is expressed by a type which the control portion of the vehicle employing the road surface condition estimating apparatus 10 can recognize. For example, in the case that $G_d-G_{d3}$ becomes the minimum value, the information code having the road surface condition of "Ice" is output.

Since the $\partial\mu/\partial\Delta v$ table expressing the correlation among the vehicle speed, the braking force and the resonance gain precisely shows the road surface $\mu$ characteristic, the road surface condition can be estimated in a significantly accurate manner by comparing the relation between the respective wheel motion amounts which the $\partial\mu/\partial\Delta v$ table shows in accordance with the present invention with the relation between the actual detected values. Further, in accordance with this embodiment, since the resonance gain $G_d$ that sensitively expresses the friction state on the basis of the resonance characteristic in the vibration system is employed, in comparison with the case of using other wheel motion amounts, the road surface condition can be more accurately estimated.

Further, in the peak $\mu$ searching portion 61, the data searching portion 62 interprets the information code of the road surface condition output by the minimum value selecting portion 24 and reads out the address corresponding to the information code from the address table 63. Then, the data searching portion 62 searches the peak $\mu$ value and the slip ratio of the corresponding address in the memory 64 and outputs them. Accordingly, the output data becomes the peak $\mu$ value of the road surface on which the vehicle currently runs, and the slip ratio which gives the peak $\mu$ value on the road surface.

As mentioned above, in accordance with this embodiment, since the road surface condition of the road surface on which the vehicle currently runs and the peak $\mu$ value can be accurately estimated, safe driving can be realized regardless of the road surface condition by employing the estimated result to the vehicle stabilizing control such as VSC, ABS, TRC and the like and the alarm to the driver.

Here, in the embodiment shown in FIG. 10, the vehicle speed, the braking force and the resonance gain are used as the wheel motion amounts. The present invention is not limited to this, however, for example, the structure may be made in a manner as shown in FIG. 11.

Figure 11:
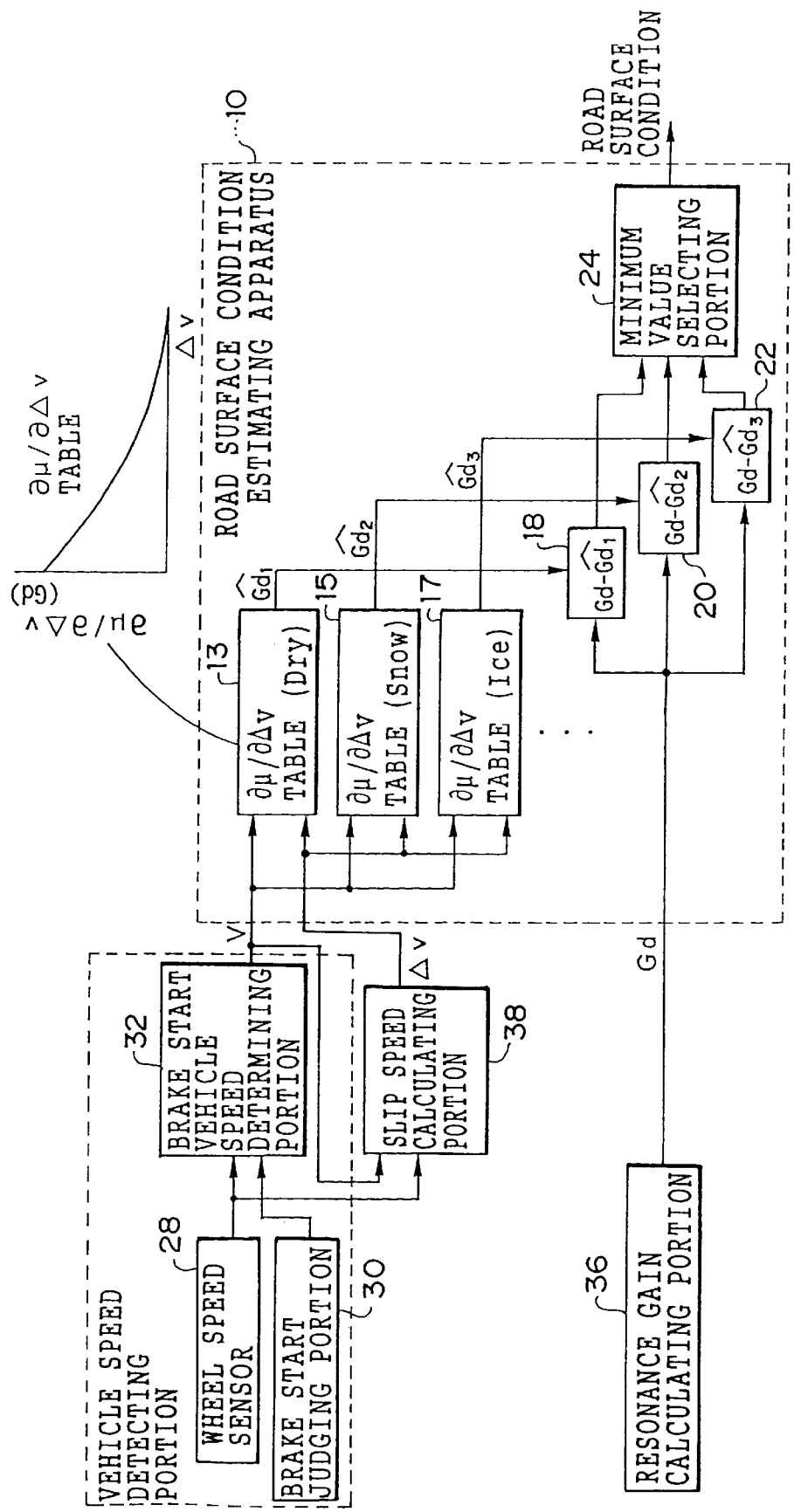
FIG. 11 is a block diagram which shows a structure of the road surface condition estimating apparatus in accordance with the first embodiment of the present invention (a second example).

In FIG. 11, the slip speed is used as one of the wheel motion amounts in place of the braking force. Accordingly, each of the converting portions 13, 15 and 17 shown in FIG. 11 is provided with a $\partial\mu/\partial\Delta v$ table showing a relation among the vehicle speed, the slip speed and the resonance gain. Then, in place of the braking force detecting portion 34, there is provided a slip speed calculating device 38 for calculating the slip speed from the wheel speed detected by the wheel speed sensor 28 and the vehicle speed determined by the brake start vehicle speed determining portion 32, and the slip speed calculating device 38 is connected to each of the converting portions 13, 15 and 17.

Also in the structure shown in FIG. 11, since the road surface $\mu$ characteristic can be expressed by the slip speed, the vehicle speed and the resonance gain, the road surface condition can be accurately estimated. Further, since the braking force detecting portion 34 is omitted and it is sufficient to provide the simple slip speed calculating device in place thereof, the whole apparatus can be made simple.

(Second Embodiment)

Figure 12:
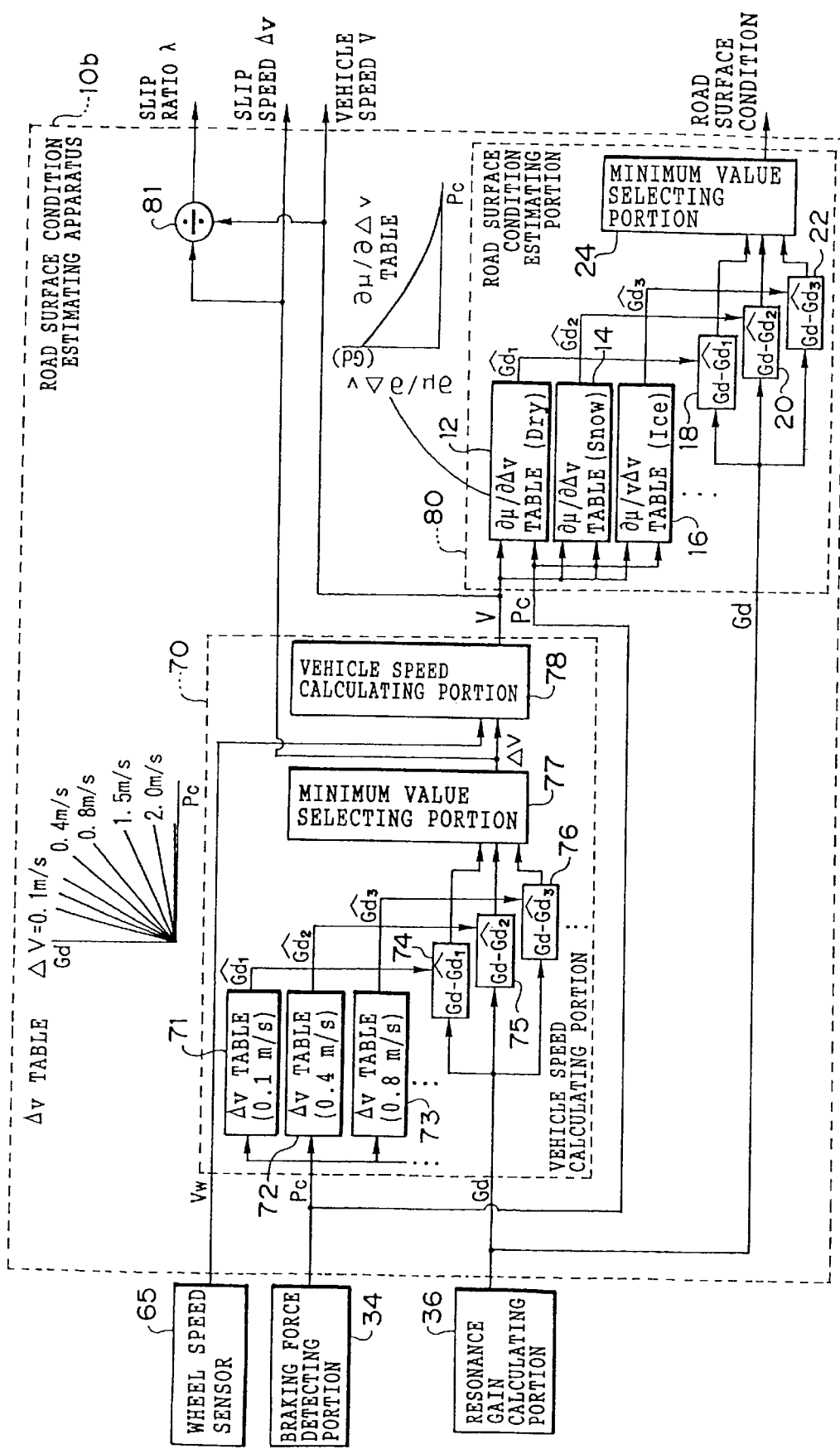
FIG. 12 is a block diagram which shows a structure of the road surface condition estimating apparatus in accordance with the second embodiment of the present invention.

FIG. 12 shows a block diagram of a structure of a road surface condition estimating apparatus in accordance with a second embodiment of the present invention embodying the schematic structure shown in FIG. 3. In this case, the same reference numerals are attached to the same elements as those in the first embodiment, and the detailed description thereof will be omitted.

As shown in FIG. 12, a road surface condition estimating apparatus 10b in accordance with the second embodiment is constituted by a vehicle speed calculating portion 70 for calculating the vehicle speed V from the wheel speed $V_w$ detected by the wheel speed sensor 65 and the braking force $P_c$ detected by the braking force detecting portion 34, and a road surface condition calculating portion 80 for calculating the road surface condition from the vehicle speed V calculated by the vehicle speed calculating portion 70, the detected braking force $P_c$ and the resonance gain $G_d$.

Among them, the vehicle speed calculating portion 70 is provided with converting portions 71, 72, 73, . . . for respectively storing a $\Delta v$ table showing a relation between the braking force and the resonance gain at each of fixed slip speeds (0.1 m/s, 0.4 m/s, 0.8 m/s, . . . ).

Figure 6A:
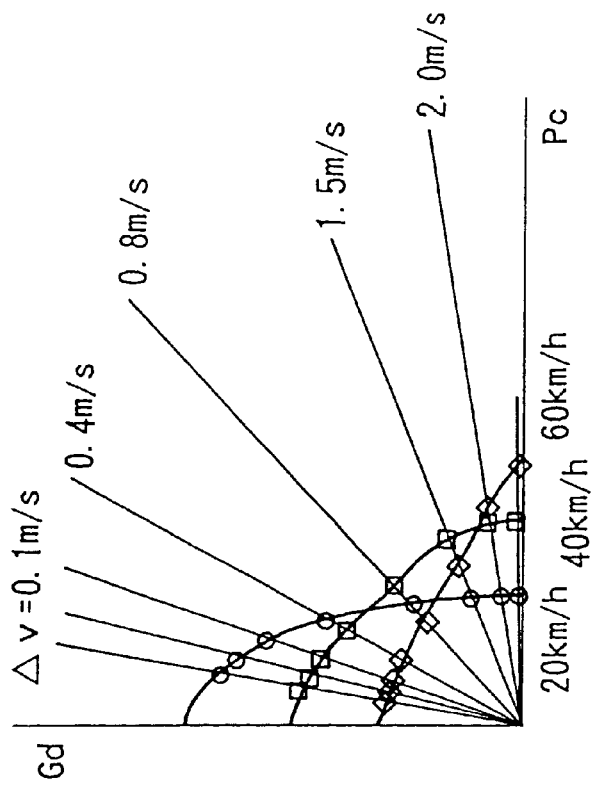
FIGS. 6A and 6B are graphs which show a relation between a braking force $P_c$ and the gradient $G_d$ of the road surface $\mu$ in the case of setting the slip speed $\Delta v$ as a parameter for each of the vehicle speeds.
Figure 6B:
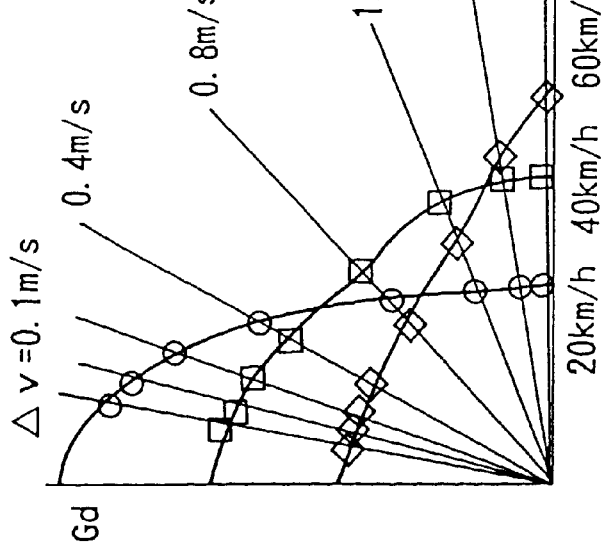

The converting portions 71, 72, 73, . . . respectively output the resonance gains $G_{d1}$, $G_{d2}$, $G_{d3}$, . . . (although in FIG. 12, a mark $\Lambda$ showing an estimation is attached, the mark $\Lambda$ is omitted in the following description) corresponding to the input value on the basis of the $\Delta v$ table (refer to FIGS. 6A and 6B) with respect to the function stored therein when the detected braking force is input.

Further, the vehicle speed estimating portion 70 is provided with subtracting devices 74, 75 and 76 for respectively calculating differences $G_d-G_{d1}$, $G_d-G_{d2}$, $G_d-G_{d3}$, . . . by respectively subtracting a resonance gain $G_{d1}$, $G_{d2}$, $G_{d3}$, . . . converted by the converting portions 71, 72, 73, . . . from a detected value $G_d$ of a resonance gain input to the apparatus 10b.

Still further, the vehicle speed estimating portion, 70 is provided with a minimum value selecting portion 77 for selecting a minimum value among absolute vales of the differences respective calculated by the subtracting devices 74, 75, 76, . . . . The minimum value selecting portion 77 specifies a converting portion outputting the resonance gain which gives the minimum value, and outputs a slip speed $\Delta v$ corresponding to the converting portion.

Furthermore, a vehicle speed calculating device 78 is connected to the minimum value selecting portion 77. The vehicle speed calculating device 78 calculates the vehicle speed V by adding the wheel speed $V_w$ detected by the wheel speed sensor 65 to the slip speed $\Delta v$ output from the minimum value selecting portion 77.

In this case, as shown in FIG. 12, it is also possible to output the slip speed $\Delta v$ output from the minimum value selecting portion 77 and the vehicle speed V calculated by the vehicle speed calculating device 78 to an outer portion of the road surface condition estimating apparatus 10b. Further, it is also possible to provide a dividing device 81 for outputting the slip ratio $\lambda$ by dividing the slip speed $\Delta v$ output from the minimum value selecting portion 77 by the vehicle speed V calculated by the vehicle speed calculating device 78.

The road surface condition calculating portion 81 in accordance with the second embodiment is structured in the same manner as the road surface condition estimating apparatus 10 shown in FIG. 10 except for using the vehicle speed calculated by the vehicle speed calculating portion 70, not by the vehicle speed detecting portion 26. Accordingly, the detailed description thereof will be omitted. In this case, it is possible to structure the road surface condition calculating portion 81 in such a manner as to use the vehicle speed and the slip speed as in the road surface condition estimating apparatus 10 shown in FIG. 11 and to input the vehicle speed V and the slip speed $\Delta v$ calculated by the vehicle speed calculating portion 70 into the road surface condition calculating portion 81.

Next, an operation of the second embodiment will be described below.

When the braking force $P_c$ detected by the braking force detecting portion 34 is input to each of the converting portions 71, 72, 73, . . . of the vehicle speed calculating portion 70, each of the converting portions converts the input detected values in accordance with the $\Delta v$ table given to each of them, and outputs each of the resonance gains $G_{d1}$, $G_{d2}$, $G_{d3}$, . . . corresponding to the detected values.

When the resonance gain $G_d$ calculated by the resonance gain calculating portion 36 are respectively input to the subtracting devices 74, 75, 76, . . . together with the converted resonance gains $G_{d1}$, $G_{d2}$, $G_{d3}$, . . . , these subtracting devices respectively calculate the differences $G_d-G_{d1}$, $G_d-G_{d2}$, $G_d-G_{d3}$, . . . and output them to the minimum value selecting portion 77.

The minimum value selecting portion 77 selects the difference having the smallest absolute value among the calculated differences, and specifies the converting portion which gives the selected minimum absolute difference. Then, the slip speed $\Delta v$ corresponding to the specified converting portion is output. For example, in the case that $G_d-G_{d2}$ becomes the minimum value, the slip speed is output as 0.4 m/s corresponding to the converting portion 72.

Then, the vehicle speed calculating device 78 calculates the vehicle speed V by adding the slip speed $\Delta v$ output by the minimum value selecting portion 77 and the wheel speed $V_w$ detected by the wheel speed sensor 65, and outputs it to the road surface condition calculating portion 80. In the road surface condition calculating portion 80, when the vehicle speed V and the braking force is input, the road surface condition of the road surface on which the vehicle currently runs is calculated and output in the same manner as that of the first embodiment.

Further, the slip speed Δv output by the minimum value selecting portion 77 and the vehicle speed V calculated by the vehicle speed calculating device 78 are output to the outer portion of the apparatus, and further Δv/V is calculated by the dividing device 81, so that the calculated result is output as the slip ratio λ.

As mentioned above, in accordance with the second embodiment, in spite of having the $\partial\mu/\partial\Delta v$ table including the vehicle speed as one of the wheel motion amounts, it is not necessary to directly detect the vehicle speed, and the wheel speed is detected in place thereof. Since it is hard to accurately estimate the vehicle speed in comparison with the wheel speed, it is possible to more accurately estimate the road surface condition by estimating the vehicle speed on the basis of the Δv table and the wheel speed as in this embodiment in comparison with the first embodiment using the detected vehicle speed.

Particularly, in the embodiment having the vehicle speed detecting portion 26 shown in FIG. 10, since it is supposed that the wheel speed at a time of starting brake substantially equals to the vehicle speed, the road surface condition can be accurately calculated only as far as the supposition is established. On the other hand, in this embodiment, it is possible to obtain the vehicle speed as accurately as possible by providing a detailed Δv table.

Further, in this embodiment, since the accurate slip ratio is obtained by accurately estimating the vehicle speed, various application can be performed by using the slip ratio. For example, as shown in FIG. 20, the peak $\mu$ searching portion 61 searches the peak $\mu_0$ for the corresponding road surface and the slip ratio $\lambda_0$ giving the peak $\mu_0$ by using the road surface condition calculated by the road surface condition estimating apparatus 10b.

In the case of applying this embodiment to the anti-lock brake control, the braking force is controlled so that the current slip ratio λ calculated by the road surface condition estimating apparatus 10b coincides with the searched slip ratio $\lambda_0$. Accordingly, since the calculated value of the slip ratio $\lambda_0$ is changed in correspondence to the change of the road surface condition, a stable anti-lock brake control can be always obtained without relation to the road surface condition.

Figure 20:
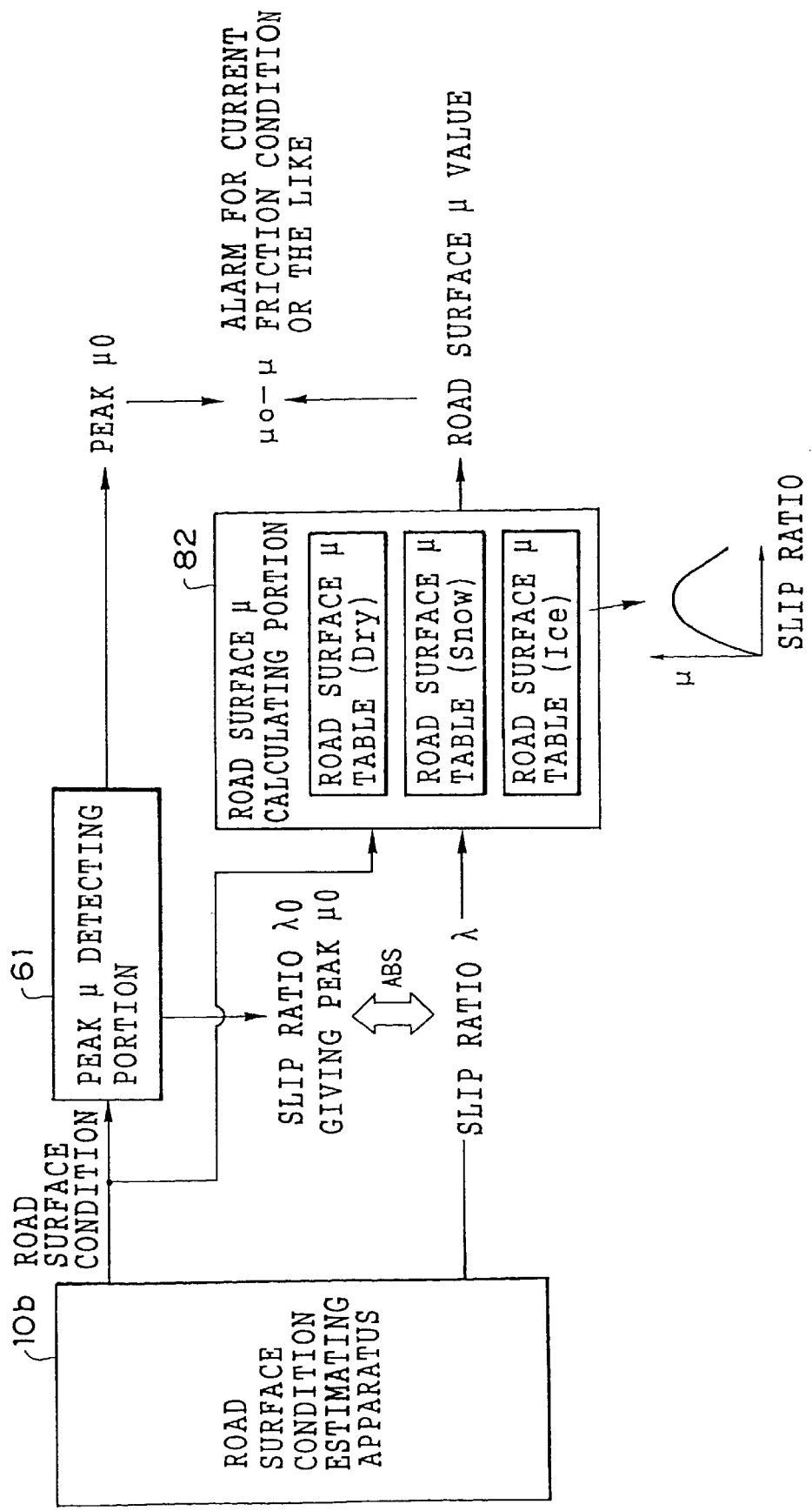
FIG. 20 is a schematic view which shows an embodiment of a system construction in the case of calculating a parameter showing a friction condition from a calculated road surface condition and a slip ratio in the second embodiment of the present invention.

Further, it is possible to provide a road surface $\mu$ calculating portion 82 having the road surface $\mu$ table showing the relation of the road surface $\mu$ with respect to the slip ratio for each of the road surface conditions, which selects the road surface $\mu$ table corresponding to the input road surface condition and outputs the $\mu$ value corresponding to the calculated slip ratio in accordance with the selected table, in the system shown in FIG. 20.

When the road surface p value of the road surface on which the vehicle currently runs is obtained by the road surface $\mu$ calculating portion 82, it is possible to estimate the area in the road surface $\mu$ characteristic to which the current friction state belongs by comparing the road surface $\mu$ value with the peak $\mu_0$ value in the corresponding road surface.

As a parameter showing the friction state, for example, $\mu_0-\mu$ can be used. The wheel may be undesirably locked when the parameter ($\mu_0-\mu$) becomes a negative value. Therefore, a system for giving an alarm to the driver when it happens, results in safe driving. In this case, $\lambda_0-\lambda$ may be employed as a parameter for expressing the friction state of this kind.

In accordance with this embodiment, since not only the road surface condition but also the peak $\mu$ value and the current friction condition can be known, a limit value of the braking force (driving force) can be clarified. Accordingly, in the vehicle stabilizing control, more stable control can be realized by changing the control gain and setting the control target value on the basis of these parameters.

(Third Embodiment)

Figure 8:
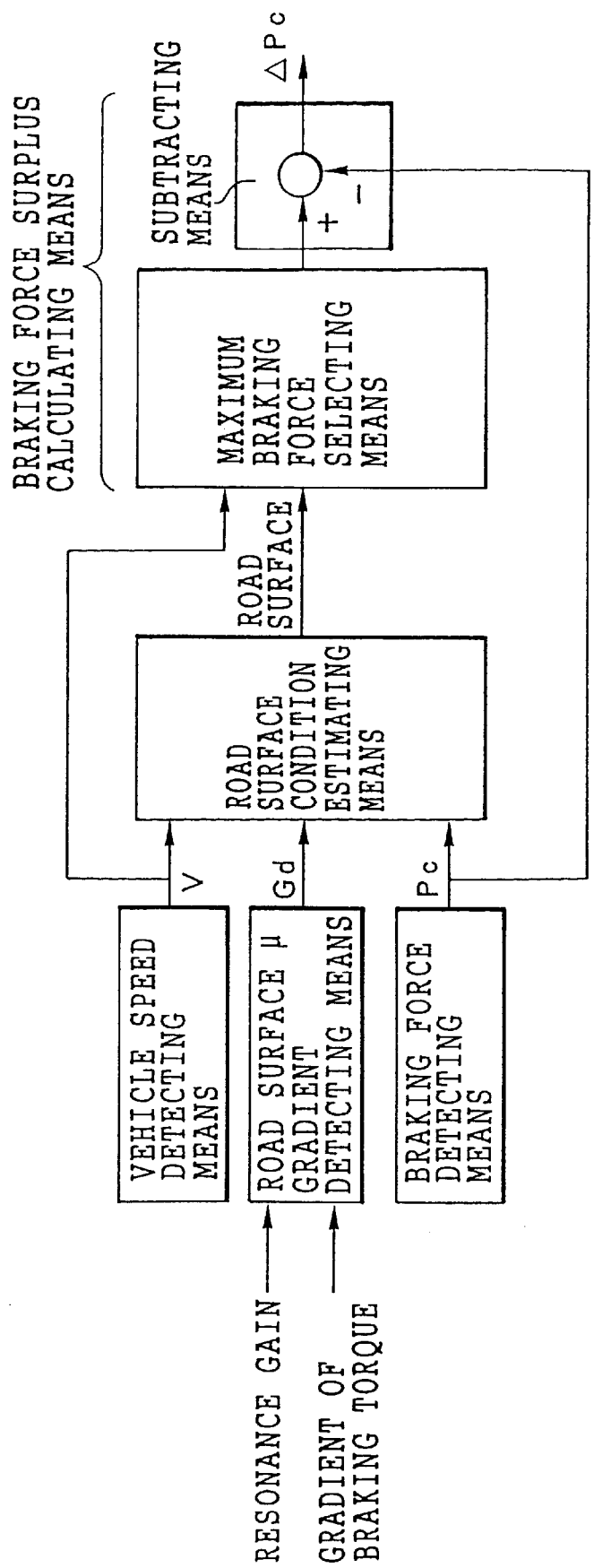
FIG. 8 is a block diagram which shows a schematic structure of a road surface condition estimating apparatus in accordance with the present invention (corresponding to a third embodiment).
Figure 13:
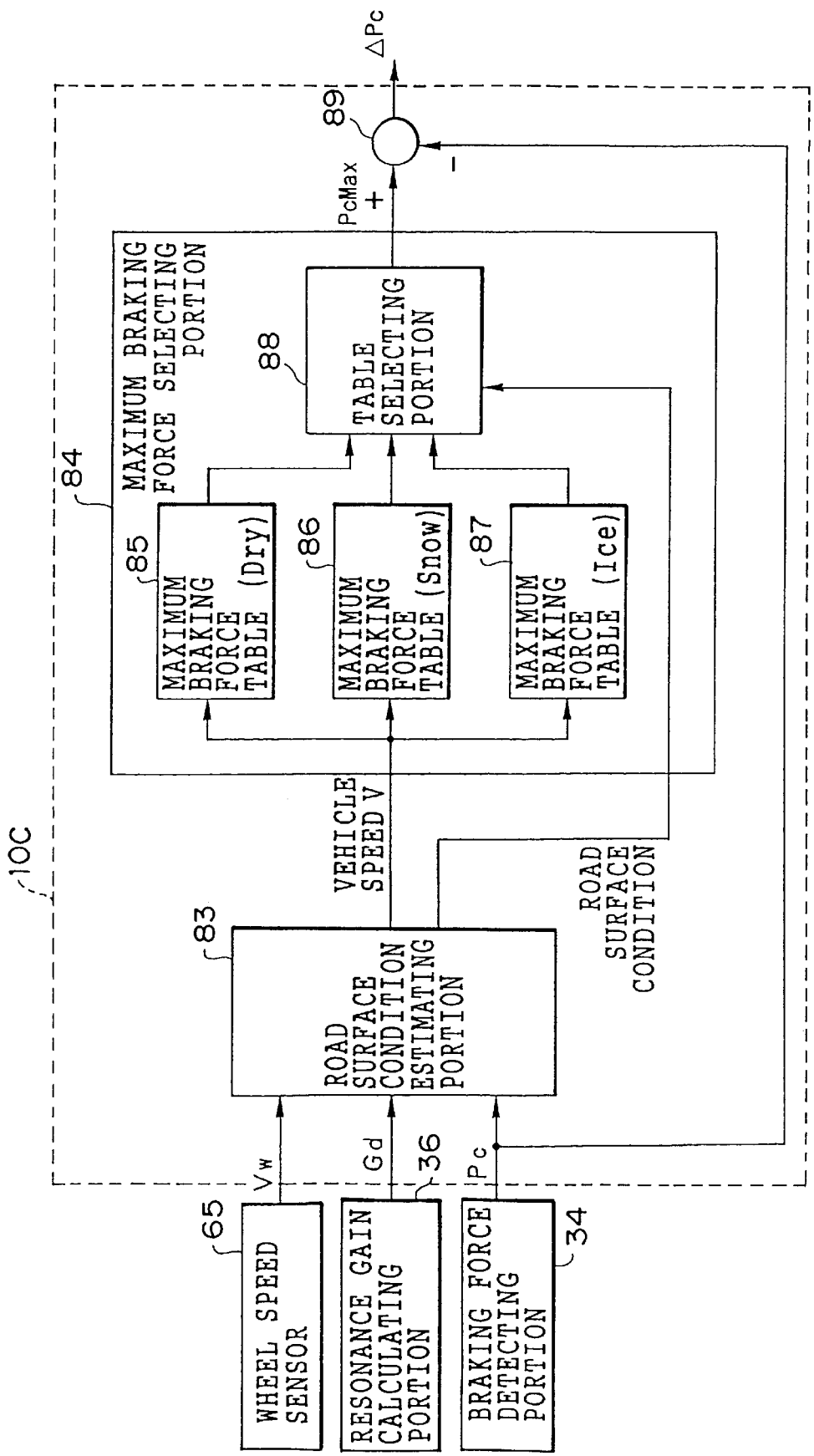
FIG. 13 is a block diagram which shows a structure of the road surface condition estimating apparatus in accordance with the third embodiment of the present invention.

FIG. 13 shows a block diagram of a structure of a road surface condition estimating apparatus in accordance with a third embodiment of the present invention which embodies the schematic structure of FIG. 8. In this case, the same reference numerals are attached to the same elements as those of the first and second embodiments, and the detailed description thereof will be omitted.

As shown in FIG. 13, a road surface condition estimating apparatus 10c in accordance with the third embodiment is constituted by a road surface condition estimating portion 83 for estimating the road surface condition and the vehicle speed V in accordance with the detected wheel speed $V_w$, the resonance gain $G_d$ and the braking force $P_c$, a maximum braking force selecting portion 84 for calculating a maximum braking force against the road surface on which the vehicle currently runs in accordance with the estimated road surface condition and the vehicle speed, and a subtracting device 89 for outputting a surplus degree $\Delta P_c$ of the braking force by subtracting the detected braking force from the calculated maximum braking force. In this case, the surplus degree $\Delta P_c$ of the braking force is calculated for each of the wheels.

Figure 9A:
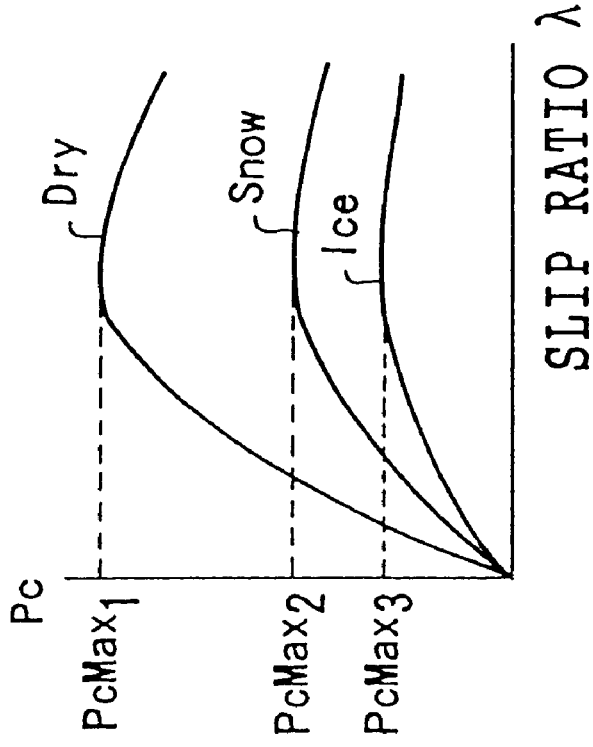
FIGS. 9A and 9B are graphs which show the maximum braking force for each vehicle speed and road surface conditions.
Figure 9B:
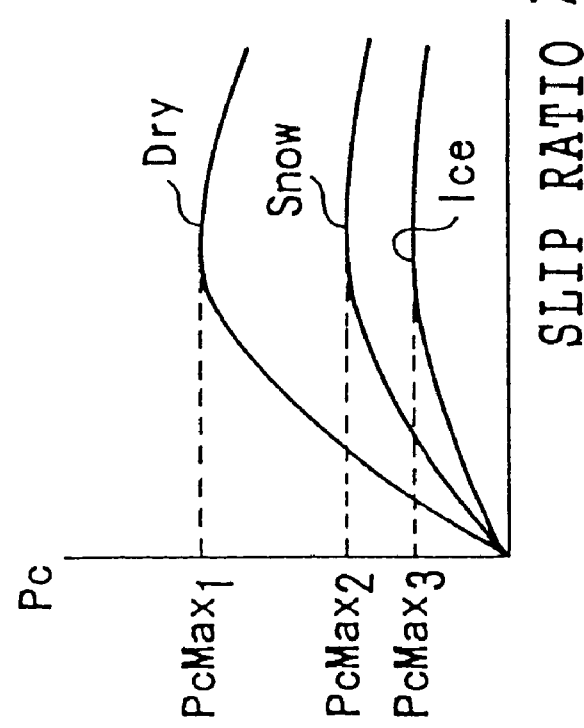

Among them, the maximum braking force selecting portion 84 is provided with converting portions 85, 86 and 87 having the maximum braking force table (refer to FIGS. 9A and 9B) giving the maximum braking force at each of the vehicle speeds, in each of the road surface conditions. These converting portions respectively calculate the maximum braking force corresponding to the input vehicle speed V on the basis of the maximum braking force table, and output each of the calculated maximum braking forces to a table selecting portion 88 in the following step. The table selecting portion 88 selects only the maximum braking force converted by the converting portion corresponding to the estimated road surface condition and outputs it.

Further, the road surface condition estimating portion 83 can be constructed in the same manner as the road surface condition estimating apparatus 10b shown in FIG. 12.

Next, an operation of the third embodiment will be described below.

In the third embodiment, since the surplus degree $\Delta P_c$ of the braking force is calculated for each of the wheels, a spin or the like is prevented, for example, by giving larger braking force and driving force to the wheel having a high surplus degree and controlling the braking force of each of the wheel to be equal to each other, so that a more stable vehicle running can be realized.

Although three of the embodiments in accordance with the present invention are described above, the present invention is not limited to the embodiments mentioned above, and can be optionally and preferably modified within the range of the present invention.

For example, in the embodiment, the road surface condition is classified into three kinds comprising a dry road surface, a snow covered road surface and an ice covered road surface. The other kinds of road surfaces, however, such as a gravel road, a sand road surface, a wet road surface and the like can be estimated, and the road surface conditions more than three kinds can be more accurately estimated.

Further, in FIGS. 10 and 11, the vehicle speed and the braking force are converted into the resonance gain using each of the tables and the converted value of the resonance gain is compared with the detected value thereof. Other than that, the structure may be made such that the resonance gain and the vehicle speed, or the resonance gain and the braking force are converted into the braking force or the vehicle speed in accordance with each of the tables, and the converted value and the detected value of the same wheel motion amount are compared with each other, thereby estimating the road surface condition. Further, the same manner can be applied to the $\Delta_v$ table in FIG. 12.

Still further, in the embodiments, the resonance gain is used for expressing the gradient of the road surface $\mu$. Alternatively, the braking torque gradient may be employed.

Next, a fourth embodiment in accordance with the present invention will be described in detail with reference to the drawings.

As shown in FIG. 22, a road surface condition estimating apparatus in accordance with this embodiment is provided with a wheel speed sensor 28 for detecting a wheel speed, a braking force detecting portion 34 for detecting a braking force acting on the wheel, a resonance gain calculating portion 36 for calculating a resonance gain mentioned below as a road surface $\mu$ gradient (an gradient of a coefficient of friction between the road surface and the wheel with respect to the slip speed), and a calculating circuit 10A for calculating the road surface condition and the slip speed. In this case, since the wheel speed sensor 28, the braking force detecting portion 34 and the resonance gain calculating portion 36 are respectively structured in the same manner as those of the embodiments mentioned above, the detailed description will be omitted.

The calculating circuit 10A is provided with reference value forming and storing circuits 12D, 12S and 12I for forming and storing a reference value of the road surface $\mu$ gradient corresponding to a predetermined road surface condition, that is, Dry, Snow and Ice at every time when the braking force detected by the braking force detecting portion 34 changes by a predetermined amount, and a resonance gain storing circuit 12J for storing the resonance gain at every time when the braking force changes by a predetermined amount. The reference value forming and storing circuits 12D, 12S and 12I and the resonance gain storing circuit 12J are connected to a time series data track identifying portion 14A for comparing a time series data of a reference value of the road surface $\mu$ gradient stored in the reference value forming and storing circuits 12D, 12S and 12I with a time series data of a reference value of the road surface $\mu$ gradient actually detected and stored in the resonance gain storing circuit 12J and calculating the road surface condition. A slip speed selecting portion 16A is connected to the output end of the time series data track identifying portion 14A.

Since each of the reference value forming and storing circuits 12D, 12S and 12I is structured in the same manner, only the reference value forming and storing circuit 12D is explained, and the other explanations will be omitted. The reference value forming and storing circuit 12D is provided with a vehicle speed calculating portion 18A connected to the wheel speed sensor 28. A slip speed calculating portion 20A for calculating the slip speed is connected to the vehicle speed calculating portion 18A. The braking force detecting portion 34 is connected to the slip speed calculating portion 20A. The slip speed calculating portion 20A is connected to a $\mu$ gradient reference value forming portion 22A for forming a reference value of the road surface $\mu$ gradient. A vehicle speed calculating portion 18A and the braking force detecting portion 34 are connected to the $\mu$ gradient reference value forming portion 22A. The p gradient reference value forming portion 22A is connected to a reference value time series data storing portion 24A for storing the time series data of the reference value of the road surface $\mu$ gradient formed by the $\mu$ gradient reference value forming portion 22A. The reference value time series data storing portion 24A is connected to the time series data track identifying portion 14A.

The resonance gain storing circuit 12J is provided with a resonance gain time series data storing portion 25 for storing the time series data of the detected resonance gain. The braking force detecting portion 34 and the resonance gain calculating portion 36 are connected to the resonance gain time series data storing portion 25. The resonance gain time series data storing portion 25 is connected to the time series data track identifying portion 14A.

Each of the slip speed calculating portions 20A of the reference value forming and storing circuits 12D, 12S and 12I is connected to the slip speed selecting portion 16A.

Figure 23:
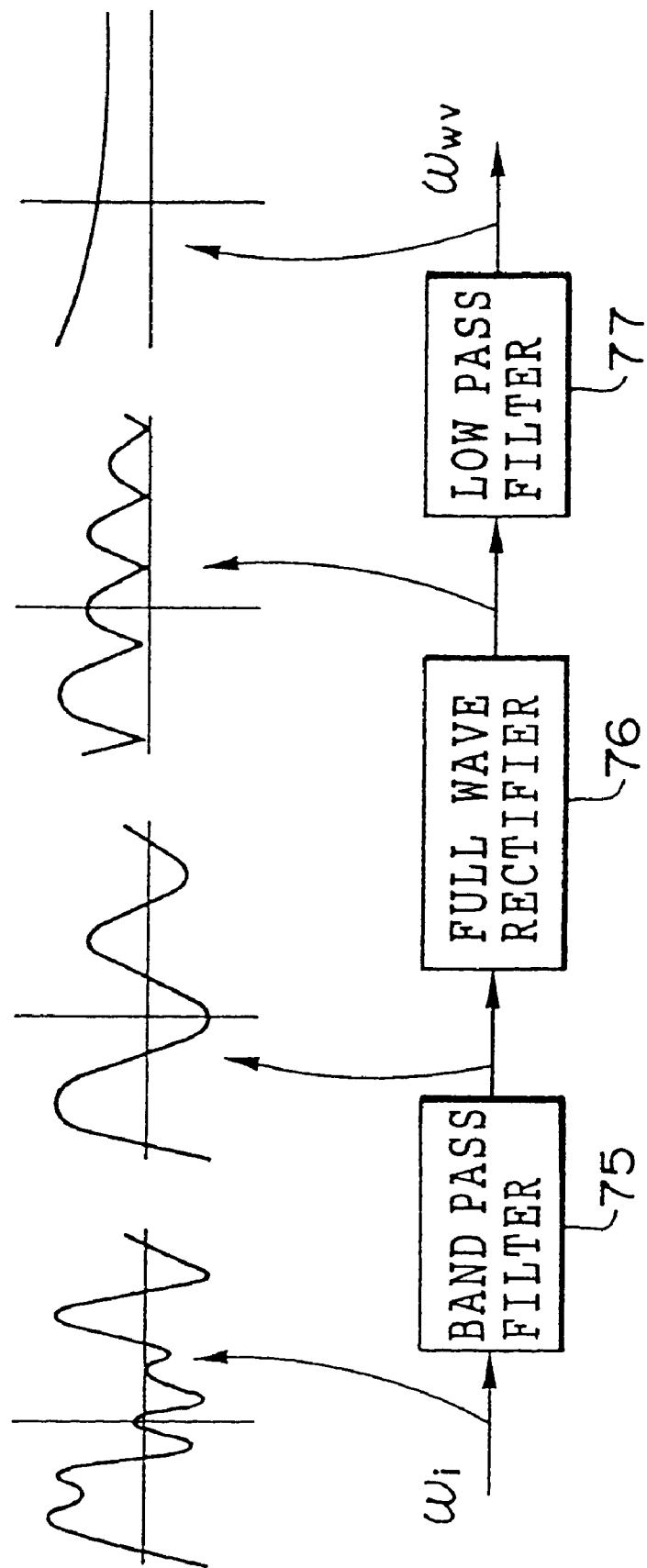
FIG. 23 is a block diagram which shows a wheel speed micro amplitude detecting portion.

In this case, the wheel speed micro amplitude detecting portion 40 of the resonance gain calculating portion 36 can be realized as a calculating portion for performing a filter-treatment for extracting a vibration component of a resonance frequency of $\omega\infty$ as shown in FIG. 23. For example, since the resonance frequency $\omega\infty$ of this vibration system is about 40 Hz, a period is set to be 24 ms and about 41.7 Hz considering controllability, and a band pass filter 75 having the frequency as a central frequency is provided. Only the frequency component adjacent to about 41.7 Hz is extracted from a wheel speed signal $\omega_i$ by means of this filter. Further, the full wave of the filter output is rectified and smoothened to a direct current by means of a full wave rectifier 76, and a wheel speed micro amplitude $\omega_{wv}$ is output from the direct current smoothening signal by passing only a low band vibration component by means of a low pass filter 77.

In this case, the wheel speed micro amplitude detecting portion 40 can be realized so as to continuously take in the time series data of integral times of the period, for example, of 24 ms of a period and 48 ms of two periods and calculate the correlation between the unit sine wave and the unit cosine wave of 41.7 Hz.

Next, an operation of this embodiment will be explained below.

At first, a method of forming a reference value of the road surface $\mu$ gradient by means of the reference value forming and storing circuits 12D, 12S and 12I will be explained.

The gradient $G_d$ of the road surface $\mu$ corresponds to an gradient of the coefficient of friction $\mu$ between the road surface and the wheel with respect to the slip speed $\Delta_v$, and is expressed by the following formula (16) at each of the braking force, the road surface condition and the vehicle speed.

$$G_d = \frac{\partial \mu}{\partial \Delta v} \approx \frac{\mu_2 - \mu_1}{\Delta v_2 - \Delta v_1} \quad (16)$$

in which the numbers 1 and 2 attached to the letters $\mu$ and $\Delta_v$ respectively represent the time at which the braking changes by a predetermined amount from the time of starting the brake, wherein the number 2 is the present time, the number 1 is the time prior to the present time, and the number 2 will be replaced by the number 1 when the braking force changes by the predetermined amount from the present time.

Accordingly, the gradient $G_d$ of the road surface $\mu$ can be specified by the braking force $P_c$, the road surface condition, the vehicle speed V, the slip speed $\Delta_v$ and the coefficient of friction $\mu$.

Figure 24:
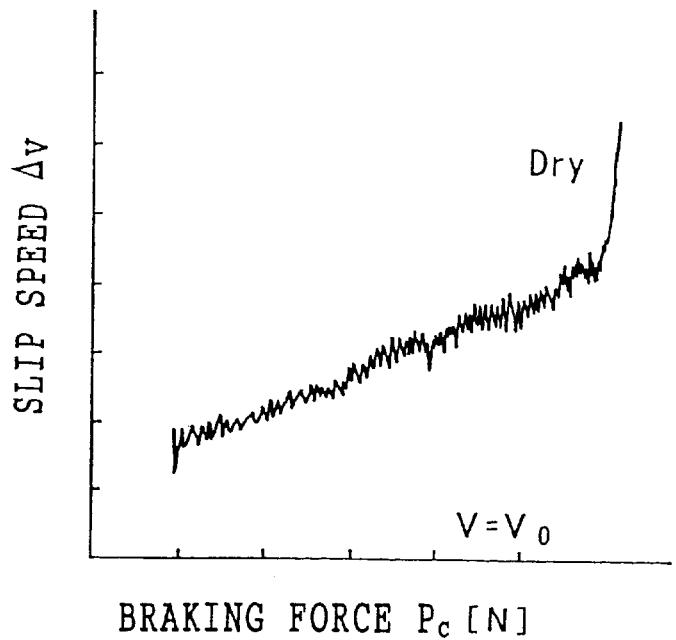
FIG. 24 is a graph which shows a relation between a braking force and the slip speed at a predetermined speed in a Dry road surface condition.
Figure 25:
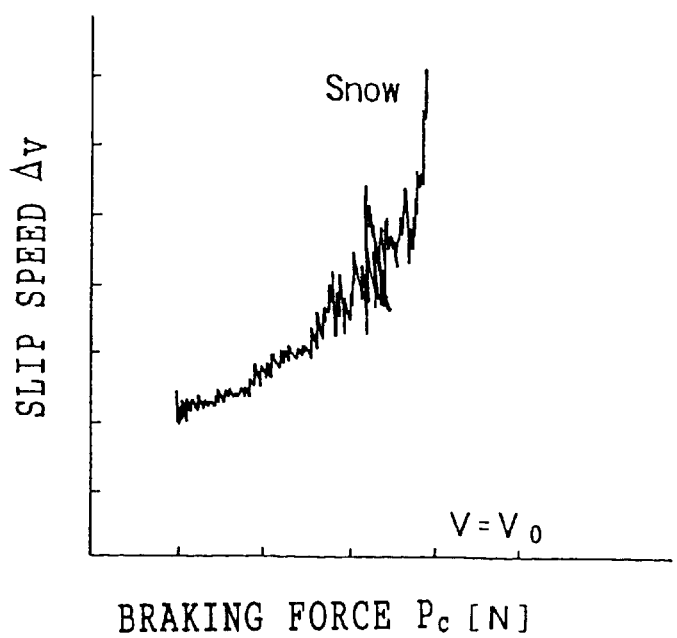
FIG. 25 is a graph which shows a relation between a braking force and the slip speed at a predetermined speed in a Snow covered road surface condition.
Figure 26:
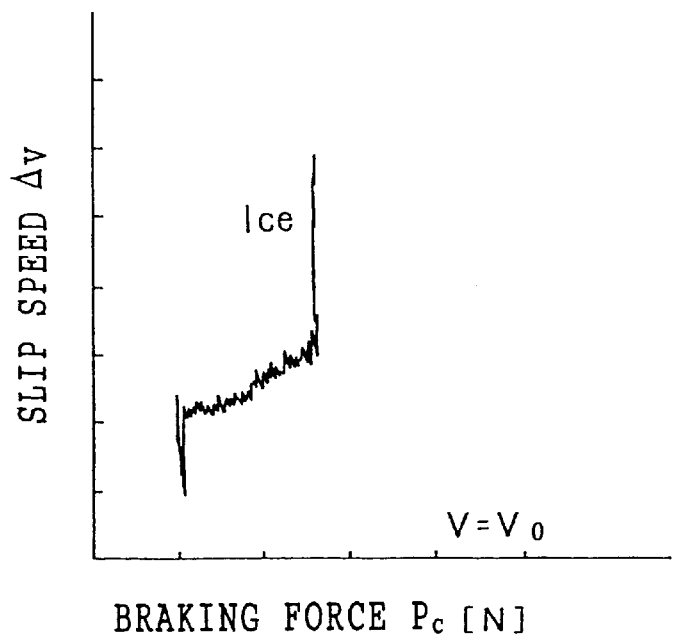
FIG. 26 is a graph which shows a relation between a braking force and the slip speed at a predetermined speed in an Ice covered road surface condition.

In this case, it is known that the slip speed $\Delta_v$ and the braking force $\mu$ have an inherent relation in accordance with each of the road surface conditions and the vehicle speeds as shown in FIGS. 24 to 26.

Accordingly, each of the slip speed calculating portions 20A of the reference value forming and storing circuits 12D, 12S and 12I stores the relational formula between the braking force $\mu$ and the slip speed $\Delta_v$ shown in FIGS. 24 to 26 in accordance with the vehicle speed. Accordingly, when the braking force $P_c$ and the vehicle speed V are input, the slip speed calculating portion 20A calculates the slip speed $\Delta_v$ corresponding to the braking force $P_c$ and the vehicle speed V on the basis of the relational formula mentioned above, the braking force $P_c$ and the vehicle speed V, and outputs the calculated slip speed $\Delta_v$ to the $\mu$ gradient reference value forming portion 22A.

In this case, the vehicle speed V input to the slip speed calculating portion 20A corresponds to a value calculated by the vehicle speed calculating portion 18A. Concretely speaking, it is calculated in the following manner. The slip speed $\Delta_v$ calculated by the slip speed calculating portion 20A mentioned above and the wheel speed V$\omega$ detected by the wheel speed sensor 28 are input to the vehicle speed calculating portion 18A. The slip speed $\Delta_v$ corresponds to a value (V–V$\omega$) obtained by subtracting the wheel speed V$\omega$ from the vehicle speed V. Accordingly, the vehicle speed calculating portion 18A calculates the vehicle speed V by adding the input slip speed $\Delta_v$ and the input wheel speed V$\omega$ and outputs it to the slip speed calculating portion 20A.

Figure 27:
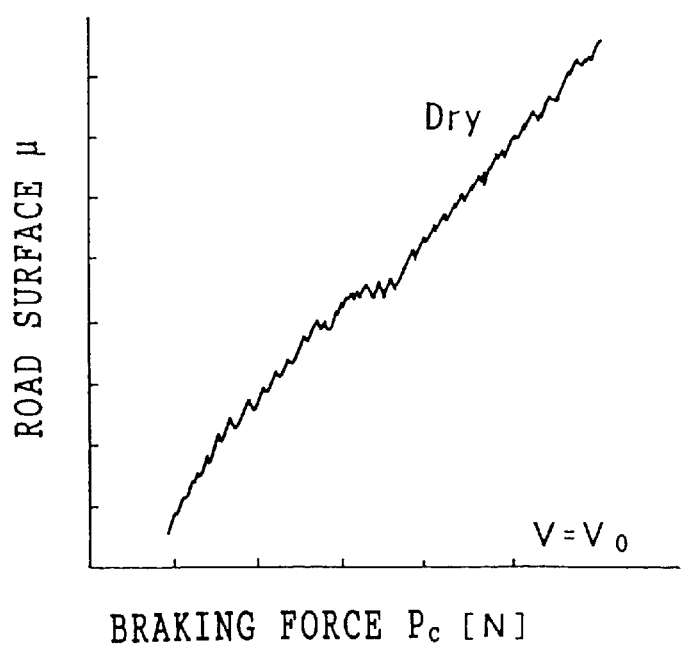
FIG. 27 is a graph which shows a relation between a braking force and the road surface $\mu$ at a predetermined speed in a Dry road surface condition.
Figure 28:
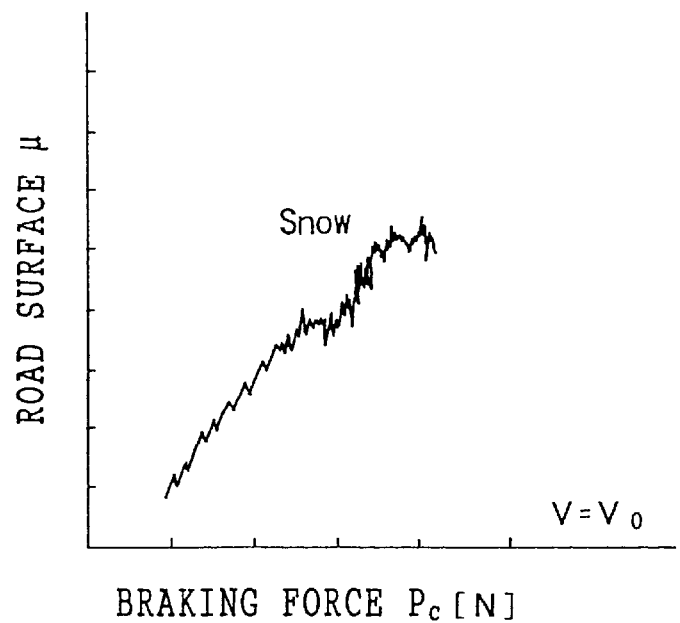
FIG. 28 is a graph which shows a relation between a braking force and the road surface $\mu$ at a predetermined speed in a Snow covered road surface condition.
Figure 29:
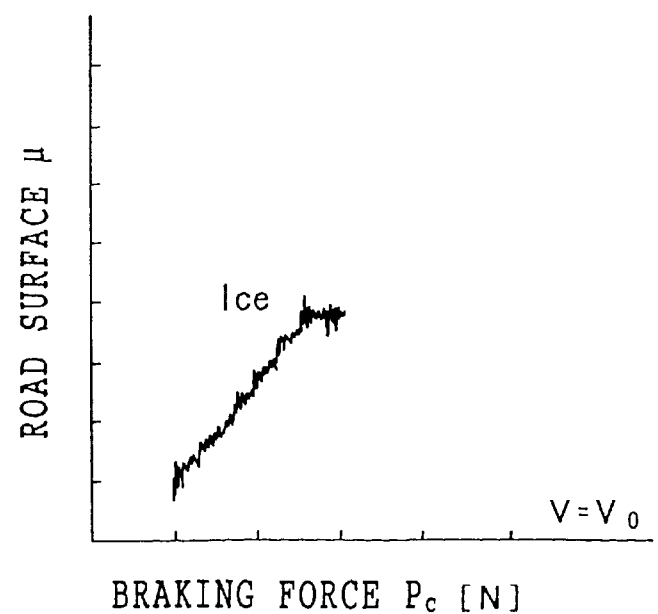
FIG. 29 is a graph which shows a relation between a braking force and the road surface $\mu$ at a predetermined speed in an Ice covered road surface condition.

Further, it is known that the road surface $\mu$ and the braking force $\mu$ have an inherent relation in accordance with the vehicle speed as shown in FIGS. 27 to 29 in correspondence to each of the road surface conditions.

Then, each of the $\mu$ gradient reference value forming portions 22A of the reference value forming and storing circuits 12D, 12S and 12I stores a relational formula between the braking force $\mu$ and the road surface $\mu$ shown in FIGS. 27 to 29 in accordance with the vehicle speed. Accordingly, when the braking force $P_c$ and the vehicle speed V are input, the $\mu$ gradient reference value forming portion 22A calculates the road surface $\mu$ corresponding to the braking force $P_c$ and the vehicle speed V on the basis of the relational formula mentioned above, the braking force $P_c$ and the vehicle speed V.

As mentioned above, the slip speed $\Delta_v$ (two points, $\Delta_{v_1}$, $\Delta_{v_2}$) corresponding to the braking force $P_c$ and the vehicle speed V is input to the $\mu$ gradient reference value forming portion 22A from the slip speed calculating portion 20A, and the $\mu$ gradient reference value forming portion 22A calculates the road surface $\mu$ (two points, $\mu_1$, $\mu_2$) corresponding to the braking force $P_c$ and the vehicle speed V. Then, the $\mu$ gradient reference value forming portion 22A calculates the reference value of the gradient $G_d$ of the road surface $\mu$ by substituting the slip speed $\Delta_v$ and the road surface $\mu$ for the formula (16). The wheel speed V$\omega$ and the braking force are respectively sampled at every predetermined sampling time from the time of starting the brake to the time when a predetermined time elapses by the wheel speed sensor 28 and the braking force detecting portion 34, and input to the $\mu$ gradient reference value forming portion 22A. Then, the $\mu$ gradient reference value forming portion 22A calculates the reference value of the gradient $G_d$ of the road surface $\mu$ at every time when the braking force changes by a predetermined amount from the time of starting the brake to the time when the braking force is applied by a predetermined amount, and outputs the time series data of the reference value of the gradient $G_d$ of each of the road surface $\mu$ to the reference value time series data storing portion 24A. Then, the reference value time series data storing portion 24A stores the time series data of the reference value of the gradient $G_d$ of the road surface $\mu$.

Further, in the resonance gain time series data storing portion 25, the time series data of the resonance gain is stored synchronously with the output timing of the time series data of the reference value from the $\mu$ gradient reference value forming portion 22A to the reference value time series data storing portion 24A. Accordingly, the resonance gain $G_dT$ and the braking force $P_c$ sampled at every predetermined sampling time from the time of staring the brake to the time when the predetermined time elapses are input to the resonance gain time series data storing portion 25, and the resonance gain time series data storing portion 25 stores the resonance gain $G_dT$ at every time when the braking force changes by the predetermined amount from the time of starting the brake to the time when the braking force is applied by the predetermined amount.

Next, an identification operating routine which the time series data track identifying portion 14A performs at a time of staring the brake will be described below with reference to FIG. 30.

Figure 30:
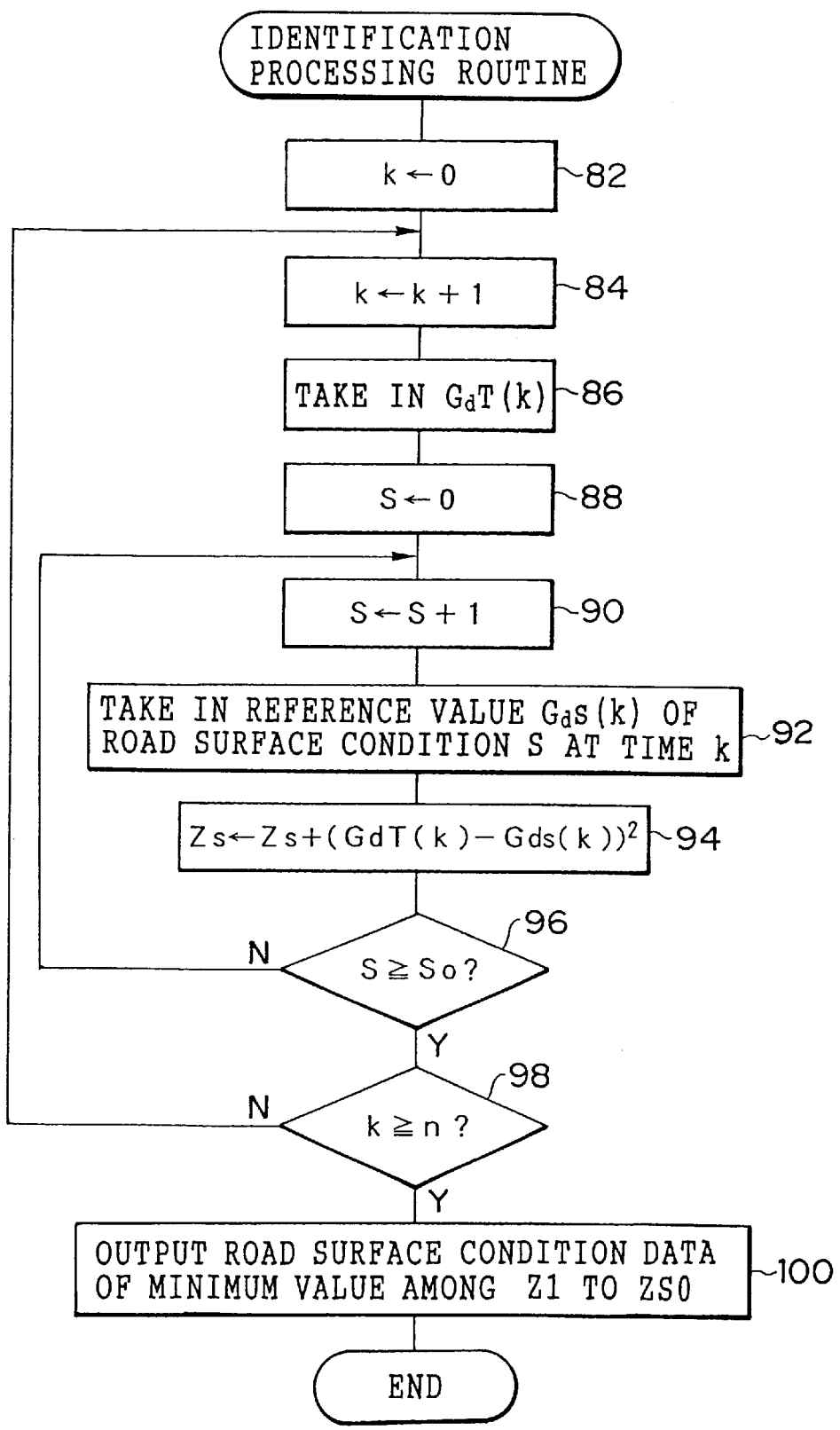
FIG. 30 is a flow chart which shows an identification processing routine which a time series data track identifying portion performs at a time of starting the brake.

In a step 82 of FIG. 30, a variable k expressing a time when the braking force changes by a predetermined amount from the time of starting the brake is initialized, and in a step 84, one increment is applied to the variable k.

In a step 86, the gradient $G_dT(k)$ of the road surface $\mu$ (the resonance gain) calculated by the resonance gain calculating portion 36 at the time expressed by the variable k (k·$\tau$, $\tau$: a sampling period) is taken in.

In a step 88, a variable s representing a number of the road surface conditions to be identified is initialized, and in a step 90, one increment is applied to the variable s.

In a step 92, the reference value $G_{ds}$ (k) at the time k among the time series data of the gradient $G_d$ of the road surface $\mu$ stored in the reference value time series data storing portion 24A corresponding to the road surface condition s is taken in.

In a step 94, an identifying value $z_s$ is calculated by the formula (17).

$$Z_s = Z_s + (G_dT(k) - G_ds(k))^2 \quad (17)$$

In a step 96, whether or not the variable s is equal to or more than a predetermined total number $s_0$ (3 in this embodiment) of the road surface conditions is judged. In the case that the relation of the variable s$\geq$the total number $s_0$ is not established, since there is a road surface condition for which the identifying value $z_s$ is not calculated at the time k, the step goes back to the step 90 and the processes mentioned above (the steps 90 to 96) are performed again. In the case that the relation of the variable s$\geq$the total number so is established, since the identifying value $z_s$ at the time k for all the road surface conditions is calculated, in a step 98, whether or not the variable k is equal to or more than n expressing a time at which a predetermined time elapses from the time of starting the brake is judged. In the case that the relation of the variable k$\geq$n is not established, since the predetermined time does not elapse from the time of staring the brake, the step goes back to the step 84 and the processes mentioned above (the steps 84 to 98) are performed again. In the case that the relation of the variable k$\geq$n is established, since the predetermined time elapses from the time of starting the brake, in a step 100, it is estimated that the road surface condition corresponding to the minimum identifying value $z_s$ among the identifying values $z_s$ ($z_1$ to $z_3$) is the road surface condition in which the vehicle currently runs.

Accordingly, the value $z_s$ can be expressed by the following formula (18).

$$Z_s = \sum_{k=1}^{n} (G_d T(k) - G_d S(k))^2 \qquad (18)$$

Figure 31:
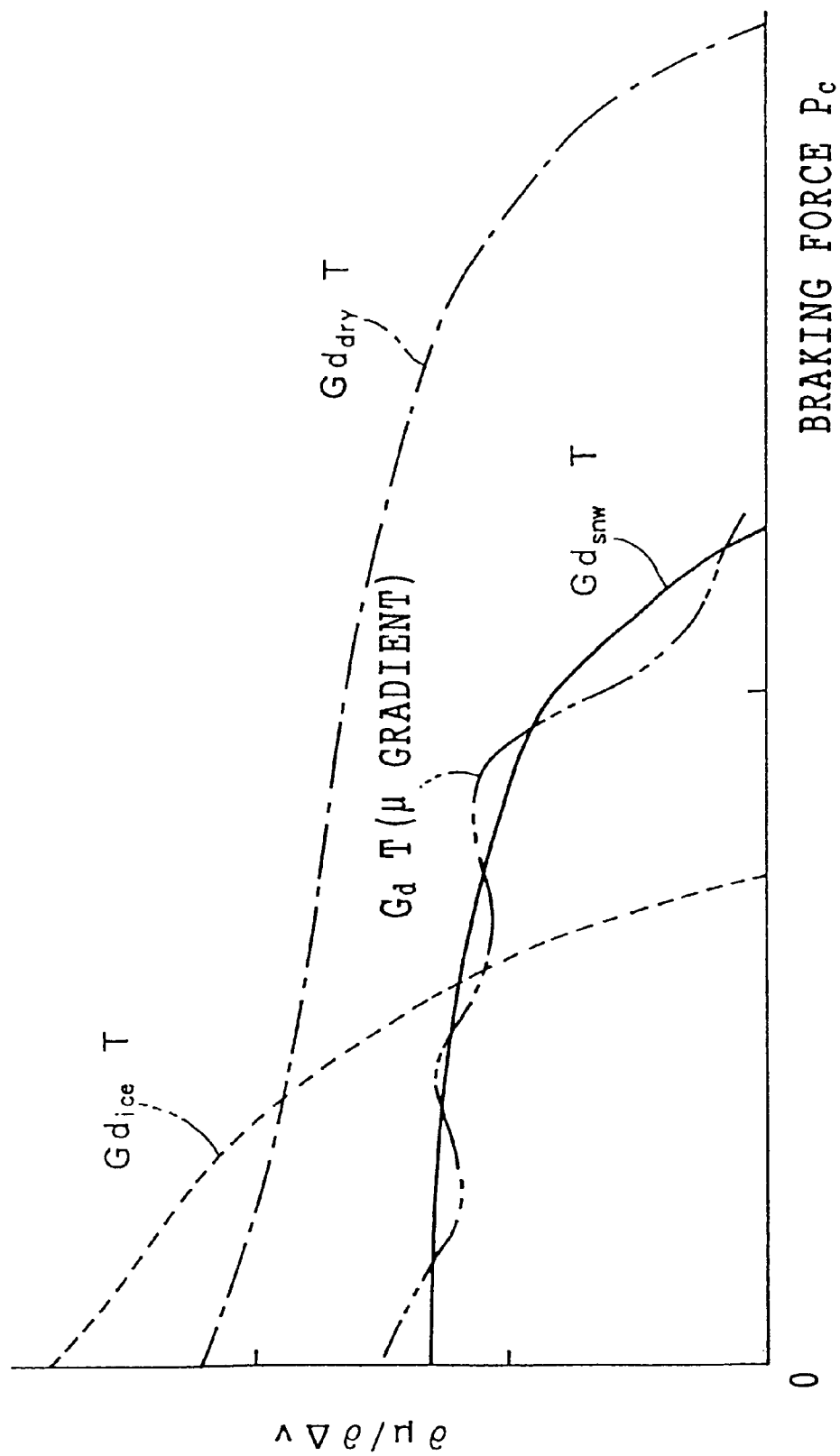
FIG. 31 is a schematic view which shows a state of identification process (track) of the time series data track identifying portion.

As mentioned above, the value $z_s$ is calculated on the basis of the time series data from the time of starting the brake to the time when the predetermined time elapses, because the gradient $G_d T(k)$ of the road surface $\mu$ calculated by the resonance gain calculating portion 36 does not always coincide with the gradient $G_{ds}(k)$ of the road surface $\mu$ in the road surface condition in which the vehicle currently runs (in FIG. 31, it is the road surface condition of Snow), as shown in FIG. 31, and it disperses around the reference value of the gradient $G_{ds}$ of the road surface $\mu$ in the road surface condition in which the vehicle currently runs. Accordingly, the road surface condition is accurately estimated by using the time series data from the time of starting the brake to the time when the braking force is applied by the predetermined amount.

Then, a peak value $\mu_{MAX}$ of a coefficient of friction corresponding to the estimated road surface condition is output to an ABS control portion or the like (not shown) among the peak values $\mu_{MAX}$ of the coefficient of friction which are previously stored in correspondence to each of the road surface conditions, and the data expressing the estimated road surface condition is output to the slip speed selecting portion 16A.

The ABS control portion provided with the peak value $\mu_{MAX}$ by the time series data track identifying portion 14A sets the slip ratio giving the input peak value $\mu_{MAX}$ to be a reference slip ratio and controls the braking force in such a manner as to follow the peak $\mu$.

The slip speed selecting portion 16A provided with the data expressing the road surface condition by the time series data track identifying portion 14A outputs the slip speed $\Delta v$ corresponding to the estimated road surface condition among the slip speeds output from each of the slip speed calculating portions 20A of the reference value forming and storing circuits 12D, 12S and 12I on the basis of the data expressing the input road surface condition.

As mentioned above, in accordance with this embodiment, since the road surface condition and the peak $\mu$ value of the road surface on which the vehicle currently runs can be accurately calculated, it is possible to perform the vehicle stabilizing control (the change of the control gain, the set of control target value) such as VSC, ABS, TRC and the like, to warn the driver of the road surface condition and to estimate each of the vehicle conditions such as a vehicle body lateral slip, a yaw rate and the like.

In the embodiments mentioned above, although the relational formula between the braking force P and the slip speed $\Delta v$ shown in FIGS. 24 to 26 and the relational formula between the braking force P and the road surface $\mu$ shown in FIGS. 27 to 29 are stored, the present invention is not limited to this. Since the braking force $P_c$ and the gradient of the road surface $\mu$ have the relation shown in FIG. 32, it may be structured such as to store the relational formula shown in FIG. 32 in correspondence to the vehicle speed V, and calculate the gradient of the road surface $\mu$ corresponding to the vehicle speed V and the braking force $P_c$ from the vehicle speed V, the braking force $P_c$ and the relational formula between the braking force $P_c$ and the gradient of the road surface $\mu$.

Further, in the embodiment mentioned above, although the road surface condition is estimated by the minimum value of a square error of the gradient $G_d T(k)$ of the road surface $\mu$ and the reference value $G_d S(k)$, the present invention is not limited to this. It may be structured such that the road surface condition is estimated by calculating the correlation between the time series data of the gradient $G_d T(k)$ of the road surface $\mu$ and that of the reference value $G_d S(k)$ from the time of starting the brake to the time when the predetermined time elapses.

Figure 32:
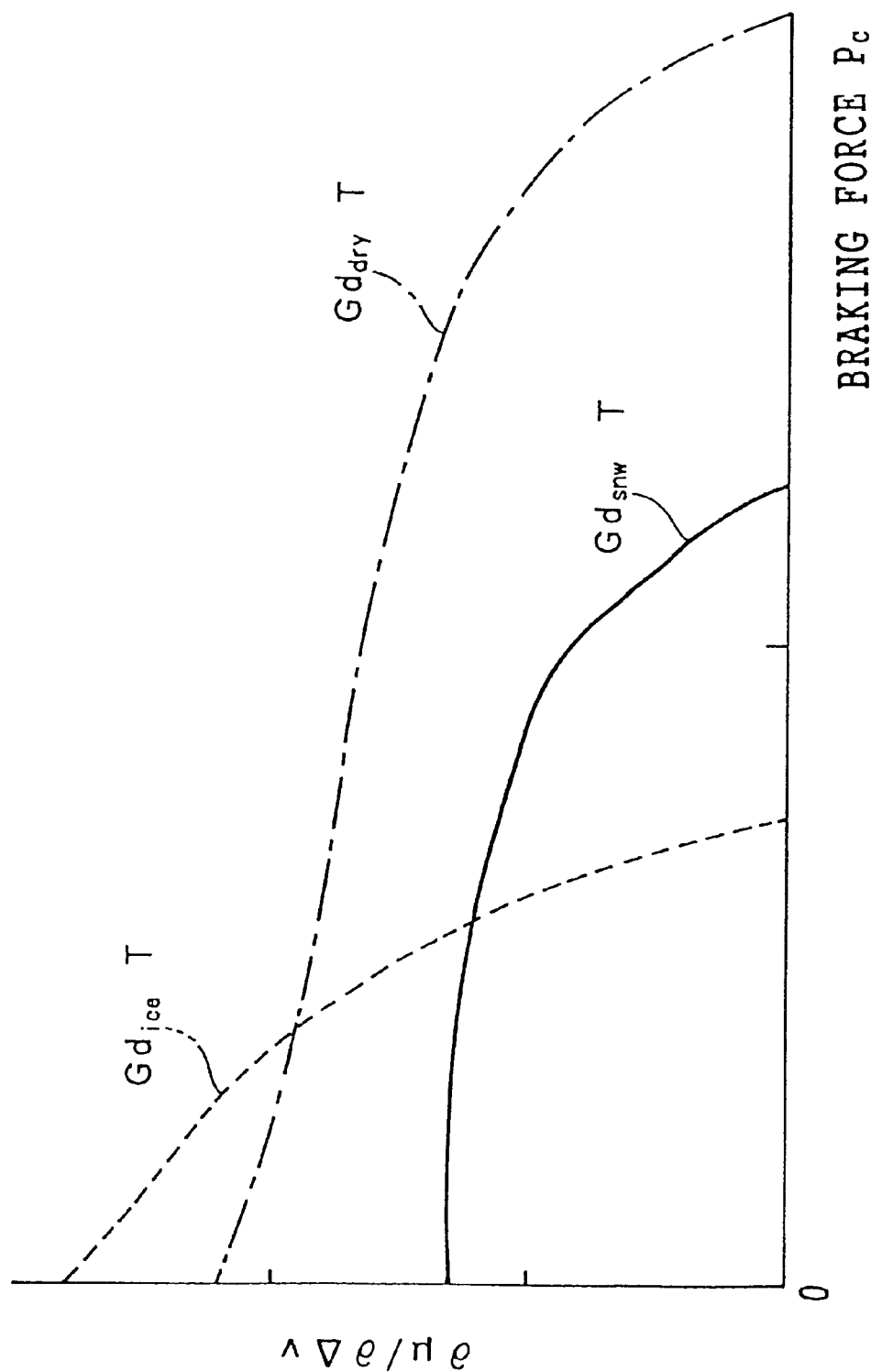
FIG. 32 is a graph which shows a relation between the braking force and the gradient of the road surface $\mu$.

Further, in the embodiment mentioned above, the structure is made such as to store the relational formula between the braking force P and the slip speed $\Delta v$ shown in FIGS. 24 to 26, the relational formula between the braking force P and the road surface $\mu$ shown in FIGS. 27 to 29, or the relational formula between the braking force P and the gradient $G_d$ of the road surface $\mu$ shown in FIG. 32. However, the present invention is not limited to these. Since each of the relations between the slip speed $\Delta v$ and the road surface $\mu$ and between the slip speed $\Delta v$ and the gradient $G_d$ of the road surface $\mu$ becomes similar to those between the braking force P and the slip speed $\Delta v$, the road surface $\mu$, or the gradient $G_d$ of the road surface $\mu$, the structure may be made such as to store the relational formulas between the slip speed $\Delta v$ and the road surface $\mu$ and between the slip speed $\Delta v$ and the gradient $G_d$ of the road surface $\mu$ and process in the same manner.

Further, in the embodiments mentioned above, the resonance gain is calculated as the gradient $G_d$ of the road surface $\mu$. However, the present invention is not limited to this. Since the resonance gain is a physical amount equivalent to the braking torque gradient, the structure may be made such as to include the braking torque gradient calculating portion in place of the resonance gain calculating portion 36, to calculate the braking torque gradient in place of the gradient $G_d$ of the road surface $\mu$, and to process in the same manner.

Next, a method of calculating the braking torque gradient will be described below.

A wheel motion of each of the wheels and a vehicle body motion can be described by an equation of motion shown by the following formulas (19) and (20).

$$J\dot{\omega}_i = R_c F_i'(V/R_c - \omega_i) - T_{bi} \qquad (19)$$

$$\dot{M}_v = -\sum_{j=1}^{4} F_j'(v/R_c - \omega_i) \qquad (20)$$

In which $F_i'$ is a braking force generated in a wheel of number i, $T_{bi}$ is a braking torque applied to the wheel of number i in correspondence to a stepping force, M is a vehicle mass, $R_c$ is an effective radius of the wheel, J is a wheel inertia and v is a vehicle speed. In this case, a mark . denotes a differential with respect to a time. In the formulas (19) and (20), $F_i'$ is shown as a function of the slip speed $(v/R_c - \omega_i)$.

Here, the vehicle speed is equivalently expressed by an angular velocity $\omega_v$ of the vehicle body (the formula (21)), and the braking torque $R_c F_i'$ is described as a linear function of the slip speed (gradient $k_i$, y component $T_i$) (the formula (22))

$$v = R_c \omega_v \qquad (21)$$

$$R_c F_i'(\omega_v - \omega_i) = k_i \times (\omega_v - \omega_i) + T_i \qquad (22)$$

Further, the equations (23) and (24) are obtained by substituting the formulas (21) and (22) for the formulas (19) and (20) and to express the wheel speed $\omega_i$ and the vehicle speed $\omega_v$ as the time series data $\omega_i[k]$ and $\omega_v[k]$ (k is a sample time in the case of setting the sample time $\tau$ to be a unit, k=1, 2, . . . ) dispersed at every sample times $\tau$.

$$J \frac{\omega_i[k] - \omega_i[k-1]}{\tau} = k_i(\omega_v[k-1] - \omega_i[k-1]) + T_i - T_{bi} \quad (23)$$

$$R_c^2 M \frac{\omega_v[k] - \omega_v[k-1]}{\tau} = -\sum_{j=1}^{4} k_j \cdot \omega_v[k-1] + \sum_{j=1}^{4} (k_j \omega_v[k-1]) - \sum_{j=1}^{4} T_j \quad (24)$$

Here, when the formulas (23) and (24) are made simultaneous and the equivalent angular velocity $\omega_v$ of the vehicle body is deleted, the following formula (25) is obtained.

$$\omega_i[k] - \left(2 - \frac{\tau}{J} k_i - \frac{\tau}{R_c^2 M} \sum_{j=1}^{4} k_j\right) \omega_i[k-1] + \left(1 - \frac{\tau}{R_c^2 M} \sum_{j=1}^{4} k_j\right)\left(1 - \frac{\tau}{J} k_i\right) \omega_i[k-2] - k_i \frac{\tau^2}{J R_c^2 M} \sum_{j=1}^{4} (k_j \omega_j[k-2]) = -k_i \frac{\tau^2}{J R_c^2 M} \sum_{j=1}^{4} T_j + \frac{\tau^2}{J R_c^2 M} \sum_{j=1}^{4} k_j(T_i - T_{bi}) \quad (25)$$

In this case, when it is supposed that the maximum braking torque of $R_c Mg/4$ (g is a gravitational acceleration) is generated under the condition of the slip speed 3 rad/s, the following formula (26) is obtained.

$$\max(k_i) = \frac{R_c Mg/4}{3} \quad (26)$$

In this case, as a concrete constant, when $\tau=0.01$ (sec) $R_c=0.3$ (m) and M=1000 (kg) are considered, the following formula (27) is obtained.

$$\max\left(\frac{\tau}{R_c^2 M} \sum_{j=1}^{4} k_j\right) \approx 0.054 \ll 1 \quad (27)$$

Accordingly, the formula (25) can be approximated as the following formula (28).

$$k_i \frac{\tau}{J}\{\omega_i[k-1] - \omega_i[k-2]\} + f_i = -\omega_i[k] + 2\omega_i[k-1] - \omega_i[k-2] \quad (28)$$

In which $f_i$ is expressed by the following formula (29).

$$f_i = k_i \frac{\tau^2}{J R_c^2 M} \sum_{j=1}^{4} T_j - \frac{\tau^2}{J R_c^2 M} \sum_{j=1}^{4} k_j(T_i - T_{bi}) \quad (29)$$

In the case that a brake hydraulic pressure (a master cylinder pressure or a wheel cylinder pressure) can be measured with respect to $T_b$ in the formula (29), the following formula (30) can be established.

$$T_b = k_b \cdot P_c(k) \quad (30)$$

In which $P_c$ is a brake hydraulic pressure and $k_b$ is a coefficient for converting the brake hydraulic pressure into the braking torque. In this case, the formulas (28) and (29) are converted into the formulas (31) and (32).

$$k_i \frac{\tau}{J}\{\omega_i[k-1] - \omega_i[k-2]\} + f_i = -\omega_i[k] + 2\omega_i[k-1] - \omega_i[k-2] - P_{ci}[k-1] \quad (31)$$

$$f_i = k_i \frac{\tau^2}{J R_c^2 M} \sum_{j=1}^{4} T_j - \frac{\tau^2}{J R_c^2 M} \sum_{j=1}^{4} k_j \cdot T_i \quad (32)$$

In this case, $P_{ci}$ is obtained by the following formula (33).

$$P_{ci}[k] = \frac{\tau^2}{J R_c^2 M} \sum_{j=1}^{4} k_j \cdot T_b(k) \quad (33)$$

Here, it is supposed that the brake hydraulic pressure $P_c(k)$ at the present sampling time k and the brake hydraulic pressure $P_c(k-1)$ at a time k-1 of one sampling prior thereto are substantially equal to each other ($p_c(k)=P_c(k-1)$).

Further, the preceding estimated value is used as the $\mu$ gradient $k_j$ in the formula (33).

The formula (31) can be described in a form of a linear manner with respect to unknown quantities $k_i$ and $f_i$ by arranging in this manner, and the braking torque gradient $k_i$ with respect to the slip speed can be estimated by applying the on-line parameter identifying method to the formula (31).

Accordingly, the time series data of the braking torque gradient can be estimated from the time series data $\omega_i[k]$ of the detected wheel speed by repeating the following steps 1 and 2 (method of least squares).

Step 1:

$$\phi_i[k]^T \cdot \theta_i = y_i[k] \quad (34)$$

In which the following formulas (35) (36) and (37) are established.

$$\phi_i[k] = \begin{bmatrix} \tau\{\omega_i[k-1] - \omega_i[k-2]\}/J \\ 1 \end{bmatrix} \quad (35)$$

$$\theta_i = \begin{bmatrix} k_j \\ f_i \end{bmatrix} \quad (36)$$

$$y_i[k] = -\omega_i[k] + 2\omega_i[k-1] - \omega_i[k-2] - P_{ci}(k) \quad (37)$$

In this case, a first element of the matrix $\phi_i[k]$ in the formula (35) is a physical amount with respect to the change of the vehicle speed during a sample time, and the formula (37) is a physical amount with respect to the change in the change of the wheel speed during the sample time (a physical amount with respect to a value obtained by differentiating the wheel speed two stages).

Step 2:

$$\hat{\theta}_i[k] = \hat{\theta}_i[k-1] + L_i[k](y_i[k] - \phi_i[k]^T \cdot \hat{\theta}_i[k-1]) \quad (38)$$

$$L_i[k] = \frac{P_i[k-1]\phi_i[k]}{\lambda + \phi_i[k]^T P_i[k-1]\phi_i[k]} \quad (39)$$

$$P_i[k] = \frac{1}{\lambda}\left[P_i[k-1] - \frac{P_i[k-1]\phi_i[k]\phi_i[k]^T P_i[k-1]}{\lambda + \phi_i[k]^T P_i[k-1]\phi_i[k]}\right] \quad (40)$$

An estimated value of $\theta_i$ is calculated by the above recurrence formulas, so that a first element of the matrix of the estimated value of $\theta_i$ is extracted as an gradient of the estimated braking torque. In this case, $\lambda$ is a forgetting factor (for example, $\lambda=0.98$) showing a degree for removing the past data, and "$T$" shows a transposition of the matrix.

In this case, a left side of the formula (38) is a physical amount for expressing a history of the physical amount with respect to the change of the wheel speed and a history of the physical amount with respect to the change in the change of the wheel speed.

Figure 33:
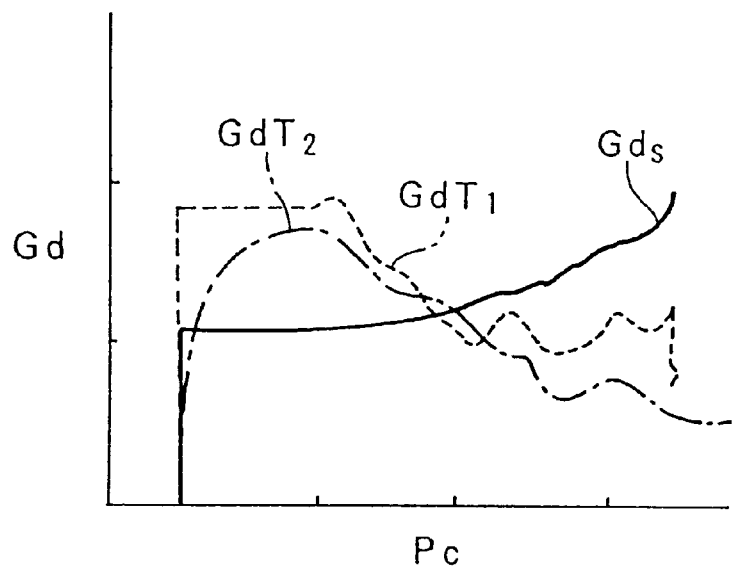
FIG. 33 is a graph which shows a relation between a braking force and the gradient the road surface $\mu$ at a predetermined speed in a Dry road surface condition.
Figure 34:
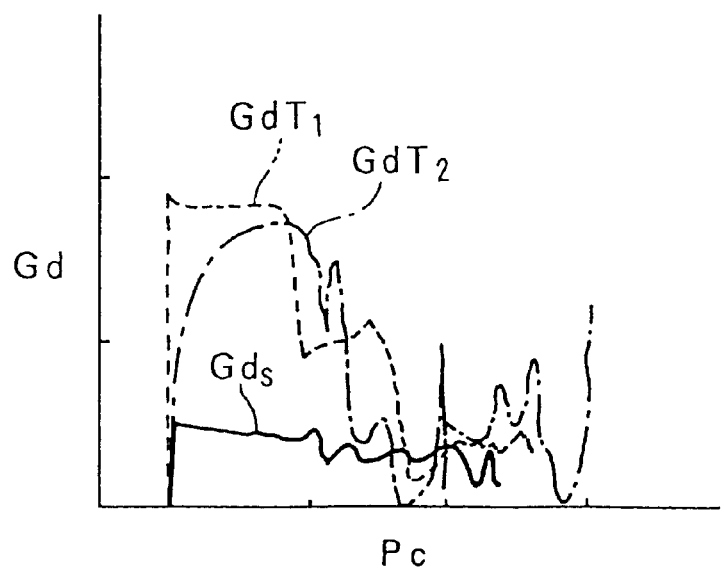
FIG. 34 is a graph which shows a relation between a braking force and the gradient of the road surface $\mu$ at a predetermined speed in a Snow covered road surface condition.
Figure 35:
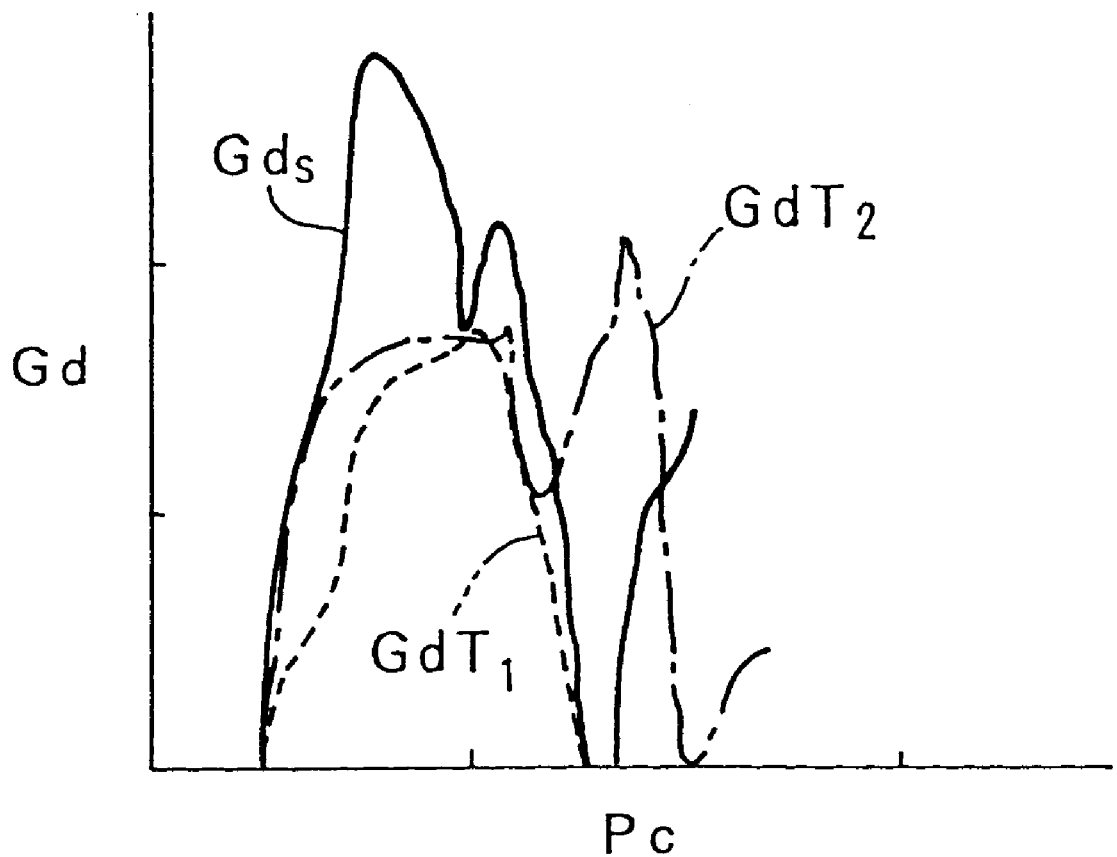
FIG. 35 is a graph which shows a relation between a braking force and the gradient of the road surface $\mu$ at a predetermined speed in an Ice covered road surface condition.

As shown in FIGS. 33 to 35, in each of the road surface conditions comprising Dry, Snow and Ice, the time series data $G_dT_1$ of the gradient $G_d$ of the road surface $\mu$ calculated by multiplying the braking torque gradient calculated by using the formula (29) by a conversion factor accurately coincides with the time series data $G_{ds}$ of the reference value of the gradient $G_d$ of the road surface $\mu$, and is further close to the track of the actual running road surface, so that an estimating accuracy of the road surface condition can be improved. Here, FIGS. 33 to 35 show the time series data $G_dT_2$ of the gradient $G_d$ of the road surface $\mu$ calculated by multiplying the braking torque gradient calculated by the formula (29) by the conversion factor. The time series data $G_dT_1$ more accurately coincides with the time series data $G_{ds}$ than the time series data $G_dT_2$. Accordingly, the time series data $G_dT_1$ is improved compared to the time series data $G_dT_2$.

Next, a fifth embodiment in accordance with the present invention will be described in detail with reference to the drawings.

Figures 39A, 39B:
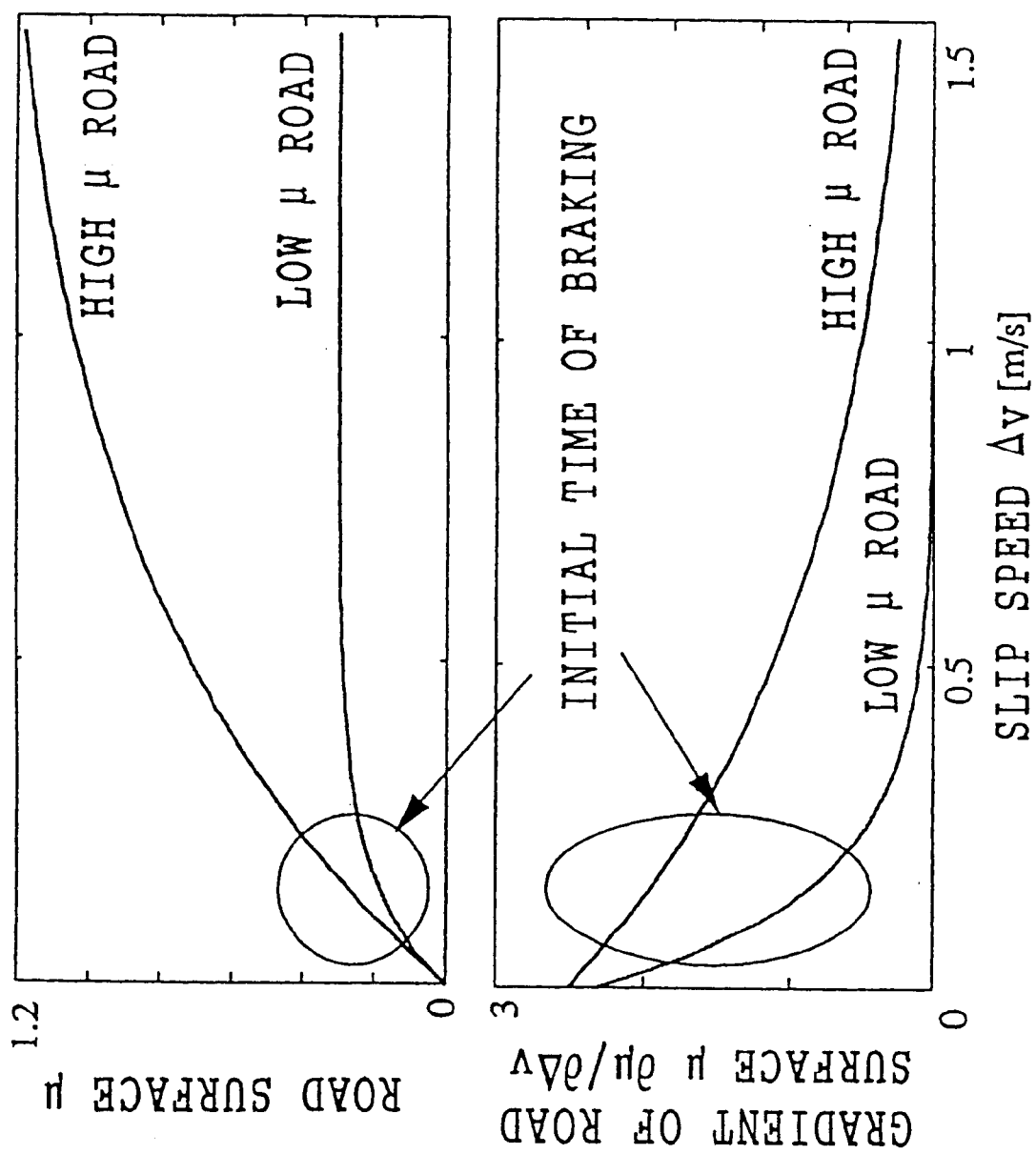
FIGS. 39A and 39B are graphs which respectively show characteristic of a coefficient of friction $\mu$ between a tire and a road surface and that of the gradient of the road surface $\mu$ with respect to a slip speed $\Delta v$.

As shown in FIGS. 39A and 39B, a characteristic between the gradient of the road surface $\mu$ and the slip speed has a great difference at each of the road surfaces at a time of starting the brake at which the slip speed is small.

Accordingly, in accordance with the fourth embodiment, there is suggested a road surface friction condition estimating apparatus for comparing the gradient of the road surface $\mu$ detected in an on-line manner by using the wheel speed, the braking force and the like with the reference value of the $\mu$ gradient of each of the road surfaces comprising Dry, Snow and Ice previously prepared on the plane constituted by the braking force $P_c$ and the $\mu$ gradient so as to estimate the road surface friction condition from an initial time of starting the brake.

However, there is a relation as shown in FIG. 40 between the slip speed $\Delta v$ and the coefficient $\mu$ of friction. In other words, there is a time difference between the change of the slip speed and the change of the coefficient $\mu$ of friction in accordance with an increase of the braking force, so that a micro hysteresis loop is generated. Accordingly, the $\mu$ gradient detected in an on-line manner appears as a great noise component with respect to the braking force in a horizontal axis as shown in FIG. 41.

As a method of removing such a noise at every fixed sampling time $\Delta t$, there is widely known a low pass filter of the type shown by the formula (41).

$$x(i+1) = \left(1 - \frac{\Delta t}{T}\right)X(i) + \frac{\Delta t}{T}u(i) \quad (41)$$

In this case, X is an output state amount after filter-treatment, $\mu$ is an input state amount on which a filter-treatment is performed, T is a time constant for giving a desired filter effect and i is a sampling period renewed at every $\Delta t$.

Figure 42:
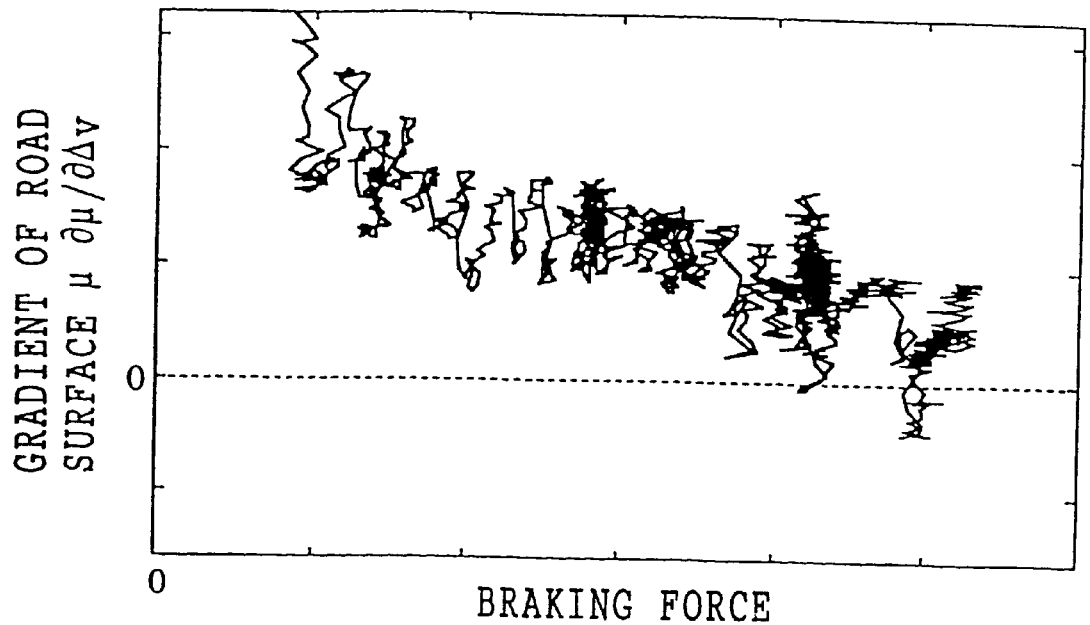
FIG. 42 is a graph which shows a result obtained by filtering the resonance gain calculated in the resonance gain calculating portion for each fixed sampling times as a characteristic to the braking force.

FIG. 42 expresses a result of shows that filter-treated in accordance with the formula (41), which shows that a noise is not sufficiently removed. This is because the filter-treatment is performed with respect to the time change, but without relation to the braking force corresponding to the horizontal axis. Accordingly, in comparing with the $\mu$ gradient reference value, the degree of comparison is lowered, so that there is a risk of deteriorating an accuracy of estimating the road surface condition.

This embodiment is made by taking the fact mentioned above into consideration, and is structured such as to accurately estimate the road surface condition.

This embodiment will be described in more detail below. In the road surface condition estimating apparatus in accordance with this embodiment (to which a variation reduction operating apparatus is applied) has the same components as those of the road surface condition estimating apparatus in accordance with the fourth embodiment mentioned above, so that the same reference numerals are attached to the same elements and the description thereof will be omitted.

Figure 36:
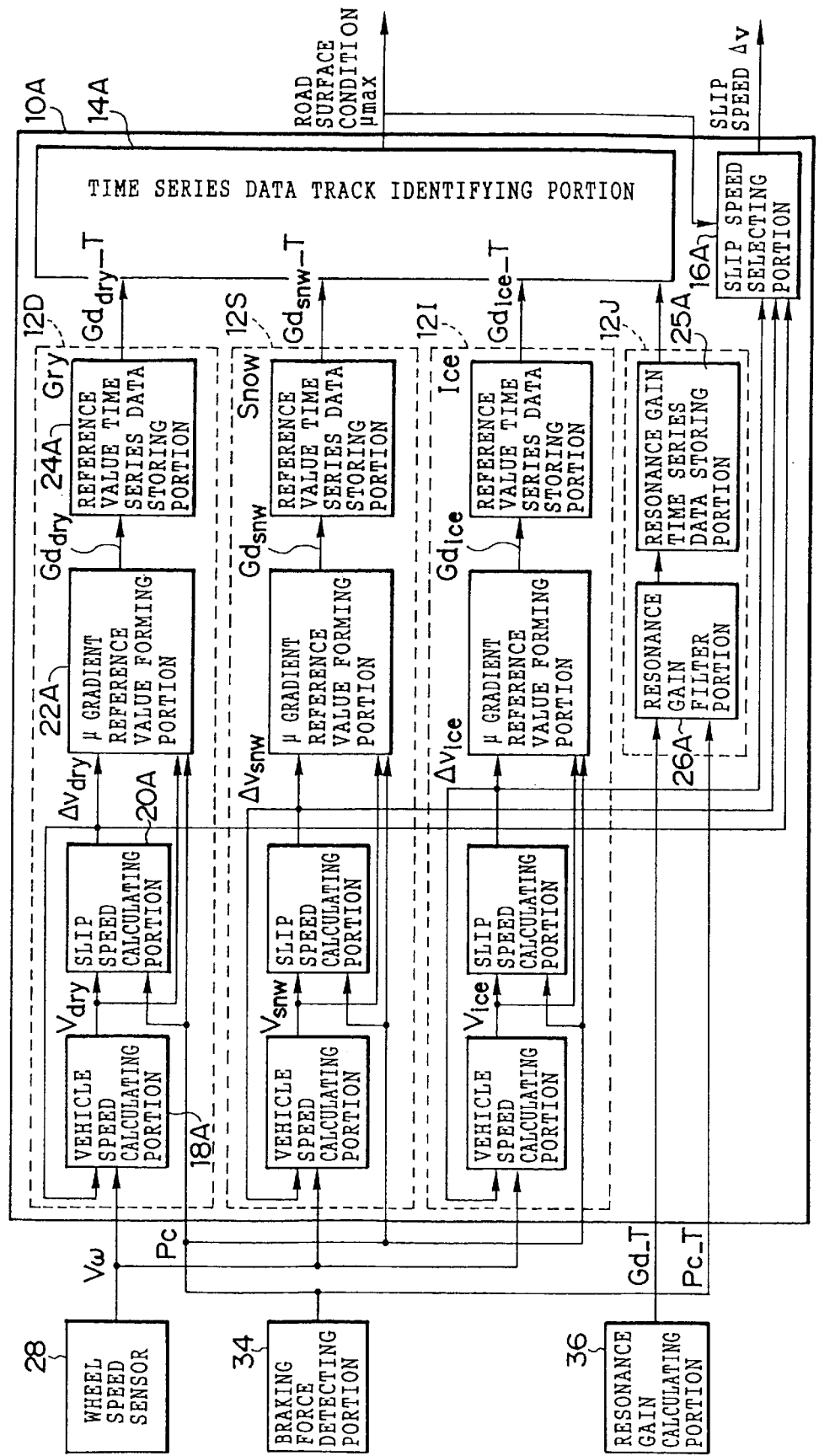
FIG. 36 is a block diagram which shows a road surface condition estimating apparatus in accordance with a fifth embodiment.

The road surface condition estimating apparatus in accordance with this embodiment is different from the fourth embodiment mentioned above in view that as shown in FIG. 36, the resonance gain storing circuit 12j is provided with a resonance gain filter portion 26A for performing a filter-treatment at every time when the braking force changes by a predetermined amount with respect to the calculated resonance gain, and a resonance gain time series data storing portion 25A for storing a time series data of the resonance gain filter-treated by the resonance gain filter portion 26A. The braking force detecting portion 34 and the resonance gain calculating portion 36 are connected to the resonance gain filter portion 26A. The resonance gain filter portion 26A is connected to the resonance gain time series data storing portion 25A. The resonance gain time series data storing portion 25A is connected to the time series data track identifying portion 14A.

Next, an operation of this embodiment will be described below.

Since a method of forming a reference value of the gradient of the road surface $\mu$ by the reference value forming and storing circuits 12D, 12S and 12I in accordance with this embodiment is the same as the forming method in accordance with the fourth embodiment mentioned above, the description thereof will be omitted.

In the resonance gain time series data storing portion 25A, the time series data of the resonance gain is stored in synchronously with the output timing of the time series data of the reference value to the reference value time series data storing portion 24A from the $\mu$ gradient reference value forming portion 22A. Accordingly, the resonance gain $G_dT$ filter-treated in the resonance gain filter portion 26A is input to the resonance gain time series data storing portion 25A at every time when the braking force changes by a predetermined amount from the time of starting the brake to the time when the braking force is applied by the predetermined amount mentioned above, and the input resonance gain $G_dT$ is stored therein.

A problem of the fourth embodiment mentioned above exists in a point that a filter-treatment is performed at every sampling period. Then, a dispersion of the track in FIG. 42 becomes small by performing the filter-treatment only when the braking force changes by a predetermined amount. Concretely speaking, the filter-treatment expressed by the following formula (42) which is similar to the formula (41) is performed.

$$x(k+1) = \left(1 - \frac{\Delta Pc}{Tp}\right) \cdot x(k) + \frac{\Delta Pc}{Tp} u(k) \qquad (42)$$

In which Tp is a constant corresponding to the time constant T in the formula (42), $\Delta P_c$ is a braking force of a predetermined amount and k is a period renewed at every time when the predetermined braking force changes by a predetermined amount. The equation may be expanded so as to be expressed by the following formula (43).

$$X(k+1) = \begin{bmatrix} a11 & \cdots & a1n \\ \vdots & & \vdots \\ an1 & \cdots & ann \end{bmatrix} \cdot X(k) + \begin{bmatrix} b1 \\ \vdots \\ bn \end{bmatrix} \cdot u(k) \qquad (43)$$

$$x(k) = [c11 \cdots c1n] \cdot X(k) + d \cdot u(k)$$

Figure 43:
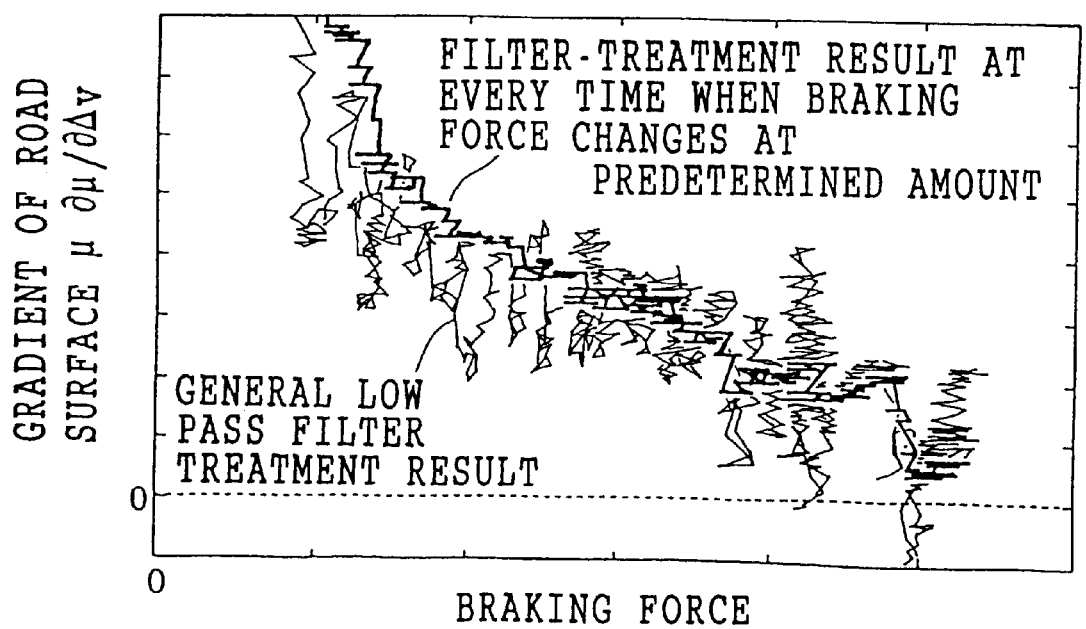
FIG. 43 is a graph which shows a result obtained by filtering the resonance gain calculated in the resonance gain calculating portion for each time when the braking force changes at a predetermined amount as a characteristic to the braking force, and compared with the result in FIG. 42.

In which X is a variable vector of an internal condition of the filter (size is n×1), and a11 to ann, b1 to bn, c11 to c1n and d1 to dn are respective constant of the filters. In FIG. 43, the filter effect of the formula (42) is compared with that of the formula (41). As shown by FIG. 43, it is understood that the dispersion is restricted to a smaller amount in comparison with the filter-treatment result in accordance with the formula (41), and an average value as a result of the formula (41) can be obtained at each of the points of the braking force. In this case, at a time of starting the braking force (adjacent to the braking force 0), it moves along the maximum value of the gradient of the road surface $\mu$. This shows an excessive response condition with respect to the magnitude of Tp.

In place of the filter-treatment as shown by the formulas (42) and (43), an average value during the period in which the braking force changes by a predetermined amount may be calculated in a manner shown by the following formula (44).

$$\overline{x(k)} = \sum_{j=1}^{m} (u(j))/m \qquad (44)$$

In which m is a number of resonance gain points sampled from k to k+1, x(k) is an average value of a resonance gain at a time of k, and j is a period initialized to 1 at a time of k and renewed at every sampling periods.

Next, the identification operating routine performed by the time series data track identifying portion 14A at a time of starting the brake will be described below. The identification operating routine in accordance with this embodiment is the same as the identification operating routine in accordance with the fourth embodiment (refer to FIG. 30). However, in a step 86, the gradient $G_dT$ (k) of the road surface $\mu$ (the resonance gain) stored in the resonance gain time series data storing portion 25A at a time expressed by the variable k (k·τ, τ: optional multiple of a sampling period) is taken in. The gradient $G_dT$ (k) of the road surface $\mu$ is obtained by filter-treating on the basis of the formula (42) or (43) by the resonance gain filter portion 26A.

As mentioned above, in accordance with this embodiment, since it is possible to accurately calculate the condition of the road surface on which the vehicle currently runs and the peak $\mu$ value, it is possible to perform a stabilizing control of the vehicle (change of the control gain and set of the control target value) such as VSC, ABS, TRC and the like, to warn the driver of the road surface condition and to estimate each of the vehicle conditions such as the vehicle lateral slip angle, the yaw rate and the like.

In the embodiment mentioned above, the resonance gain is filter-treated by using the formulas (42) or (43). Alternatively, the structure may be made such as to calculate an average of the resonance gains $G_dT$ output at every sampling periods from the variable k to k+1.

Further, in accordance with this embodiment, since the braking force $\mu$ shown in FIGS. 24 to 26 and the gradient of the road surface $\mu$ have the relation shown in FIG. 32 in the same manner of the fourth embodiment mentioned above, the structure may be made such as to store the relational formula shown in FIG. 32 in correspondence to the vehicle speed V and calculate the gradient of the road surface $\mu$ corresponding to the vehicle speed V and the braking force $P_c$ in accordance with the vehicle speed V, the braking force $P_c$ and the relational formula between the braking force $P_c$ and the gradient of the road surface $\mu$.

Still further, in accordance with the embodiment mentioned above, the road surface condition is estimated in accordance with the minimum value of the square error between the gradient $G_dT$ (k) of the road surface $\mu$ and the reference value $G_{ds}$ (k). However, the present invention is not limited to this. The structure may be made such as to calculate the correlation between the time series data of the gradient $G_dT$ (k) of the road surface $\mu$ and that of the reference value $G_{ds}$ (k) from the time of starting the brake to the time when the predetermined time elapses so as to estimate the road surface condition.

Furthermore, in accordance with the embodiment mentioned above, there are stored the relational formula between the braking force $\mu$ and the slip speed $\Delta v$ shown in FIGS. 24 to 26 the relational formula between the braking force P and the road surface $\mu$ shown in FIGS. 27 to 29, or the relational formula between the braking force P and the gradient $G_d$ of the road surface $\mu$ shown in FIG. 32. However, the present invention is not limited to these. Since each of the relations between the slip speed $\Delta v$ and the road surface $\mu$ and between the slip speed $\Delta v$ and the gradient $G_d$ of the road surface $\mu$ have similar to those between the braking force P and the slip speed $\Delta v$, the road surface $\mu$, or the gradient $G_d$ of the road surface $\mu$, the structure may be made such as to store the relational formulas between the slip speed $\Delta v$ and the slip speed $\Delta v$, and the road surface $\mu$ and between the slip speed $\Delta v$ and the gradient $G_d$ of the road surface $\mu$, and to process in the same manner.

Moreover, in the embodiment mentioned above, the resonance gain is calculated as the gradient $G_d$ of the road surface $\mu$. However, the present invention is not limited to this. Since the resonance gain is a physical amount equivalent to the braking torque gradient, the braking torque gradient calculating portion is provided in place of the resonance gain calculating portion 36, the braking torque gradient is calculated in place of the gradient $G_d$ of the road surface $\mu$, and to process in the same manner.

As shown in FIG. 43, in the track of the resonance gain filter-treated in accordance with the formula (42), it is understood that the dispersion is restricted to be smaller at each of the braking force points than the track filter-treated in accordance with the formula (41).

Figure 37:
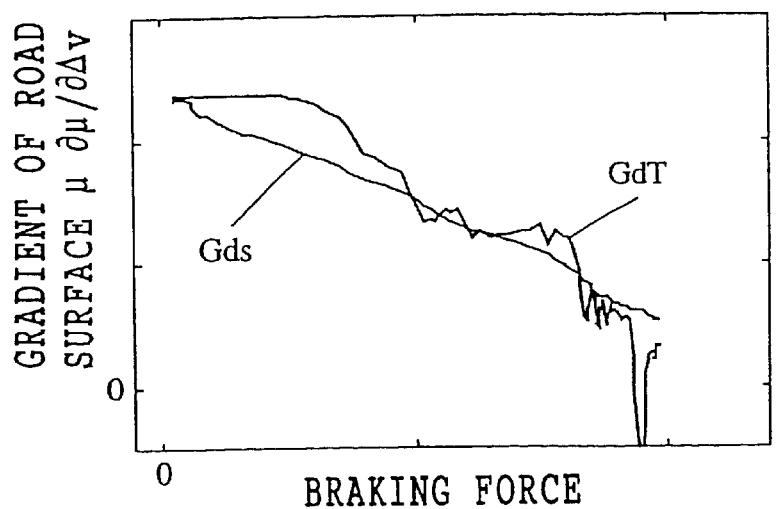
FIG. 37 is a graph which shows a relation between a braking force and the gradient of the road surface $\mu$ at a predetermined speed in a Dry road surface condition.
Figure 38:
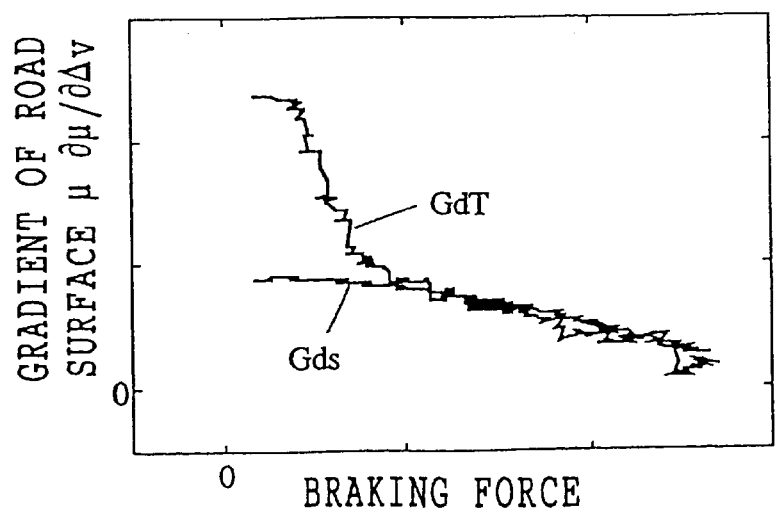
FIG. 38 is a graph which shows a relation between a braking force and the gradient of the road surface $\mu$ at a predetermined speed in a Snow covered road surface condition.

Then, as shown in FIGS. 37 and 38, in each of the road surface conditions comprising Dry and Snow, the time series data $G_dT_1$ of the gradient $G_d$ of the road surface $\mu$ calculated by multiplying the braking torque gradient calculated in the manner mentioned above by the conversion factor and filter-treated in accordance with the formula (42) accurately coincides with the time series data $G_{ds}$ of the reference value of the gradient $G_d$ of the road surface $\mu$, and is further close to the track of the actual road surface on which the vehicle runs, so that an estimating accuracy of the road surface on which the vehicle runs, condition can be improved.

In accordance with the embodiment mentioned above, the braking force to the wheel is used as the first physical amount for expressing the braking condition or the driving condition of the wheel in the vehicle. However, the present invention is not limited to this, and the slip speed can be employed.

Further, in the embodiment mentioned above, the variation reduction operating apparatus is applied to the road surface condition estimating apparatus. However, the present invention is not limited to this, and the variation reduction operating apparatus can be also applied to the ABS apparatus.

What is claimed is:

1. A road surface condition estimating apparatus, comprising:
   a first detector configured to detect a first physical amount related to a braking condition of a wheel of a vehicle;
   a second detector configured to detect a vehicle speed of said vehicle;
   a third detector configured to detect a second physical amount which represents a slipperiness of said wheel and which is determined in accordance with a road surface condition based on a road surface on which said wheel runs, said first physical amount, and said vehicle speed;
   a calculator configured to calculate a calculated second physical amount for each of a plurality of predetermined road surface conditions based on said first physical amount and said vehicle speed;
   a comparator configured to compare a detected track of said second physical amount detected by said third detector with a plurality of calculated tracks of said calculated second physical amounts calculated for each of the plurality of predetermined road surface conditions by said calculator; and
   an estimator configured to estimate a road surface condition corresponding to a calculated track closest to said detected track selected from said plurality of calculated tracks based on a result provided by said comparator, wherein;
   said first physical amount is one of a braking force on the wheel and a slip speed; and
   said second physical amount is one of a gradient of a coefficient of friction $\mu$ between the road surface and the wheel with respect to a slip speed, a gradient of a braking torque on the wheel with respect to the slip speed, and a gradient of a braking force on the wheel with respect to the slip speed.

2. A road surface condition estimating apparatus according to claim 1, wherein:
   said first detector, said second detector, and said third detector respectively detect the first physical amount, the vehicle speed, and the second physical amount at predetermined time intervals from a start time of braking on said wheel;
   said calculator calculates the second physical amount for each of said plurality of predetermined road surface conditions at each predetermined time interval that the first physical amount changes by a predetermined amount relative to an initial first physical amount detected at the start time of braking on the wheel; and
   said comparator compares the second physical amount detected at said predetermined time intervals with each of the second physical amounts calculated for each of the plurality of predetermined road surface conditions at each predetermined time interval that the first physical amount changes by a predetermined amount from the start time of braking on said wheel.

3. A road surface condition estimating apparatus comprising:
   a first detector configured to detect a first physical amount related to one of a brake condition and a driving condition of a wheel of a vehicle;
   a second detector configured to detect a vehicle speed of said vehicle;
   a third detector configured to detect a second physical amount which represents a slipperiness and which is determined in accordance with a road surface condition corresponding to a road surface on which said wheel runs, said first physical amount, and said vehicle;
   a reduction processor configured to reduce variations in the second physical amount detected by said third detector in accordance with a change in said first physical amount and to yield a variation-reduced second physical amount;
   a calculator configured to calculate a calculated second physical amount for each of a plurality of predetermined road surface conditions based on the first physical amount and the vehicle speed;
   a comparator configured to compare a detected track of the variation-reduced second physical amount with each of a plurality of calculated tracks of the calculated second physical amount; and
   an estimator configured to estimate a road surface condition corresponding to a calculated track selected from said plurality of calculated tracks closest to said detected track among said calculated tracks as being an actual road surface condition corresponding to said road surface on which said wheel runs based on a comparison result of said comparator.

4. A road surface condition estimating apparatus according to claim 3, wherein said reduction processor is configured to perform one of filter variations in said second physical amount at a time said first physical amount changes by a predetermined amount and calculate an average of said second physical amount over the time said first physical amount changes by said predetermined amount.

5. A road surface condition estimating apparatus according to claim 3, wherein said first physical amount is one of a braking force on the wheel and a slip speed.

6. A road surface condition estimating apparatus according to claim 3, wherein said second physical amount is one of a gradient of a coefficient of friction between the road surface and the wheel with respect to a slip speed, a gradient of braking torque on the wheel with respect to the slip speed, and a gradient of braking force on the wheel with respect to the slip speed.

7. A road surface condition estimating apparatus according to claim 3, wherein:
   said first detector, said second detector, and said third detector respectively detect the first physical amount, the vehicle speed, and the second physical amount at a predetermined interval from a start time of braking on the wheel;

said calculator calculates the second physical amount for each of said plurality of predetermined road surface conditions at each predetermined time interval that the first physical amount changes by a predetermined amount relative to an initial first physical amount detected at the start time of braking on the wheel; and said comparator compares the second physical amount detected at said predetermined time intervals with each of the second physical amounts calculated at each of the second physical amounts calculated at each time the first physical amount changes by a predetermined amount, at each predetermined time interval that the first physical amount changes by said predetermined amount from the start time of braking on the wheel.

8. A road surface condition estimating apparatus, comprising:

means for detecting a plurality of wheel motion amounts, one of said wheel motion amounts related to one of a characteristic of a gradient of a coefficient of friction $\mu$ between a wheel and a road surface with respect to a slip speed, a gradient of a braking torque on the wheel with respect to the slip speed, and a gradient of a braking force on the wheel with respect to the slip speed;

means for correlating at least one detected wheel motion amount of said plurality of wheel motion amounts with a converted wheel motion amount for each of a plurality of road surface conditions based on a correlation between said at least one detected wheel motion amount and each of a plurality of road surface conditions; and means for estimating a road surface condition through comparison of said converted wheel motion amount with a further detected wheel motion amount of the plurality of wheel motion amounts.

9. A device for estimating a road condition, comprising:

a plurality of inputs configured to receive a plurality of detected wheel motion amounts describing the behavior of a vehicle during operation;

correlation information describing a relationship between at least one of said plurality of detected wheel motion amounts and a plurality of possible road conditions, said correlation information being characteristic of a gradient of a coefficient of friction between a tire and a road surface;

a storage device configured to store said correlation information;

a processor configured to process said some of said plurality of detected wheel motion amounts in light of said correlation information to yield a processed wheel motion amount for each of said possible road conditions;

a comparator configured to compare each of said processed wheel motion amounts with a particular detected wheel motion amount selected from said plurality of detected wheel motion amounts and output a plurality of comparison results; and a selector configured to select a most relevant comparison result from said plurality of comparison results and to output a signal that indicates a most relevant road condition based upon said most relevant comparison result.

10. The apparatus of claim 9, wherein said particular detected wheel motion amount is a resonance gain.

* * * * *